US007773150B2

(12) United States Patent
Kondo et al.

(10) Patent No.: US 7,773,150 B2
(45) Date of Patent: *Aug. 10, 2010

(54) INFORMATION SIGNAL PROCESSOR, METHOD FOR PROCESSING INFORMATION SIGNAL, IMAGE SIGNAL PROCESSOR AND IMAGE DISPLAY APPARATUS USING THE SAME, COEFFICIENT SEED DATA PRODUCTION DEVICE USED IN THE SAME, METHOD FOR PRODUCING COEFFICIENT SEED DATA SET, COEFFICIENT DATA PRODUCTION DEVICE, METHOD FOR PRODUCING COEFFICIENT DATA SET, AND INFORMATION-PROVIDING MEDIUM

(75) Inventors: Tetsujiro Kondo, Tokyo (JP); Yasushi Tatehira, Kanagawa (JP); Kei Hiraizumi, Kanagawa (JP); Nobuyuki Asakura, Tokyo (JP); Takuo Morimura, Kanagawa (JP); Wataru Niitsuma, Tokyo (JP); Takahide Ayata, Kanagawa (JP)

(73) Assignee: Sony Corporation, Tokyo (JP)

( * ) Notice: Subject to any disclaimer, the term of this patent is extended or adjusted under 35 U.S.C. 154(b) by 426 days.

This patent is subject to a terminal disclaimer.

(21) Appl. No.: 11/897,168

(22) Filed: Aug. 29, 2007

(65) Prior Publication Data
US 2008/0002053 A1    Jan. 3, 2008

Related U.S. Application Data

(62) Division of application No. 10/181,125, filed as application No. PCT/JP01/09943 on Nov. 14, 2001, now Pat. No. 7,286,184.

(30) Foreign Application Priority Data

Nov. 15, 2000    (JP)    ............................. 2000-348731
Apr. 9, 2001    (JP)    ............................. 2001-110695

(51) Int. Cl.
*H04N 11/20*    (2006.01)
(52) U.S. Cl. ......................... 348/441; 348/448; 348/458
(58) Field of Classification Search ................. 348/441, 348/458, 448–449, 452, 554–555, 558; 382/299–300; 345/698, 699; *H04N 11/20*
See application file for complete search history.

(56) References Cited

U.S. PATENT DOCUMENTS 5,517,588 A    5/1996    Kondo (Continued)

FOREIGN PATENT DOCUMENTS

EP    0 975 156    1/2000

(Continued)

*Primary Examiner*—Trang U Tran
(74) *Attorney, Agent, or Firm*—Frommer Lawrence & Haug LLP; William S. Frommer; Thomas F. Presson

(57) ABSTRACT

An apparatus for use in conversion of an SD signal into an HD signal. The pixel data sets of a tap corresponding to an objective position in the HD signal are extracted selectively from the SD signal. Class CL to which pixel data set of the objective position belongs is then obtained using the pixel data sets of the tap. A coefficient production circuit produces coefficient data sets Wi for each class based on coefficient seed data sets for each class and values of picture quality adjusting parameters, h and v obtained by user operation. A tap selection circuit selectively extracts the data sets xi of the tap corresponding to the objective position in the HD signal from the SD signal and then, a calculation circuit produces the pixel data sets of the objective position in the HD signal according to an estimation equation using the data sets xi and the coefficient data sets Wi corresponding to the class CL read out of a memory.

16 Claims, 32 Drawing Sheets

U.S. PATENT DOCUMENTS

| | | | |
|---|---|---|---|
| 5,663,764 A * | 9/1997 | Kondo et al. | 375/240.14 |
| 5,727,085 A * | 3/1998 | Toyama et al. | 382/232 |
| 6,144,412 A | 11/2000 | Hirano et al. | |
| 6,429,899 B1 | 8/2002 | Nio et al. | |
| 6,571,142 B1 * | 5/2003 | Kondo et al. | 700/90 |
| 6,674,478 B2 | 1/2004 | Miyazaki et al. | |
| 6,836,293 B2 | 12/2004 | Itoh et al. | |
| 7,212,245 B2 * | 5/2007 | Kondo et al. | 348/441 |
| 7,286,184 B2 * | 10/2007 | Kondo et al. | 348/441 |

FOREIGN PATENT DOCUMENTS

| | | |
|---|---|---|
| EP | 0 979 004 | 2/2000 |
| EP | 1 001 353 | 5/2000 |
| EP | 1 267 322 | 12/2002 |
| JP | 9-74543 | 3/1997 |
| JP | 10-313445 | 11/1998 |
| JP | 2000-41223 | 2/2000 |
| JP | 2000-69435 | 3/2000 |
| JP | 2000-115717 | 4/2000 |

* cited by examiner

F I G. 1 1
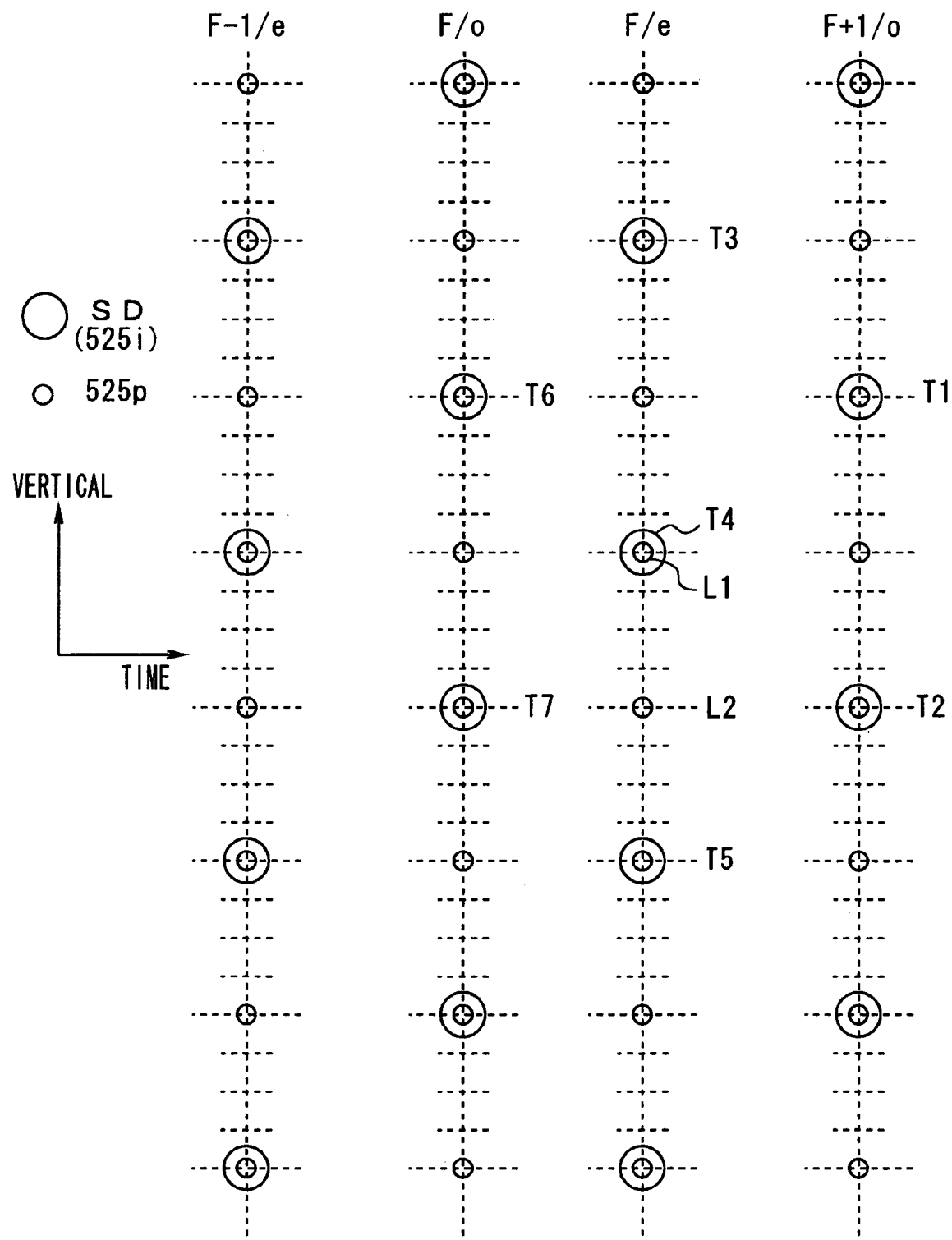

F I G. 1 5
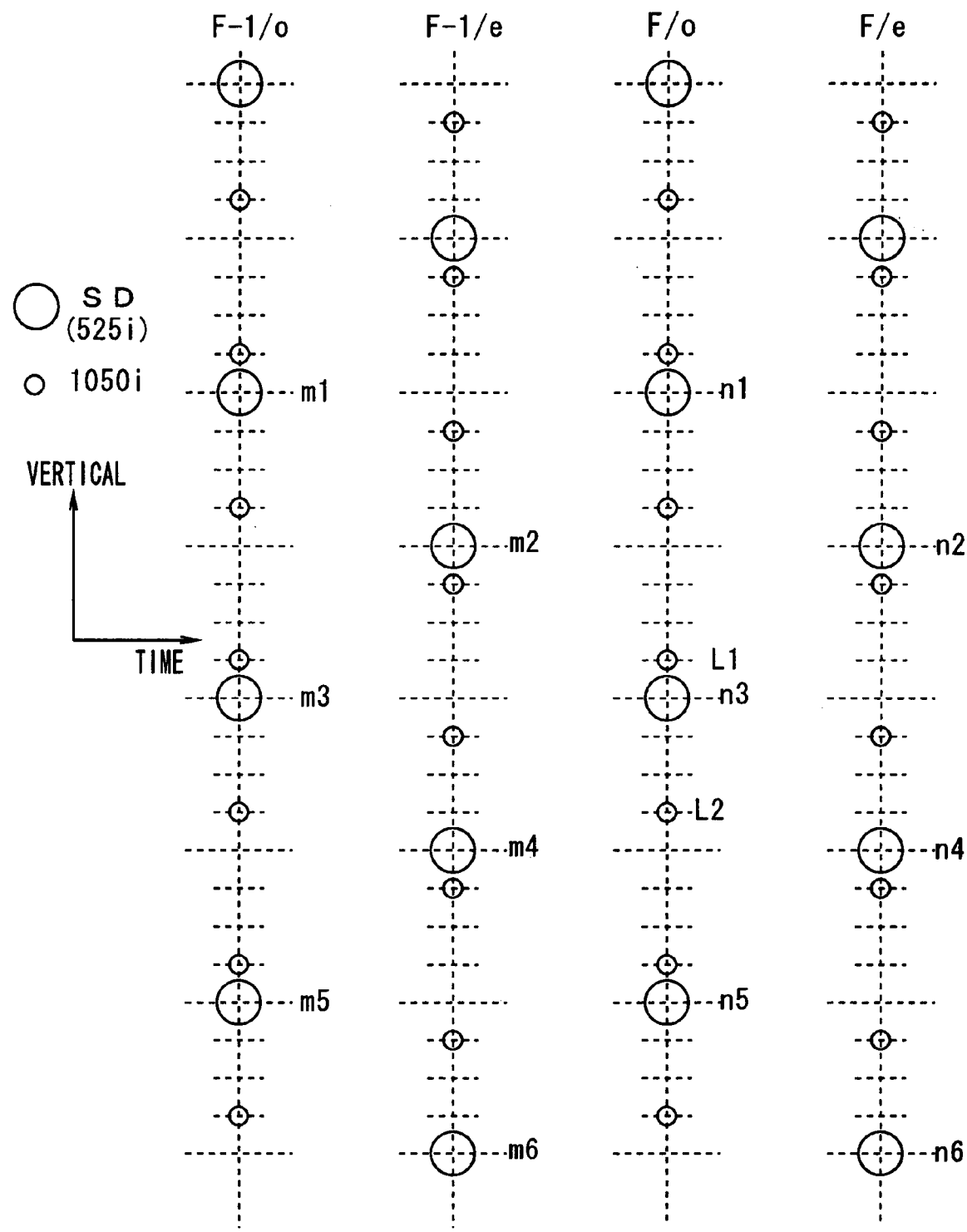

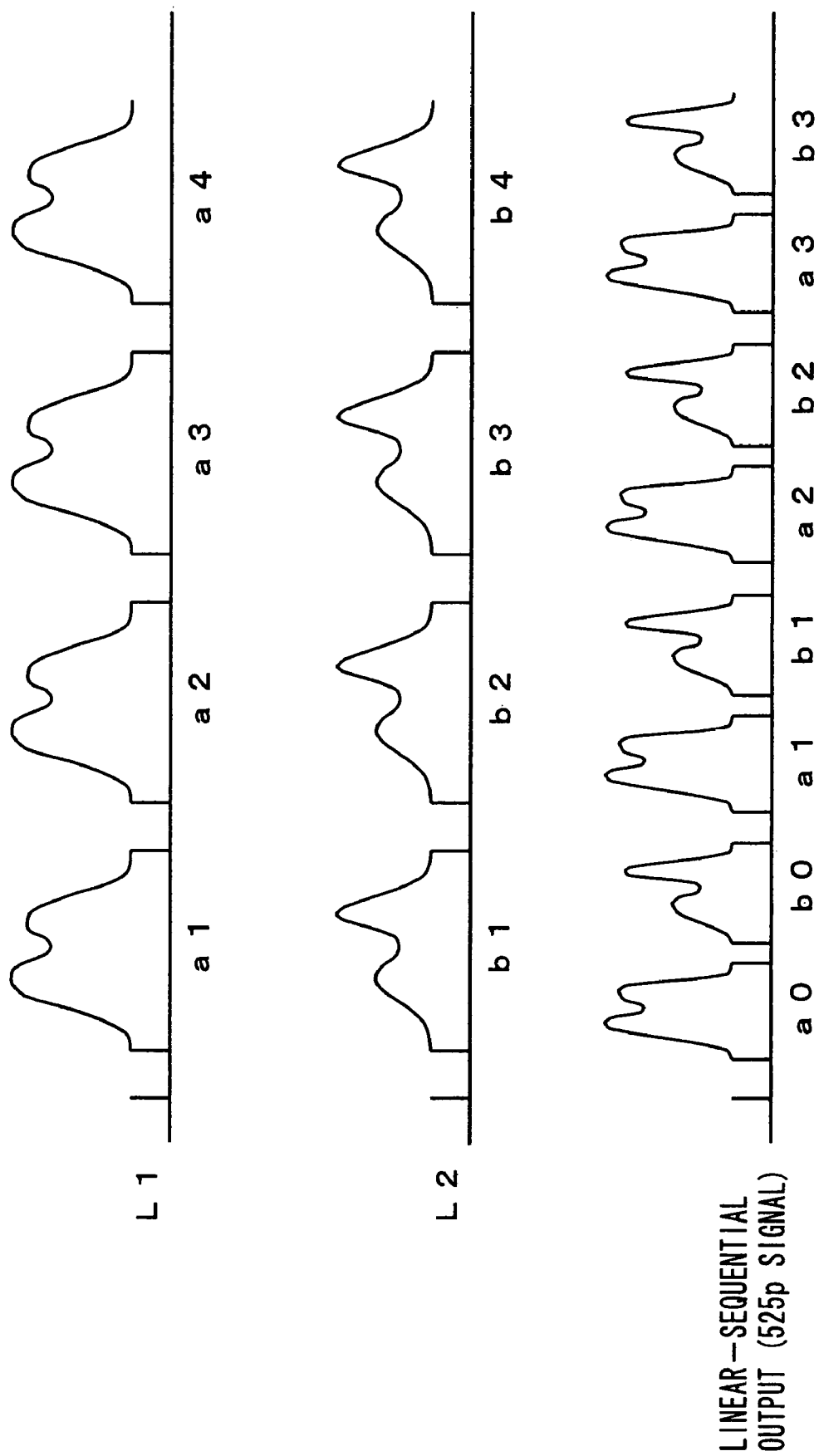

F I G. 1 7
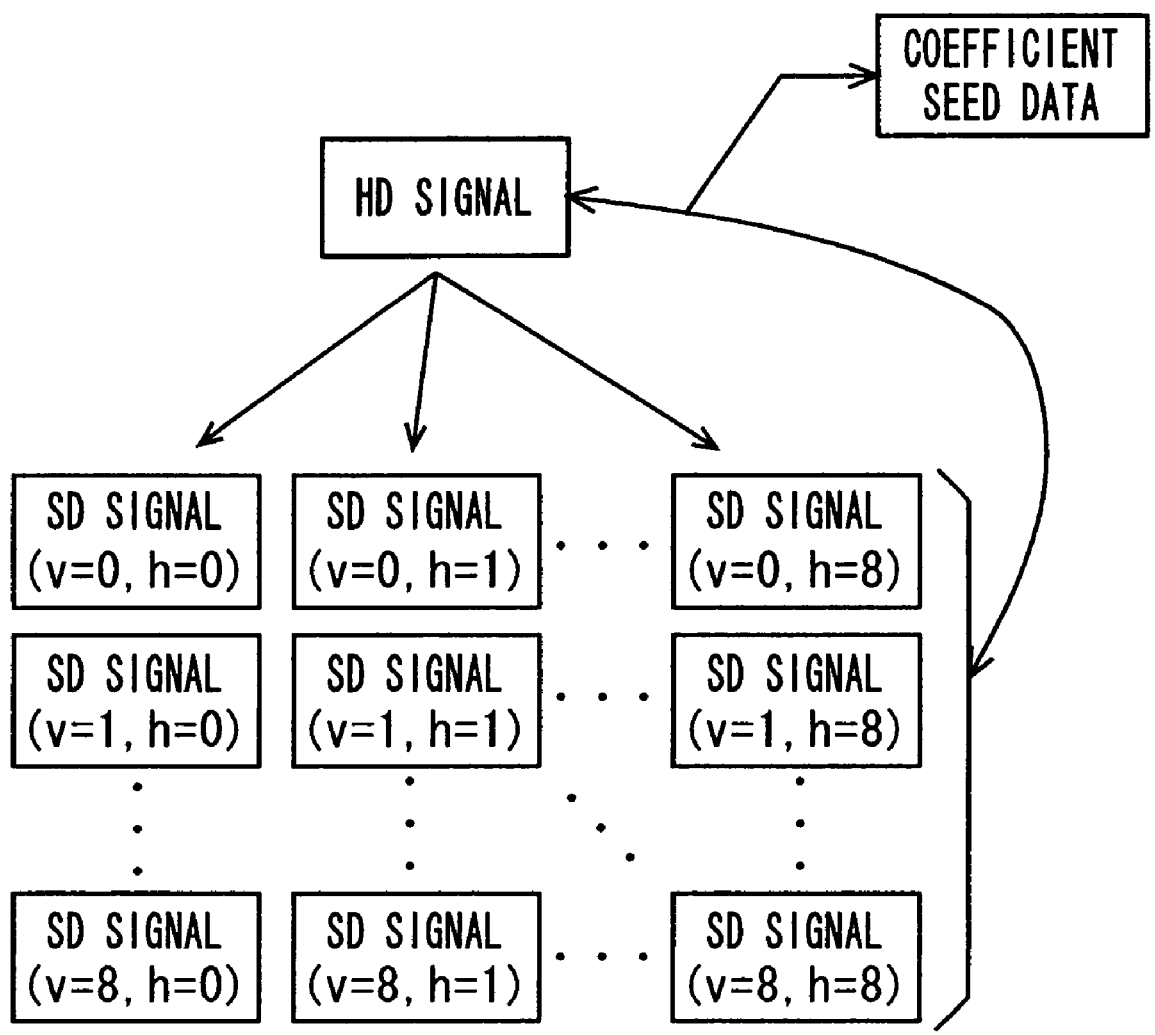

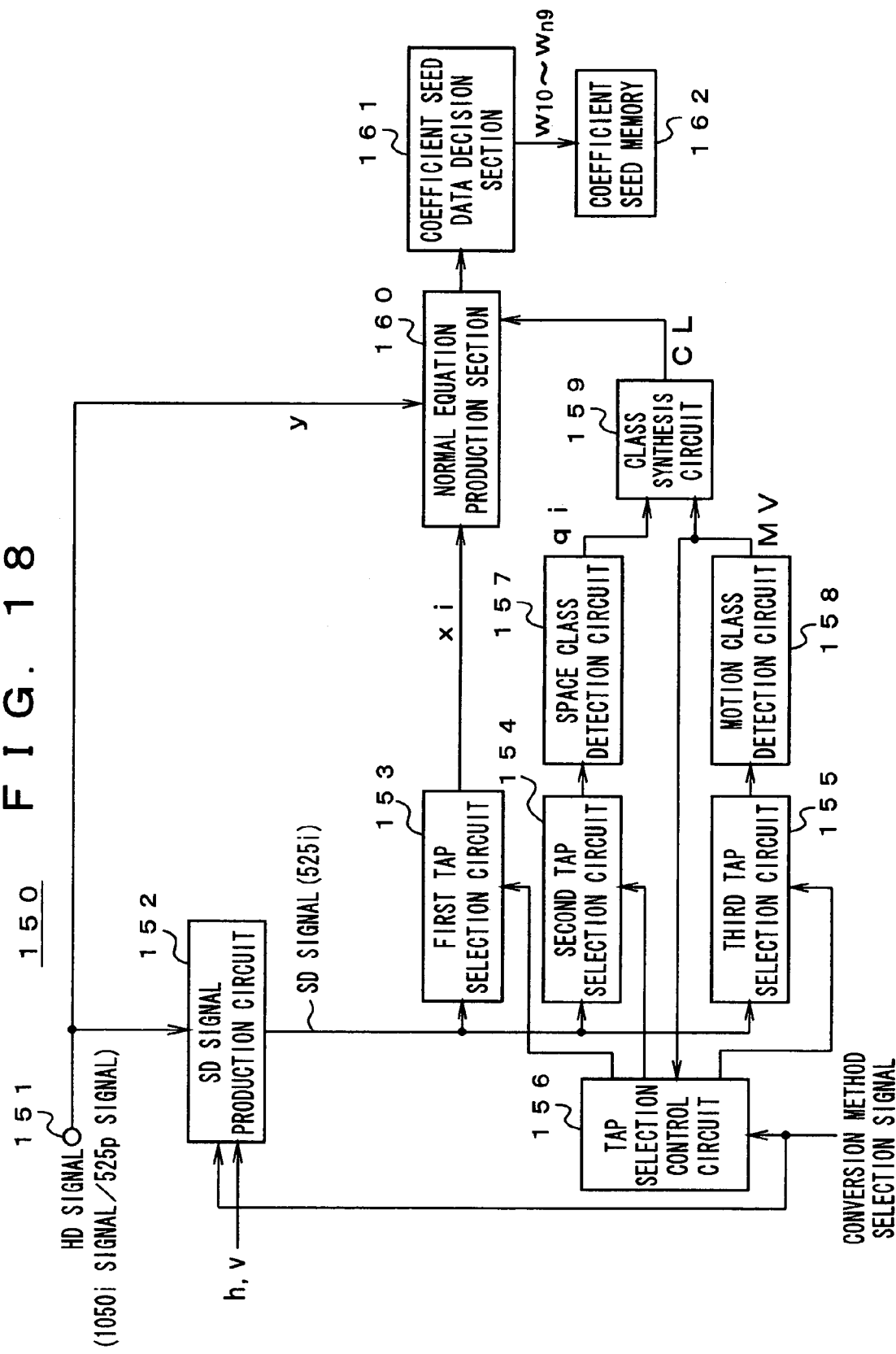

| VALUES OF PARAMETER P | FUNCTIONS |
|---|---|
| P 1 | RESOLUTION IMPROVEMENT |
| P 2 | NOISE SUPPRESSION |
| P 3 | MPEG SIGNAL DECODING (RATE a) |
| P 4 | MPEG SIGNAL DECODING (RATE b) |
| P 5 | CONVERTING COMPOSITE SIGNAL INTO COMPONENT SIGNAL |
| P 6 | JPEG SIGNAL DECODING |

INFORMATION SIGNAL PROCESSOR, METHOD FOR PROCESSING INFORMATION SIGNAL, IMAGE SIGNAL PROCESSOR AND IMAGE DISPLAY APPARATUS USING THE SAME, COEFFICIENT SEED DATA PRODUCTION DEVICE USED IN THE SAME, METHOD FOR PRODUCING COEFFICIENT SEED DATA SET, COEFFICIENT DATA PRODUCTION DEVICE, METHOD FOR PRODUCING COEFFICIENT DATA SET, AND INFORMATION-PROVIDING MEDIUM

This is a division of U.S. application Ser. No. 10/181,125, filed Nov. 4, 2002 now U.S. Pat. No. 7,286,184 under 35 USC 371 from International Application PCT/JP01/09943, filed Nov. 14, 2001 with a claim of priority under 35 USC 119 to Japanese Applications 2000-348731, filed in Japan on Nov. 15, 2000, and 2001-110695, filed in Japan on Apr. 9, 2001, the entirety thereof being incorporated herein by reference.

TECHNICAL FIELD

The invention relates to an information signal processor and a method for processing an information signal wherein functions such as improvement of resolution, noise suppression, decoding, and signal format conversion, are performed. More specifically, the invention relates to an information signal processor and the like wherein informational data set that constitutes a second information signal is produced from informational data set that constitutes a first information signal in correspondence with a value of a parameter for selecting one of a plurality of the functions, thereby implementing the plurality of the functions as a single apparatus or device.

The invention also relates to an information signal processor, a method for processing an information signal, an image signal processor and an image display apparatus using the same, a coefficient seed date production device used in the same and a method for producing coefficient seed data set, a coefficient data production device, a method for producing coefficient data set, and an information-providing medium that are well suitable for use in conversion of, for example, an NTSC-system video signal into a High-Definition (hereinafter called Hi-vision) video signal. More specifically, the invention relates to an information signal processor and the like wherein second information signal is produced in correspondence with values of the parameters of plural kinds when converting the first information signal into the second information signal, thereby arbitrarily adjust a quality of an output, for example, a picture quality, obtained by the second information signal on plural axes.

BACKGROUND ART

A recent increase in audio-visual oriented applications has led to a desire for the development of a TV receiver that can obtain higher resolution images. In order to satisfy the desire in turn, a Hi-vision TV receiver was developed. The Hi-vision TV receiver uses 1125 scanning lines, which are at least twice the number of the scanning lines used in an NTSC-system receiver of 525. Also, the Hi-vision receiver has an aspect ratio of 9:16 as compared to the NTSC-system receiver's aspect ratio of 3:4. As such, the Hi-vision receiver can display an image with higher resolution and realism than the NTSC-system one.

Although the Hi-vision system has these excellent features, the Hi-vision receiver cannot display a Hi-vision image even when an NTSC-system video signal is supplied as it is. The reason is that, as mentioned above, the NTSC system and the Hi-vision system have different standards.

To display the Hi-vision image corresponding to the NTSC-system video signal, the applicant of this application previously proposed a converter for converting the NTSC-system video signal into the Hi-vision video signal (see Japanese Patent Application No. Hei 6-205934). From an NTSC-system video signal, this converter extracts pixel data sets of a block (region) of the NTSC-system video signal, which correspond to an objective pixel in Hi-vision video signal, thereby deciding a class including the objective pixel based on level distribution patterns of the pixel data sets in this block and then producing the pixel data set of the above objective pixel corresponding to this class.

Also, the applicant of this application suggested a converter for converting a composite signal into a component signal with almost the same configuration as that of the above-mentioned converter (see Japanese Patent Application Publication No. 2000-138950), a decoder for decoding an MPEG (Moving Picture Experts Group) image signal (see Japanese Patent Application publication No. 2000-135356), and so on.

In the above-mentioned converter for converting the NTSC-system video signal into the Hi-vision video signal, an image according to the Hi-vision video signal has a fixed resolution and so cannot have a desired resolution corresponding to the image contents, unlike the conventional adjustment of contrast, sharpness, etc.

Each prior apparatus as described above can process only one function at a time and so are not efficient in operation.

DISCLOSURE OF THE INVENTION

It is an object of the invention to provide an information signal processor and the like that can implement a plurality of the functions as a single apparatus or device. It is another object of the invention to provide an information processor and the like that are capable of arbitrarily adjusting a picture quality, for example, of an image on plural axes such as horizontal and vertical resolutions, and a noise cancellation degree and a horizontal/vertical resolution.

An information signal processor in accordance with the invention for performing one function decided from a plurality of functions on an input first information signal, producing a second information signal, and transmitting the second information signal comprises parameter input means for inputting a value of a parameter for deciding one of the plurality of functions, and informational data production means for producing informational data set constituting the second information signal from informational data set constituting the first information signal in correspondence with the value of the parameter input by the parameter input means.

A method for processing an information signal in accordance with the invention by performing one function decided from a plurality of functions on an input first information signal, producing a second information signal, and transmitting the second information signal comprises a first step of inputting a value of a parameter for deciding one of the plurality of functions, and a second step of producing informational data set constituting the second information signal from informational data set constituting the first information signal in correspondence with the value of the parameter input at the first step.

According to the invention, the first information signal is input, the one function decided from a plurality of functions is performed on the input first information signal, and the second information signal is transmitted. In this case, a value of the parameter for deciding the one function from the plurality of functions is input. If the information signal is an image signal, for example, the plurality of functions includes improvement of resolution, noise suppression, decoding, and signal format conversion.

In correspondence with thus input value of the parameter, the informational data set constituting the second information signal is produced from the informational data set constituting the first information signal. Thus, the functions vary according to the input value of the parameter. This allows a plurality of the functions to be implemented by a single apparatus or device.

Also, another information signal processor in accordance with the invention for converting a first information signal containing plural informational data sets into a second information signal containing plural informational data sets, comprises first data selection means for selecting first plural informational data sets located on a periphery of an objective position in the second information signal based on the first information signal, class detection means for detecting a class including informational data set of the objective position based on the first plural informational data sets selected by the first data selection means, parameter adjustment means for adjusting values of parameters of plural kinds, each parameter deciding a quality of an output obtained by the second information signal, and informational data production means for producing informational data set of the objective position in correspondence with the class detected by the class detection means and the values of the parameters of plural kinds, each parameter being adjusted by the parameter adjustment means.

For example, the informational data production means includes first storage means for storing coefficient seed data set obtained beforehand for each class detected by the class detection means, the coefficient seed data set being coefficient data set in a production equation for producing coefficient data set used in an estimation equation, and the production equation containing parameters of plural kinds, the coefficient data generation means for generating the coefficient data set used in the estimation equation corresponding to the class detected by the class detection means and the values of the parameters of plural kinds, each parameter being adjusted by the parameter adjustment means, the coefficient data set used in the estimation equation being produced according to the production equation using both the coefficient seed data set stored in the first storage means and the values of the adjusted parameters of plural kinds, second data selection means for selecting second plural informational data sets located on a periphery of the objective position in the second information signal based on the first information signal, and calculation means for calculating and obtaining informational data set of the objective position according to the estimation equation using both the coefficient data set generated by the coefficient data generation means and the second plural informational data sets selected by the second data selection means.

Alternatively, for example, the informational data production means includes coefficient data generation means for generating the coefficient data set used in the estimation equation corresponding to the class detected by the class detection means and the values of the parameters of plural kinds, each parameter being adjusted by the parameter adjustment means, the informational data generation means having a memory for storing the coefficient data sets used in the estimation equation produced beforehand for each combination of the class detected by the class detection means and the values of the parameters of plural kinds, each parameter being adjusted by the parameter adjustment means, second data selection means for selecting second plural informational data sets located on a periphery of the objective position in the second information signal based on the first information signal, and calculation means for calculating and obtaining informational data set of the objective position according to the estimation equation using both the coefficient data set generated by the coefficient data generation means and the second plural informational data sets selected by the second data selection means.

Also, another method for processing an information signal in accordance with the invention by converting a first information signal containing plural informational data sets into a second information signal containing plural informational data sets, comprises a first step of selecting first plural informational data sets located on a periphery of an objective position in the second information signal based on the first information signal, a second step of detecting a class including informational data set of the objective position based on the first plural informational data sets selected at the first step, a third step of adjusting values of parameters of plural kinds, each parameter deciding a quality of an output obtained by the second information signal, and a fourth step of producing informational data set of the objective position in correspondence with the class detected at the second step and the values of the parameters of plural kinds, each parameter being adjusted at the third step.

Also, an information-providing medium in accordance with the invention provides a computer program for executing each of the steps of the above-mentioned method for processing information signal.

Additionally, an image signal processor in accordance with the invention for converting a first image signal containing plural pixel data sets into a second image signal containing plural pixel data sets, comprises data selection means for selecting plural pixel data sets located on a periphery of an objective position in the second image signal based on the first image signal, class detection means for detecting a class including pixel data set of the objective position based on the plural pixel data sets selected by the data selection means, parameter adjustment means for adjusting values of parameters of plural kinds, each parameter deciding a picture quality of an output obtained by the second image signal, pixel data production means for producing the pixel data set of the objective position in correspondence with the class detected by the class detection means and the values of parameters of plural kinds, each parameter being adjusted by the parameter adjustment means.

Also, an image display apparatus in accordance with the invention comprises image signal input means for inputting a first image signal containing plural pixel data sets, image signal processing means for converting the first image signal input by the image signal input means into a second image signal containing plural pixel data sets and then transmitting the second image signal, image display means for displaying an image obtained by the second image signal received from the image signal processing means on an image display element, and parameter adjustment means for adjusting values of parameters of plural kinds, each parameter deciding a picture quality of the image displayed on the image display device. This image signal processing means includes data selection means for selecting plural pixel data sets located on a periphery of an objective position in the second image signal based on the first image signal, class detection means for detecting a class including pixel data set of the objective position based on the first plural pixel data sets selected by the data selection means, pixel data production means for producing the pixel data set of the objective position in correspondence with the class detected by the detection means and values of the parameters of plural kinds, each parameter being adjusted by the parameter adjustment means.

According to the invention, first plural informational data sets located on a periphery of the objective position in the second information signal are selected on the basis of the first information signal. Based on the first plural informational data sets, a class including the informational data set of the objective position is then detected. For example, level distribution patterns of the first plural informational data sets are detected. Based on the level distribution patterns, the class including the informational data set of the objective position is in turn detected. The information signal here is an image signal or an audio signal, for example.

The parameter adjustment means adjusts values of the parameters of plural kinds to decide a quality of an output obtained by the second information signal. For example, if the information signal is an image one, the value of the parameter is adjusted to decide the picture quality of an image obtained by the second information signal (image signal). On the other hand, if the information signal is an audio one, the value of parameter is adjusted to decide the quality of a sound obtained by the second information signal (audio signal). For example, the parameter adjustment means may comprise display means for displaying an adjust position of each of the parameters of plural kinds and user operation means for permitting a user to adjust the values of the parameters of plural kinds with referencing contents displayed by this display means. As such, the user can operate the user operation means such as a pointing device to easily adjust the values of the parameters of plural kinds to a desired position.

In this configuration, informational data set of the objective position is produced corresponding to the detected class and the values of the adjusted parameters of plural kinds. Storage means, for example, stores the coefficient seed data set, which is coefficient data set in the production equation for producing coefficient data set used in the estimation equation and is obtained beforehand for each class. Using the coefficient seed data set and the values of the adjusted parameters, the coefficient data set used in the estimation equation is produced corresponding to the detected class and the values of the adjusted parameters of plural kinds. The second plural informational data sets located on a periphery of the objective position in the second information signal are also selected on the basis of the first information signal. Using this coefficient data set and the second plural informational data sets, the informational data set of the objective position is produced according to the estimation equation.

Also, for example, a memory stores coefficient data set used in an estimation equation produced beforehand for each combination of the class and the values of the parameters of plural kinds, and the coefficient data set in the estimation equation corresponding to the detected class and the values of adjusted the parameters of plural kinds is then read out of the memory. Simultaneously, second plural informational data sets located on a periphery of the objective position in the second information signal is selected on the basis of the first information signal. Using the coefficient data set and the second plural informational data sets, the informational data set of the objective position is produced according to the estimation equation.

Thus, according to the invention, the coefficient data set used in the estimation equation, the coefficient data set corresponding to any one of the values of the adjusted parameters of plural kinds, is obtained. Using the coefficient data set, informational data set of the objective position in the second information signal is produced according to the estimation equation. Therefore, it is possible to easily adjust a quality of an output such as picture quality of an image, obtained by the second information signal on the plural axes such as horizontal and vertical resolutions, and a noise cancellation degree and a horizontal/vertical resolution.

Additionally, a coefficient seed data production device in accordance with the invention for producing coefficient seed data set, the coefficient seed data set being coefficient data set in a production equation for producing coefficient data set used in an estimation equation for converting a first information signal containing plural informational data sets into a second information signal containing plural informational data sets, comprises signal processing means for processing a teacher signal corresponding to the second information signal to obtain an input signal corresponding to the first information signal, parameter adjustment means for adjusting values of parameters of plural kinds, each parameter deciding a quality of an output obtained from the input signal and corresponding to any one of parameters of plural kinds contained in the production equation, first data selection means for selecting first plural informational data sets located on a periphery of an objective position in the teacher signal based on the input signal, class detection means for detecting a class including informational data set of the objective position based on the first plural informational data sets selected by the first data selection means, second data selection means for selecting second plural informational data sets located on a periphery of the objective position in the teacher signal based on the input signal, normal equation production means for producing a normal equation for obtaining the coefficient seed data set for each class using the class detected by the class detection means, the second plural informational data sets selected by the second data selection means, and the informational data set of the objective position in the teacher signal, and coefficient seed data calculation means for solving the normal equation to obtain the coefficient seed data set for each class.

Also, a method for producing coefficient seed data set in accordance with the invention, the coefficient seed data set being coefficient data set in a production equation for producing coefficient data set used in an estimation equation for converting a first information signal containing plural informational data sets into a second information signal containing plural informational data sets, comprises a first step of processing a teacher signal corresponding to the second information signal to obtain an input signal corresponding to the first information signal, a second step of adjusting values of parameters of plural kinds, each parameter deciding a quality of an output obtained from the input signal and corresponding to any one of parameters of plural kinds contained in the production equation, a third step of selecting first plural informational data sets located on a periphery of an objective position in the teacher signal based on the input signal, a fourth step of detecting a class including informational data set of the objective position based on the first plural informational data sets selected at the third step, a fifth step of selecting second plural informational data sets located on a periphery of the objective position in the teacher signal based on the input signal, a sixth step of producing a normal equation for obtaining the coefficient seed data set for each class using the class detected at the fourth step, the second plural informational data sets selected at the fifth step, and the informational data set of the objective position in the teacher signal, and a seventh step of solving the normal equation to obtain the coefficient seed data set for each class.

Also, an information-providing medium in accordance with the invention provides a computer program for executing each of the steps of the above-mentioned method for producing coefficient seed data set.

According to the invention, a teacher signal corresponding to the second information signal is processed to obtain an input signal corresponding to the first information signal. In this case, each of the values of the parameters of plural kinds is adjusted to decide a quality of the output obtained from the input signal. For example, if the information signal is an image signal, each of the values of the parameters of plural kinds is adjusted to decide the picture quality of an image obtained from the input signal. If the information signal is an audio one, each of the values of the parameters of plural kinds is adjusted to decide the quality of a sound obtained from the input signal.

Based on this input signal are selected first plural informational data sets located on a periphery of an objective position in the teacher signal, and based on the first plural informational data sets is detected a class including the informational data set of the objective position. Based on this input signal are also selected second plural informational data sets located on a periphery of the objective position in the teacher signal.

In this configuration, each of the values of the parameters of plural kinds is adjusted in plural steps, and then, the normal equation for obtaining coefficient seed data set is produced for each class using the class including the informational data set of the objective position in the teacher signal, the selected second plural informational data sets, and the informational data set of the objective position in the teacher signal. The normal equation is then solved to obtain the coefficient seed data set for each class.

The coefficient seed data set here refers to coefficient data set in the production equation, which contains the parameters of plural kinds, for producing coefficient data set used in the estimation equation for converting the first information signal into the second information signal. Using the coefficient seed data set, it is possible to obtain the coefficient data set corresponding to arbitrarily values of the adjusted parameters of plural kinds according to the production equation. By thus adjusting each of the values of the parameters of plural kinds when the first information signal is converted into the second information signal according to the estimation equation, it is easily possible to adjust a quality of the output obtained by the second information signal on plural axes.

Also, a coefficient seed data production device in accordance with the invention for producing coefficient seed data set, the coefficient seed data set being coefficient data set in a production equation for producing coefficient data set used in an estimation equation for converting a first information signal containing plural informational data sets into a second information signal containing plural informational data sets, comprises signal processing means for processing a teacher signal corresponding to the second information signal to obtain an input signal corresponding to the first information signal, parameter adjustment means for adjusting values of parameters of plural kinds, each parameter deciding a quality of an output obtained from the input signal and corresponding to any one of parameters of plural kinds contained in the production equation, first data selection means for selecting first plural informational data sets located on a periphery of an objective position in the teacher signal based on the input signal, class detection means for detecting a class including informational data set of the objective position based on the first plural informational data sets selected by the first data selection means, second data selection means for selecting second plural informational data sets located on a periphery of the objective position in the teacher signal based on the input signal, first normal equation production means for producing a first normal equation for obtaining the coefficient data set used in the estimation equation for each combination of the class detected by the class detection means, the second plural informational data sets selected by the second data selection means, and the informational data set of the objective position in the teacher signal, coefficient data calculation means for solving the first normal equation to obtain the coefficient data set used in the estimation equation for the each combination, second normal equation production means for producing a second normal equation for obtaining the coefficient seed data set for each class using the coefficient data set for each combination obtained by the coefficient data calculation means, and coefficient seed data calculation means for solving the second normal equation to obtain the coefficient seed data set for each class.

Also, a method for producing coefficient seed data set in accordance with the invention, the coefficient seed data set being coefficient data set in a production equation for producing coefficient data set used in an estimation equation for converting a first information signal containing plural informational data sets into a second information signal containing plural informational data sets, comprises a first step of processing a teacher signal corresponding to the second information signal to obtain an input signal corresponding to the first information signal, a second step of adjusting values of parameters of plural kinds, each parameter deciding a quality of an output obtained from the input signal and corresponding to any one of parameters of plural kinds contained in the production equation, a third step of selecting first plural informational data sets located on a periphery of an objective position in the teacher signal based on the input signal, a fourth step of detecting a class including informational data set of the objective position based on the first plural informational data sets selected at the third step, a fifth step of selecting second plural informational data sets located on a periphery of the objective position in the teacher signal based on the input signal, a sixth step of producing a first normal equation for obtaining the coefficient data set used in the estimation equation for each combination of the class detected at the fourth step and the values of the parameters of plural kinds using the class detected at fourth step, the second plural informational data sets selected at the fifth step, and the informational data set of the objective position in the teacher signal, a seventh step of solving the first normal equation to obtain the coefficient data set used in the estimation equation for each combination, an eighth step of producing a second normal equation for obtaining the coefficient seed data set for each class using the coefficient data set for each combination obtained at the seventh step, and a ninth step of solving the second normal equation to obtain the coefficient seed data set for each class.

Also, an information-providing medium in accordance with the invention provides a computer program for executing each of the steps of the above-mentioned method for producing coefficient seed data set.

According to the invention, a teacher signal corresponding to the second information signal is processed to obtain an input signal corresponding to the first information signal. In this case, each of the values of the parameters of plural kinds is adjusted to decide a quality of the output obtained from the input signal. For example, if the information signal is an image signal, each of the values of the parameters of plural kinds is adjusted to decide the picture quality of an image obtained from the input signal. If the information signal is an audio one, each of the values of the parameters of plural kinds is adjusted to decide the quality of a sound obtained from the input signal.

Based on this input signal are selected first plural informational data sets located on a periphery of an objective position in the teacher signal, and based on the first plural informational data sets is detected a class including the informational data set of the objective position. Based on this input signal are also selected second plural informational data sets located on a periphery of the objective position in the teacher signal.

In this configuration, each of the values of the parameters of plural kinds is sequentially adjusted in plural steps, and then, the first normal equation for obtaining coefficient data set used in the estimation equation is produced for each combination of the class and the values of the parameters of plural kinds using the class including the informational data set of the objective position in the teacher signal, the selected second plural informational data sets, and the informational data set of the objective position in the teacher signal. The first normal equation is then solved to obtain the coefficient data set used in the estimation equation for each combination.

Further, the second normal equation for obtaining the coefficient seed data set is produced for each class using the coefficient data set for each combination and then, the second normal equation is in turn solved to obtain the coefficient seed data set for each class.

The coefficient seed data set here refers to coefficient data set in the production equation, which contains the parameters of plural kinds, for producing coefficient data set used in the estimation equation for converting the first information signal into the second information signal. Using the coefficient seed data set, it is possible to obtain the coefficient data set corresponding to arbitrarily values of the adjusted parameters of plural kinds according to the production equation. By thus adjusting the values of the parameters of plural kinds when converting the first information signal into the second information signal according to the estimation equation, it is easily possible to adjust a quality of the output obtained by the second information signal on plural axes.

Also, a coefficient data production device in accordance with the invention for producing coefficient data set used in an estimation equation for converting a first information signal containing plural informational data sets into a second information signal containing plural informational data sets, comprises signal processing means for processing a teacher signal corresponding to the second information signal to obtain an input signal corresponding to the first information signal, parameter adjustment means for adjusting values of parameters of plural kinds, each parameter deciding a quality of an output obtained from the input signal, first data selection means for selecting first plural informational data sets located on a periphery of the objective position in the teacher signal based on the input signal, class detection means for detecting a class including the informational data set of the objective position based on the first plural informational data sets selected by the first data selection means, second data selection means for selecting second plural informational data sets located on a periphery of the objective position in the teacher signal based on the input signal, normal equation production means for producing a normal equation for obtaining the coefficient data set used in the estimation equation for each combination of the class detected by the class detection means and the values of the parameters of plural kinds using thus detected class, the second plural informational data sets selected by the second data selection means, and the informational data set of the objective position in the teacher signal, and coefficient data calculation means for solving the normal equation to obtain the coefficient data set for each combination.

Also, a method for producing the coefficient data set in accordance with the invention, the coefficient data set being the coefficient data set used in an estimation equation for converting a first information signal containing plural informational data sets into a second information signal containing plural informational data sets, comprises a first step of processing a teacher signal corresponding to the second information signal to obtain an input signal corresponding to the first information signal, a second step of adjusting values of parameters of plural kinds, each parameter deciding a quality of an output obtained from the input signal, a third step of selecting first plural informational data sets located on a periphery of the objective position in the teacher signal based on the input signal, a fourth step of detecting a class including the informational data set of the objective position based on the first plural informational data sets selected at the third step, a fifth step of selecting second plural informational data sets located on a periphery of the objective position in the teacher signal based on the input signal, a sixth step of producing a normal equation of obtaining the coefficient data set used in the estimation equation for combination of the class detected at the fourth step and the values of the parameters of plural kinds, using thus detected class, the second plural informational data sets selected at the fifth step, and the informational data set of the objective position in the teacher signal, and seventh step of solving the normal equation produced at the sixth step to obtain the coefficient data set for each combination.

Also, an information-providing medium in accordance with the invention provides a computer program for executing each of the steps of the above-mentioned method for producing the coefficient data set.

According to the invention, the teacher signal corresponding to the second information signal is processed to obtain the input signal corresponding to the first information signal. In this case, a quality of the output obtained from the input signal is decided by each of the values of the adjusted parameters of plural kinds. For example, if the information signal is an image signal, each of the values of the parameters of plural kinds is adjusted to decide the picture quality of an image obtained from the input signal. If the information signal is an audio one, each of the values of the parameters of plural kinds is adjusted to decide the quality of a sound obtained from the input signal.

Based on this input signal are selected first plural informational data sets located on a periphery of an objective position in the teacher signal, and based on the first plural informational data sets is detected the class including the informational data set of the objective position. Based on the input signal are also selected second plural informational data sets located on a periphery of the objective position in the teacher signal.

In this configuration, each of the values of the parameters of plural kinds is adjusted in plural steps, and then, the normal equation for obtaining coefficient data used in the estimation equation is produced for each combination of the class including the informational data set of the objective position in the teacher signal and the values of the parameters of plural kinds, using the class, the selected second plural informational data sets, and the informational data set of the objective position in the teacher signal. The normal equation is then solved to obtain the coefficient data set for each combination.

Although according to the invention, coefficient data set in the estimation equation for converting the first information signal into the second information signal is produced, informational data set of the objective position is calculated according to the estimation equation selectively using the class including the informational data set of the objective position in the second information signal and the coefficient data set corresponding to the values of the adjusted parameters of plural kinds when converting the first information signal into the second information signal. Thus, when converting the first information signal into the second information signal according to the estimation equation, it is easily capable of adjusting the quality of the output obtained by the second information signal on plural axes by adjusting the values of the parameters of plural kinds.

BRIEF DESCRIPTION OF THE DRAWINGS

FIG. 11 is another illustration explaining a pixel position relationship between the 525i signal and the 525p signal and another example of a space class tap;

FIG. 15 is another illustration explaining a pixel position relationship between the 525i signal and the 1050i signal and another example of a motion class tap;

FIG. 16 is an illustration explaining line speed-doubling processing for transmitting the 525p signal;

FIG. 17 is an illustration showing concept of one example of a method for producing coefficient seed data sets;

FIG. 18 is a block diagram showing a configuration example of a coefficient seed data production device;

BEST MODE FOR CARRYING OUT THE INVENTION

Figure 1:
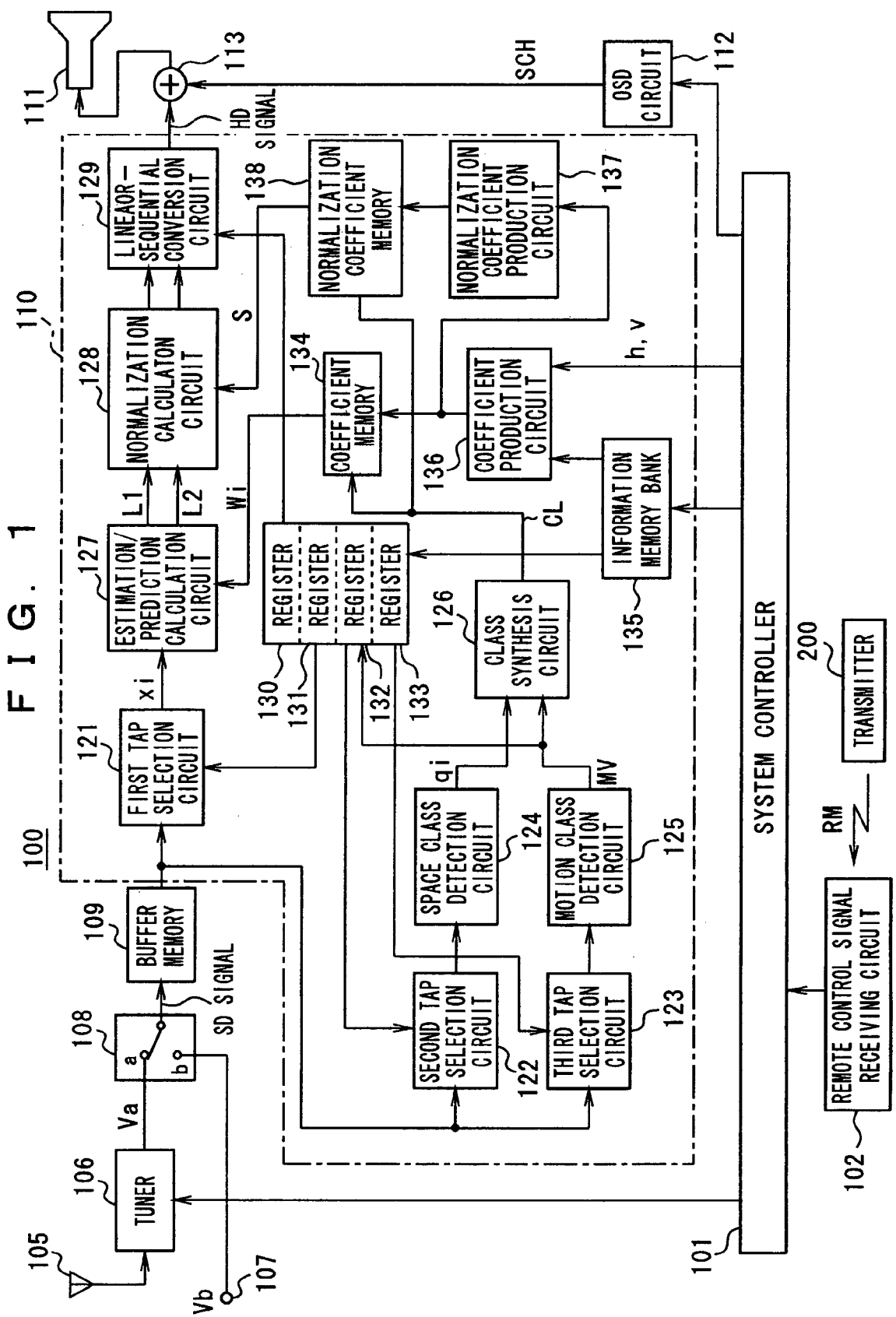
FIG. 1 is a block diagram showing a configuration of a TV receiver according to an embodiment of the invention.

The following will describe embodiments of the invention with reference to the drawings. FIG. 1 shows a configuration of a TV receiver 100 according to an embodiment of the invention. The TV receiver 100 receives a 525i signal as a Standard Definition (SD) signal from a broadcast signal and then converts this 525i signal into a 525p or 1050i signal as a High Definition (HD) signal to display an image by means of the 525p or 1050i signal.

Here, the 525i signal refers to an interlacing-system image signal having 525 lines, the 525p signal refers to a progressive-system (non-interlacing-system) image signal having 525 lines, and the 1050i signal refers to an interlacing-system image signal having 1050 lines.

The TV receiver 100 comprises a system controller 101 with a microcomputer for controlling the operations of the overall system, and a remote control signal receiving circuit 102 for receiving a remote control signal. The remote control signal receiving circuit 102 is connected, in configuration, to the system controller 101, and it is constituted so as to receive a remote control signal RM which a remote control transmitter 200 transmits when the user operates the transmitter 200 and then to supply the system controller 101 with an operation signal corresponding to the signal RM.

Also, the TV receiver 100 also comprises a reception antenna 105, a tuner 106 for receiving a broadcast signal (RF modulated signal) captured by the reception antenna 105 and performing processing such as channel selection processing, intermediate-frequency amplification processing, wave detection processing to obtain the above-mentioned SD signal Va (525i signal), an external input terminal 107 for inputting an external SD signal Vb (525i signal), a transfer switch 108 for selectively transmitting any one of the SD signals Va and Vb, and a buffer memory 109 for temporarily storing the SD signal received from the transfer switch 108.

The SD signal Va transmitted from the tuner 106 is supplied to the a-side fixed terminal of the transfer switch 108, while the SD signal Vb received through the external input terminal 107 is supplied to the b-side fixed terminal of the transfer switch 108. The system controller 101 controls the transfer operations of the transfer switch 108.

Also, the TV receiver 100 comprises an image signal processing section 110 for converting the SD signal (525i signal) temporarily stored in the buffer memory 109 into the HD signal (525p or 1050i signal), a display section 111 for displaying an image produced by means of the HD signal received from the image signal processing section 110, an On-Screen Display (OSD) circuit 112 for generating a display signal SCH for displaying characters, graphics, etc. on a screen of the display section 111, and a synthesizer 113 for synthesizing the display signal SCH and the HD signal received from the image signal processing section 110 to then supply it to the display section 111.

The display section 111 comprises a Cathode Ray Tube (CRT) or a flat panel display such as a Liquid Crystal Display (LCD). Also, the OSD circuit 112 generates the display signal SCH under the control of the system controller 101.

The following will describe the operations of the TV receiver 100 with reference to FIG. 1.

If the user operates the remote control transmitter 200 to select a mode in which an image according to the SD signal Va transmitted from the tuner 106 is displayed, the transfer switch 108 is connected to the a-side terminal under the control of the system controller 101 so that the SD signal Va can be transmitted from the transfer switch 108. If the user operates the remote control transmitter 200 to select a mode in which an image according to the SD signal Vb received through the external input terminal 107 is displayed, the transfer switch 108 is connected to the b-side terminal under the control of the system controller 101 so that the SD signal Vb can be transmitted from the transfer switch 108.

The SD signal (525i signal) thus transmitted from the transfer switch 108 is recorded on the buffer memory 109, which temporarily stores it. Then, the SD signal temporarily stored in the buffer memory 109 is supplied to the image signal processing section 110, which converts it into an HD signal (525p or 1050i signal). That is, the image signal processing section 110 obtains pixel data sets constituting the HD signal (hereinafter called "HD pixel data sets") from pixel data sets constituting the SD signal (hereinafter called "SD pixel data sets"). In this case, the user can select either the 525p signal or the 1050i signal when he or she operates the remote control transmitter 200. The HD signal transmitted from the image signal processing section 110 is supplied through the synthesizer 113 to the display section 111, which then displays an image based on the HD signal on its screen.

Also, although not described in the above, the user can operate the remote control transmitter 200 to adjust the horizontal and vertical resolutions of the image displayed on the screen of the display section 111 smoothly without steps as mentioned above. The image signal processing section 110 calculates HD pixel data sets according to an estimation equation, which will be described later. As coefficient data sets to be used in this estimation equation, the data sets corresponding to parameters h and v for deciding the respective horizontal and vertical resolutions adjusted by the user through operations of the remote control transmitter 200 are produced according to a production equation containing these parameters h, v and are used. As such, the horizontal and vertical resolutions of the image based on the HD signal transmitted from the image signal processing section 110 result in a correspondence with the adjusted parameters h and v, respectively.

Figure 2:
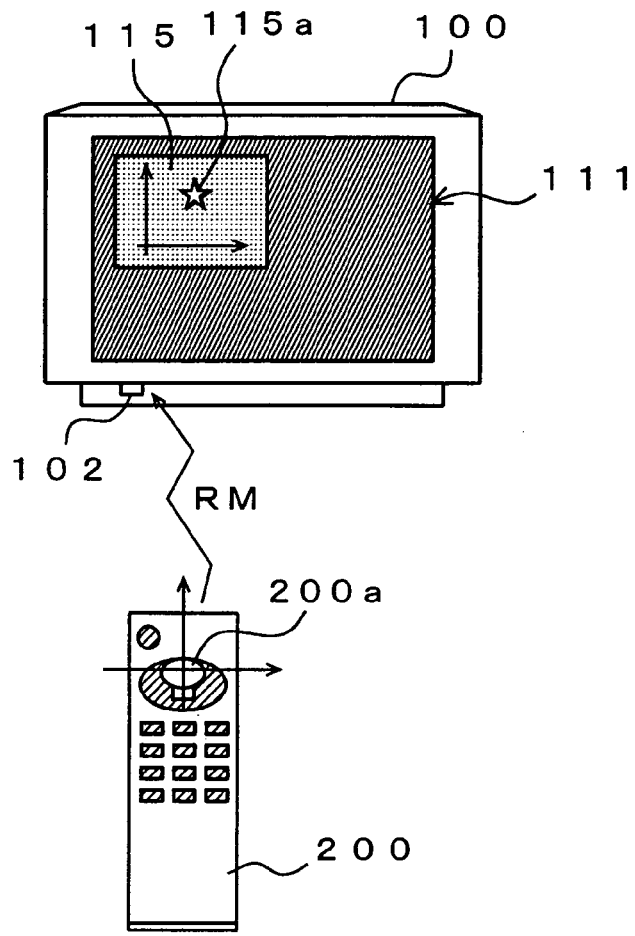
FIG. 2 is an illustration showing an example of a user interface for adjusting a picture quality.

FIG. 2 shows one example of a user interface for adjusting the parameters h and v. In adjustment, the display section 111 displays the adjustment screen 115 as OSD display wherein the adjustment positions of the parameters, h and v is indicated by a start-marked icon 115a. Also, the remote control transmitter 200 comprises a joystick 200a as user operation means.

Figure 3:
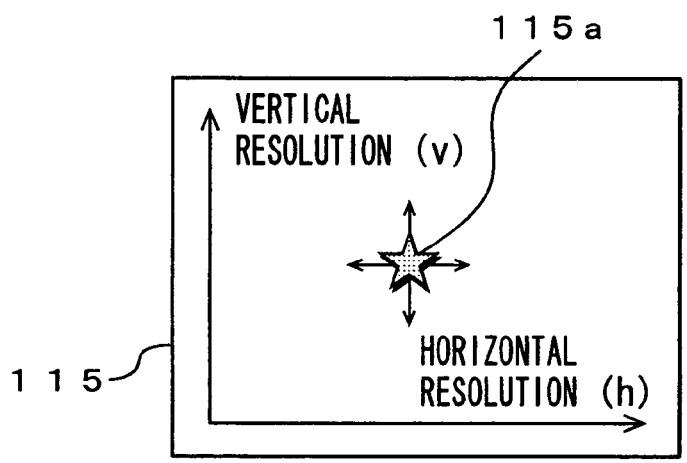
FIG. 3 is an expanded view showing an adjustment screen.

The user can operate the joystick 200a to move the icon 115a on the adjustment screen 115, thereby arbitrarily adjusting a value of each of the parameters h and v for deciding the horizontal and vertical resolutions. FIG. 3 shows an expanded part of the adjustment screen 115. When the icon 115a moves from side to side, the value of the parameter h for deciding the horizontal resolution can be adjusted, while when it moves up and down, the value of the parameter v for deciding the vertical resolution can be adjusted. The user can easily adjust the values of the parameters h and/or v with referencing the contents of the adjustment screen 115 displayed on the display section 111.

Incidentally, the remote control transmitter 200 may be equipped with, in place of the joystick 200a, any other pointing device such as a mouse or a track ball. Further, the values of the parameters h and v adjusted by the user may be displayed digitally on the adjustment screen 115.

The following will describe the details of the image signal processing section 110. The image signal processing section 110 includes first through third tap selection circuits 121 to 123 each for selectively extracting, from the SD signal (525i signal) stored in the buffer memory 109, plural SD pixel data sets located on a periphery of an objective position in the HD signal (1050i or 525p signal) and for transmitting them.

The first tap selection circuit 121 selectively extracts SD pixel data sets for use in prediction (hereinafter called "prediction tap"). The second tap selection circuit 122 selectively extracts SD pixel data sets for use in class grouping (hereinafter called "space class tap") corresponding to the distribution pattern of the levels of SD pixel data sets. The third tap selection circuit 123 selectively extracts SD pixel data sets for use in class grouping (hereinafter called "motion class tap") corresponding to motion. Note here that, if the space class is decided using SD pixel data sets that belong to a plurality of fields, this space class also contains motion information.

Figure 4:
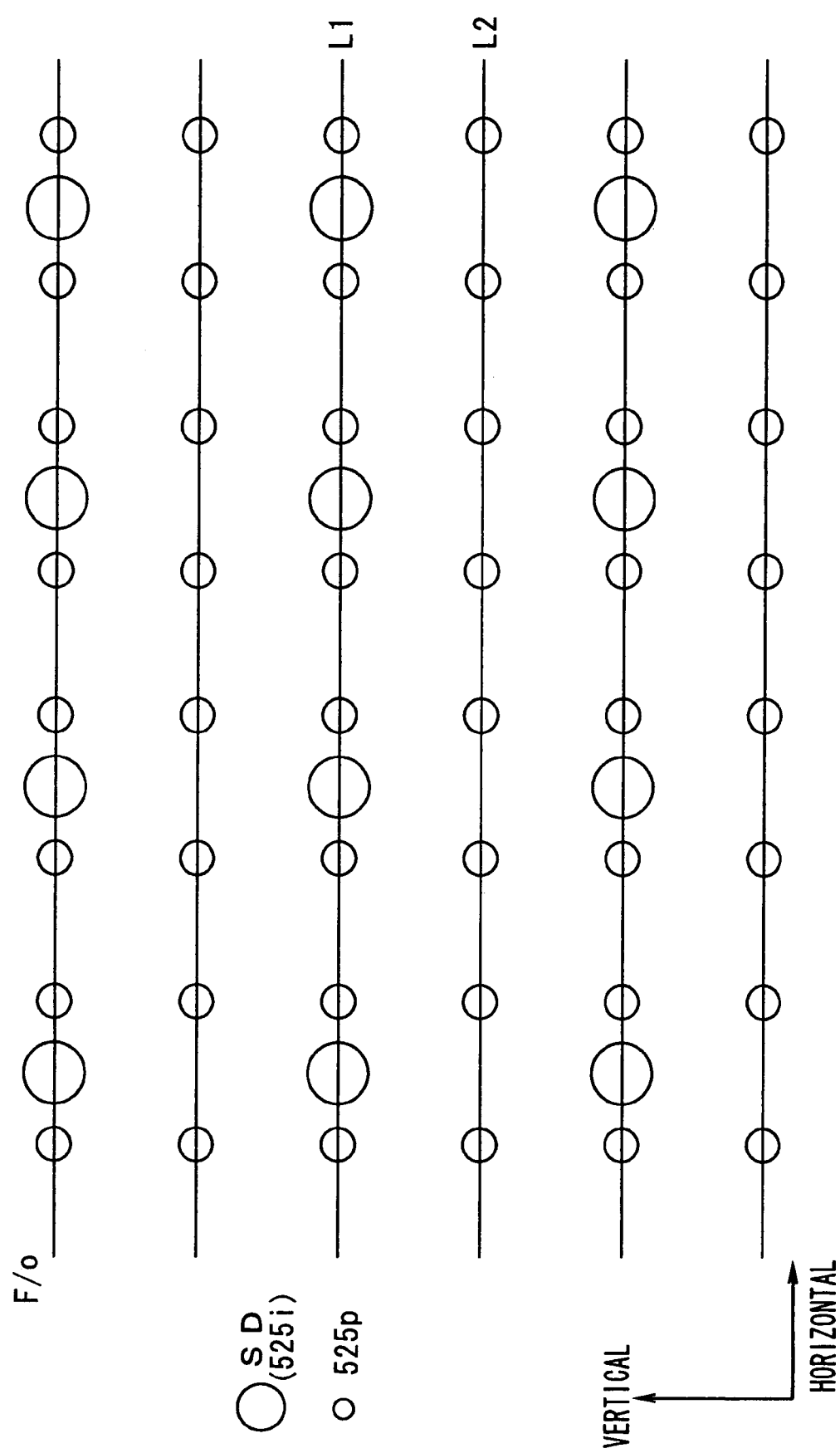
FIG. 4 is an illustration explaining a pixel position relationship between a 525i signal and a 525p signal.

FIG. 4 shows a pixel position relationship of odd-number (o) fields of a certain frame (F) between the 525i signal and the 525p signal. A larger dot represents a pixel of the 525i signal and a smaller dot represents a pixel of the 525p signal to be transmitted. In an even-number (e) field, a line of the 525i signal is shifted by a 0.5 line in space. As shown in FIG. 4, as the pixel data sets of the 525p signal are there present line data sets L1 at the same position as the line of the 525i signal, and line data sets L2 at the intermediate line between the upper and lower lines of the 525i signal. Each line of the 525p signal has pixels twice as many as those of each line of the 525i signal.

Figure 5:
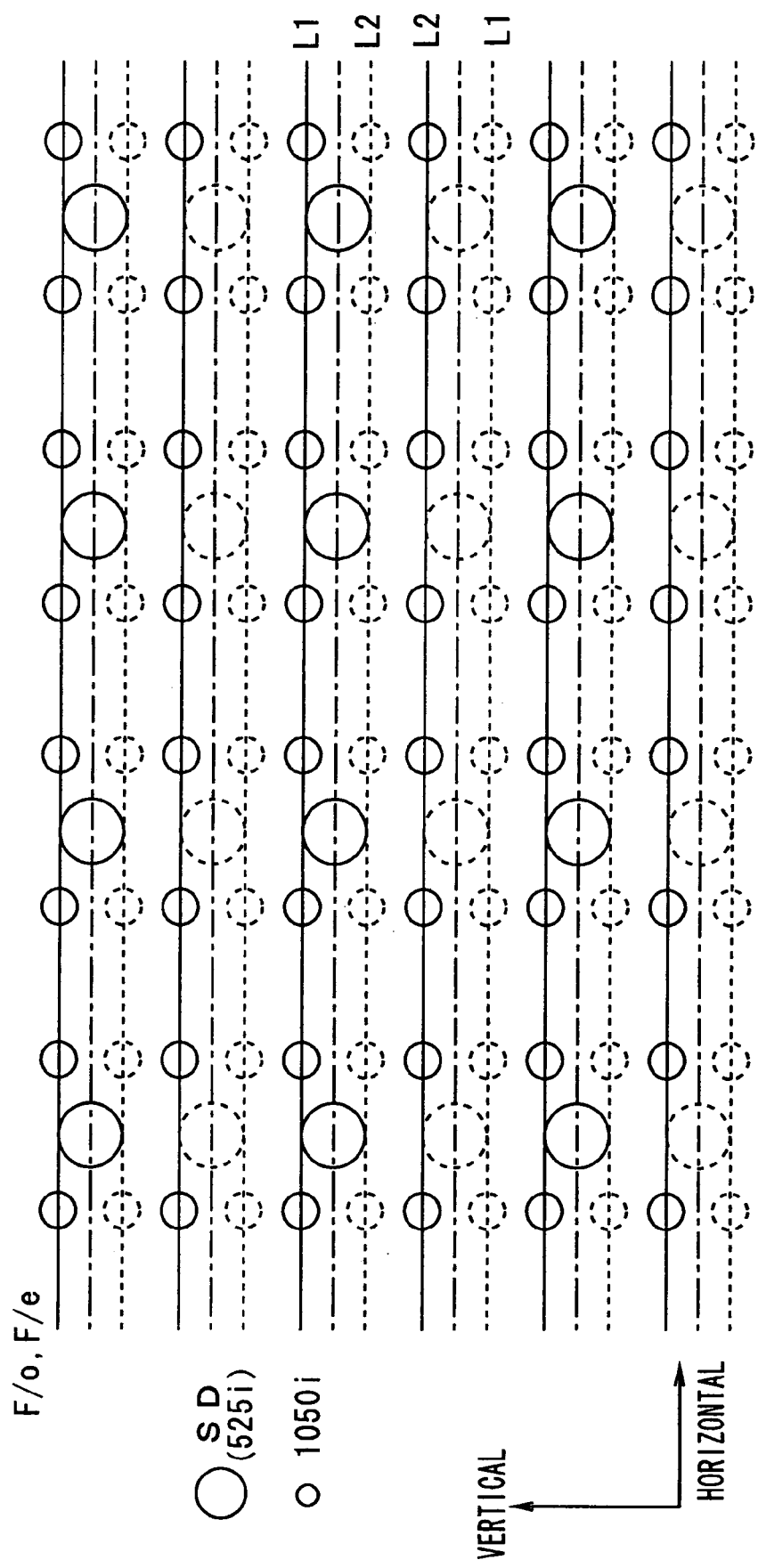
FIG. 5 is an illustration explaining a pixel position relationship between a 525i signal and a 1050i signal.

FIG. 5 is an illustration explaining a pixel position relationship of a certain frame (F) between the 525i signal and the 1050i signal. In the illustration, a solid line indicates the pixel position of an odd-number (o) field and a broken line indicates that of an even-number (e) field. A larger dot represents a pixel of the 525i signal and a smaller dot represents a pixel of the 1050i signal to be transmitted. As can be seen from FIG. 5, as the pixel data sets of the 1050i signal are there present line data sets L1 and L1' near the line of the 525i signal and line data sets L2 and L2' remote from the line of the 525i signal. The L1 and L2, herein, represent line data sets of an odd-number field and the L1' and L2' represent line data sets of an even-number field. Each line of the 1050i signal also has pixels twice as many as those of each line of the 525i signal.

Figure 6:
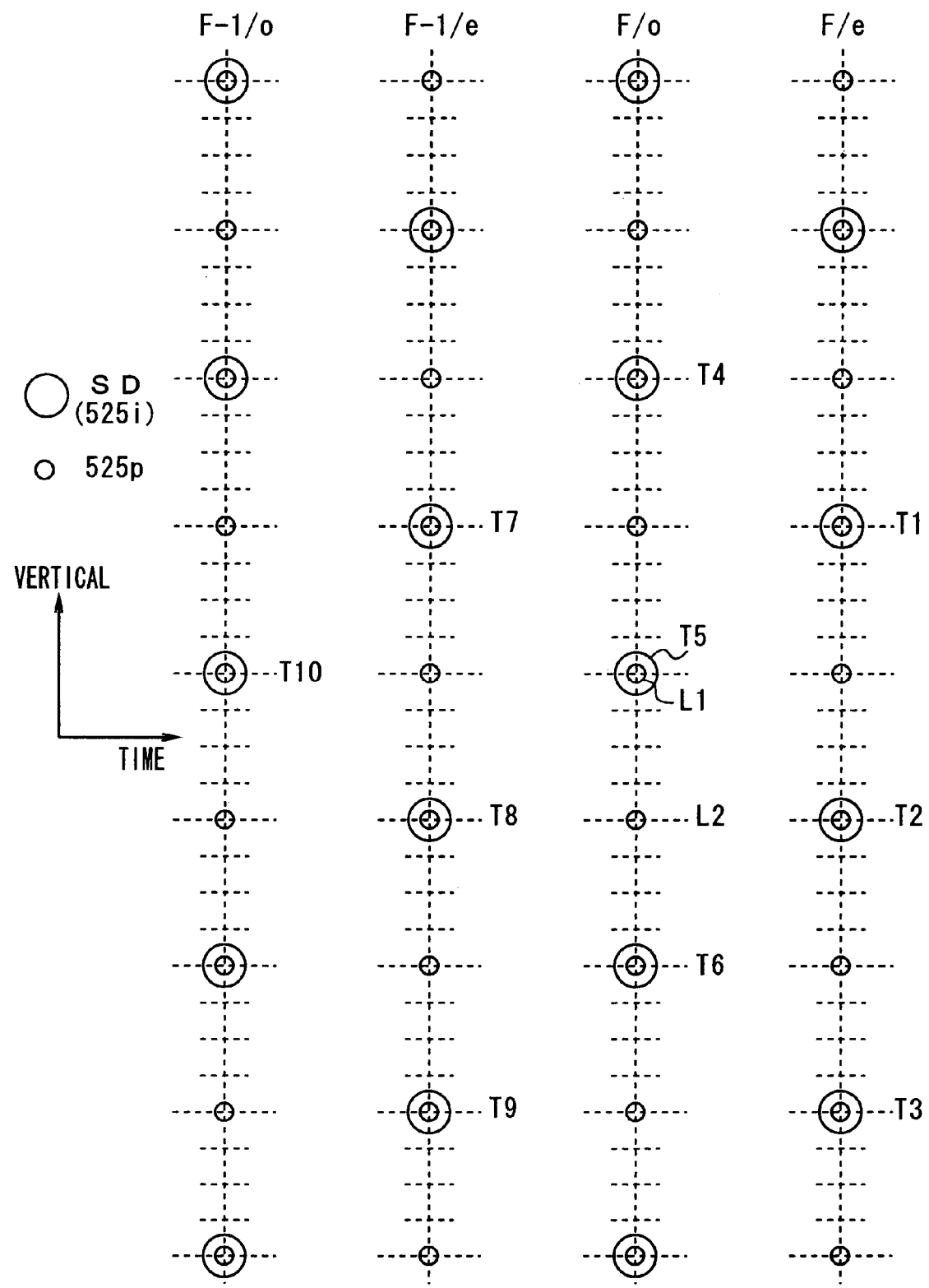
FIG. 6 is an illustration explaining a pixel position relationship between a 525i signal and a 525p signal and an example of a prediction tap.
Figure 7:
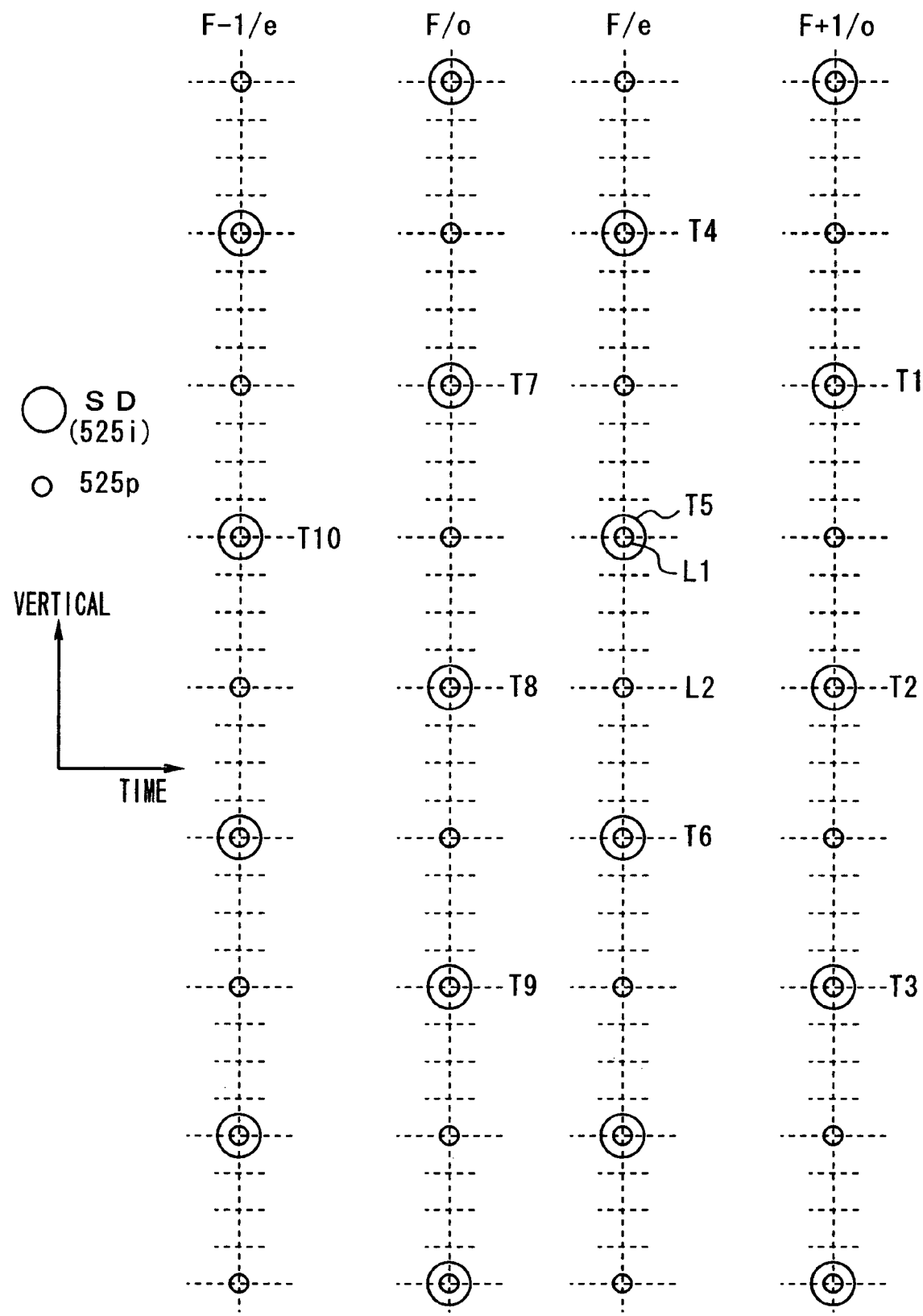
FIG. 7 is another illustration explaining a pixel position relationship between the 525i signal and the 525p signal and another example of a prediction tap.

FIGS. 6 and 7 show specific examples of a prediction tap (SD pixel) selected by the first tap selection circuit 121 when the 525i signal is converted into the 525p signal. FIGS. 6 and 7 show vertical pixel position relationship between the odd-number (o) and even-number (e) fields of time-wise consecutive frames F−1, F, and F+1.

As shown in FIG. 6, the prediction tap used when line data set L1 or L2 of a field F/o is predicted includes SD pixels T1, T2, and T3 that are contained in the next field F/e and present space-wise in the vicinity of a pixel (that is, pixel of an objective position) of a 525p signal to be produced, SD pixels T4, T5, and T6 that are contained in the field F/o and present space-wise in the vicinity of the pixel of the 525p signal to be produced, SD pixels T7, T8, and T9 that are contained in the previous field F−1/e and present space-wise in the vicinity of the pixel of the 525p signal to be produced, and SD pixel T10 that is contained in the further previous field F−1/o and present space-wise in the vicinity of a pixel of the 525p signal to be produced.

As shown in FIG. 7, a prediction tap used when line data set L1 or L2 of a field F/e is predicted includes SD pixels T1, T2, and T3 that are contained in the next field F+1/o and present space-wise in the vicinity of a pixel of the 525p signal to be produced, SD pixels T4, T5, and T6 that are contained in the field F/e and present space-wise in the vicinity of a pixel of the 525p signal to be produced, SD pixels T7, T8, and T9 that are contained in the previous field F/o and present space-wise in the vicinity of a pixel of the 525p signal to be produced, and SD pixel T10 that is contained in the further previous field F−1/e and present space-wise in the vicinity of a pixel of the 525p signal to be produced.

Note here that SD pixel T9 may not be selected as a prediction tap when line data set L1 is predicted, while SD pixel T4 may not be selected as a prediction tap when line data set L2 is predicted.

Figure 8:
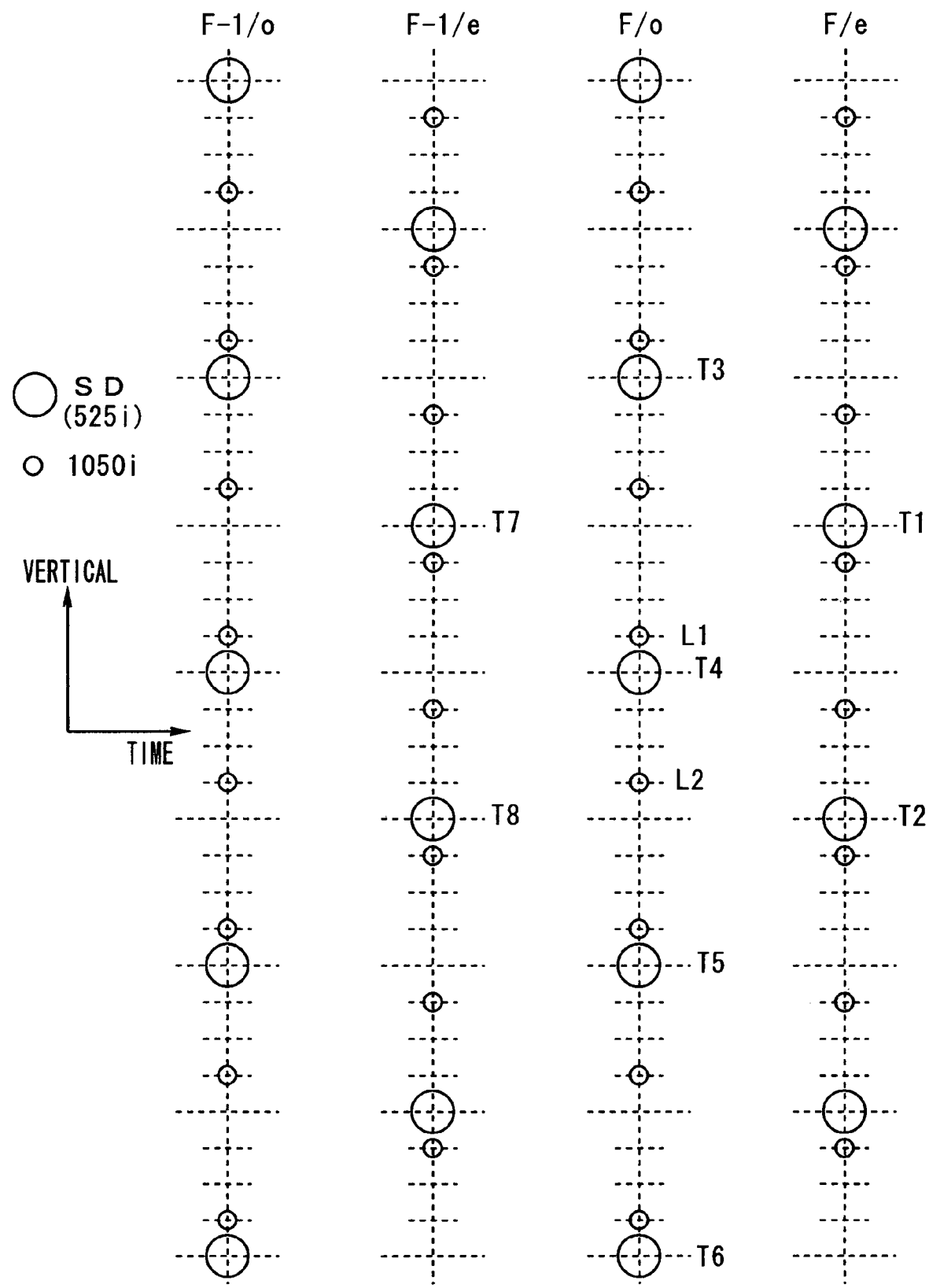
FIG. 8 is another illustration explaining a pixel position relationship between the 525i signal and the 1050i signal and another example of a prediction tap.
Figure 9:
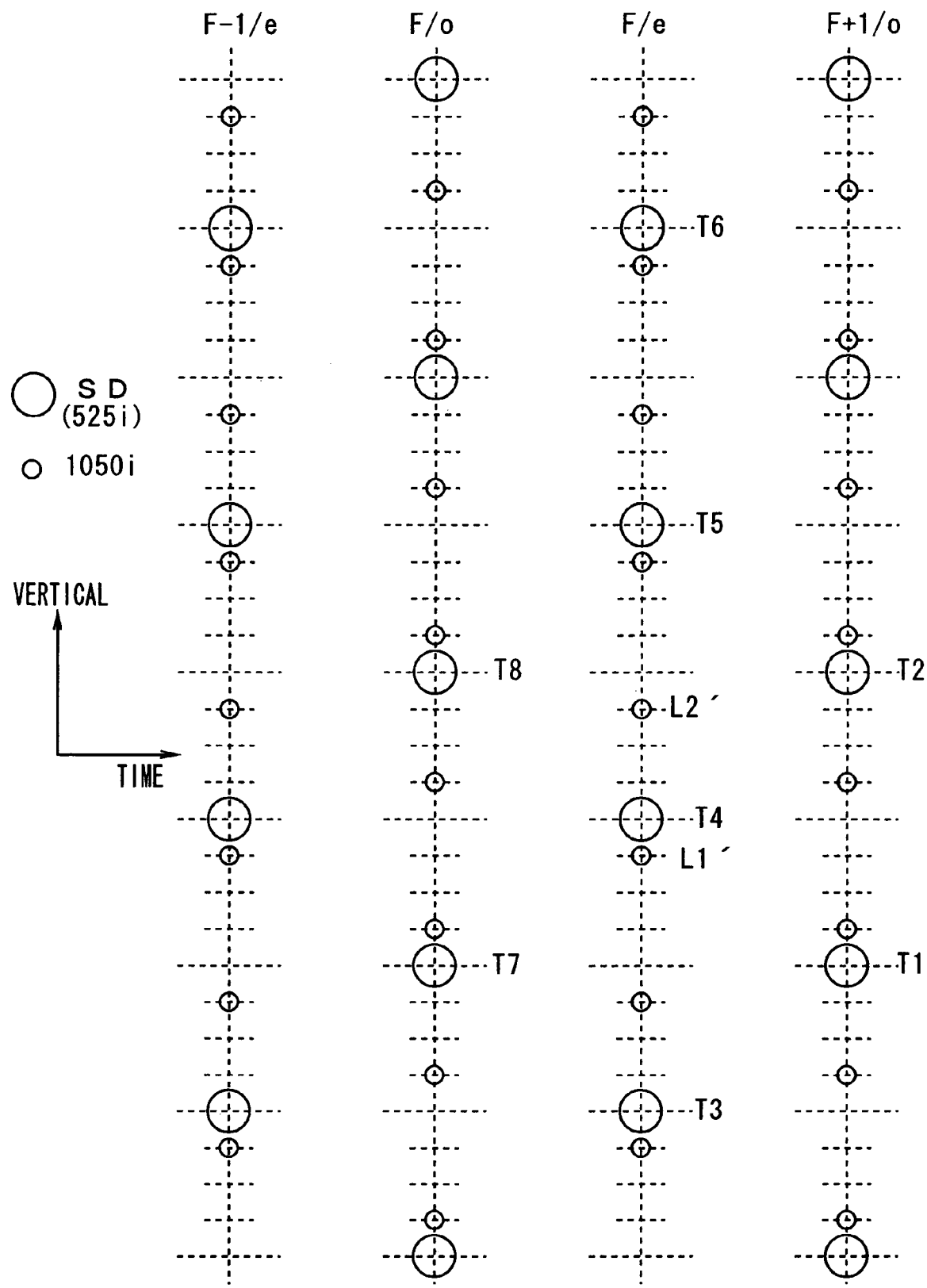
FIG. 9 is another illustration explaining a pixel position relationship between the 525i signal and the 1050i signal and another example of a prediction tap.

FIGS. 8 and 9 show specific examples of a prediction tap (SD pixel) selected by the first tap selection circuit 121 when the 525i signal is converted into the 1050i signal. FIGS. 8 and 9 also show vertical pixel position relationship between the odd-number (o) and even-number (e) fields of time-wise consecutive frames F−1, F, and F+1.

As shown in FIG. 8, a prediction tap used when line data set L1 or L2 of a field F/o is predicted includes SD pixels T1 and T2 that are contained in the next field F/e and present space-wise in the vicinity of a pixel (that is, pixel of an objective position) of a 1050i signal to be produced, SD pixels T3, T4, T5, and T6 that are contained in the field F/o and present space-wise in the vicinity of a pixel of the 525p signal to be produced, and SD pixels T7 and T8 that are contained in the previous field F−1/e and present space-wise in the vicinity of a pixel of the 1050i signal to be produced.

As shown in FIG. 9, a prediction tap used when line data set L1' or L2' of the field F/e is predicted includes SD pixels T1 and T2 that are contained in the next field F+1/o and present space-wise in the vicinity of a pixel of a 1050ip signal to be produced, SD pixels T3, T4, T5, and T6 that are contained in the field F/e and present space-wise in the vicinity of a pixel of the 1050i signal to be produced, and SD pixels T7 and T8 that are contained in the previous field F/o and present space-wise in the vicinity of a pixel of the 525p signal to be produced.

Note here that SD pixel T6 may not be selected as a prediction tap when line data sets L1 and L1' are predicted, while SD pixel T3 may not be selected as a prediction tap when line data sets L2 and L2' are predicted.

Further, as shown in FIGS. 6-9, in addition to the SD pixels present at the same position in a plurality of fields, one or more SD pixels in the horizontal direction may be selected as a prediction tap.

Figure 10:
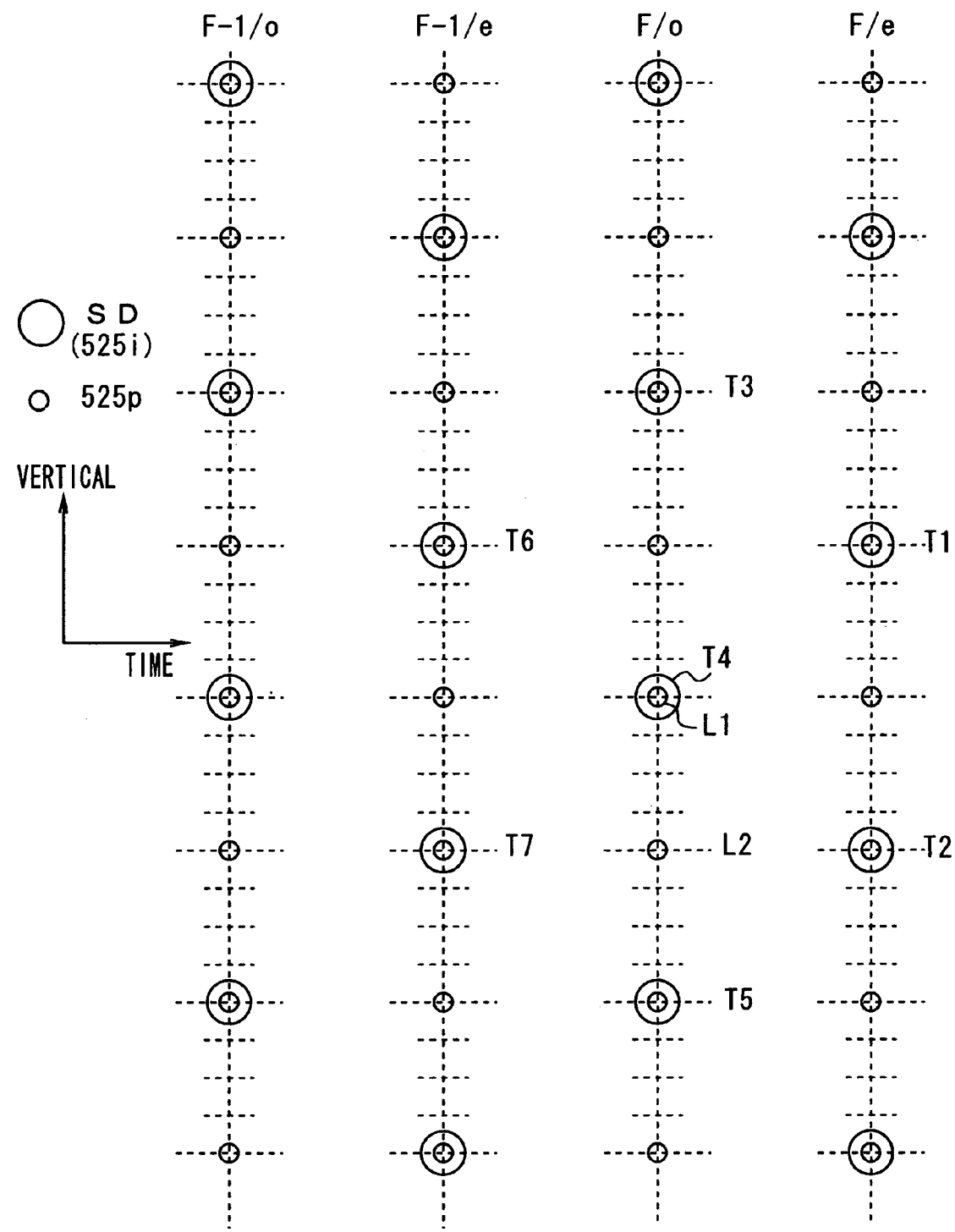
FIG. 10 is a further illustration explaining a pixel position relationship between the 525i signal and the 525p signal and an example of a space class tap.

FIGS. 10 and 11 show specific examples of a space class tap (SD pixel) selected by the second tap selection circuit 122 when the 525i signal is converted into the 525p signal. FIGS. 10 and 11 show also the vertical pixel position relationship between odd-number (o) and even-number fields of time-wise consecutive frames F−1, F, and F+1.

As shown in FIG. 10, a space class tap used when line data set L1 or L2 of a field F/o is predicted includes SD pixels T1 and T2 that are contained in the next field F/e and present space-wise in the vicinity of a pixel (that is, pixel of an objective position) of a 525p signal to be produced, SD pixels T3, T4, and T5 that are contained in the field F/o and present space-wise in the vicinity of a pixel of the 525p signal to be produced, and SD pixels T6 and T7 that are contained in the previous field F−1/e and present space-wise in the vicinity of a pixel of the 525p signal to be produced.

As shown in FIG. 11, a space class tap used when line data set L1 or L2 of a field F/e is predicted includes SD pixels T1 and T2 that are contained in the next field F+1/o and present space-wise in the vicinity of a pixel of the 525p signal to be produced, SD pixels T3, T4, T5, and T6 that are contained in the field F/e and present space-wise in the vicinity of a pixel of the 525p signal to be produced, and SD pixels T6 and T7 that are contained in the previous field F/o and present space-wise in the vicinity of a pixel of the 525p signal to be produced.

Note here that SD pixel T7 may not be selected as a space class tap when line data set L1 is predicted, while SD pixel T6 may not be selected as a space class tap when line data set L2 is predicted.

Figure 12:
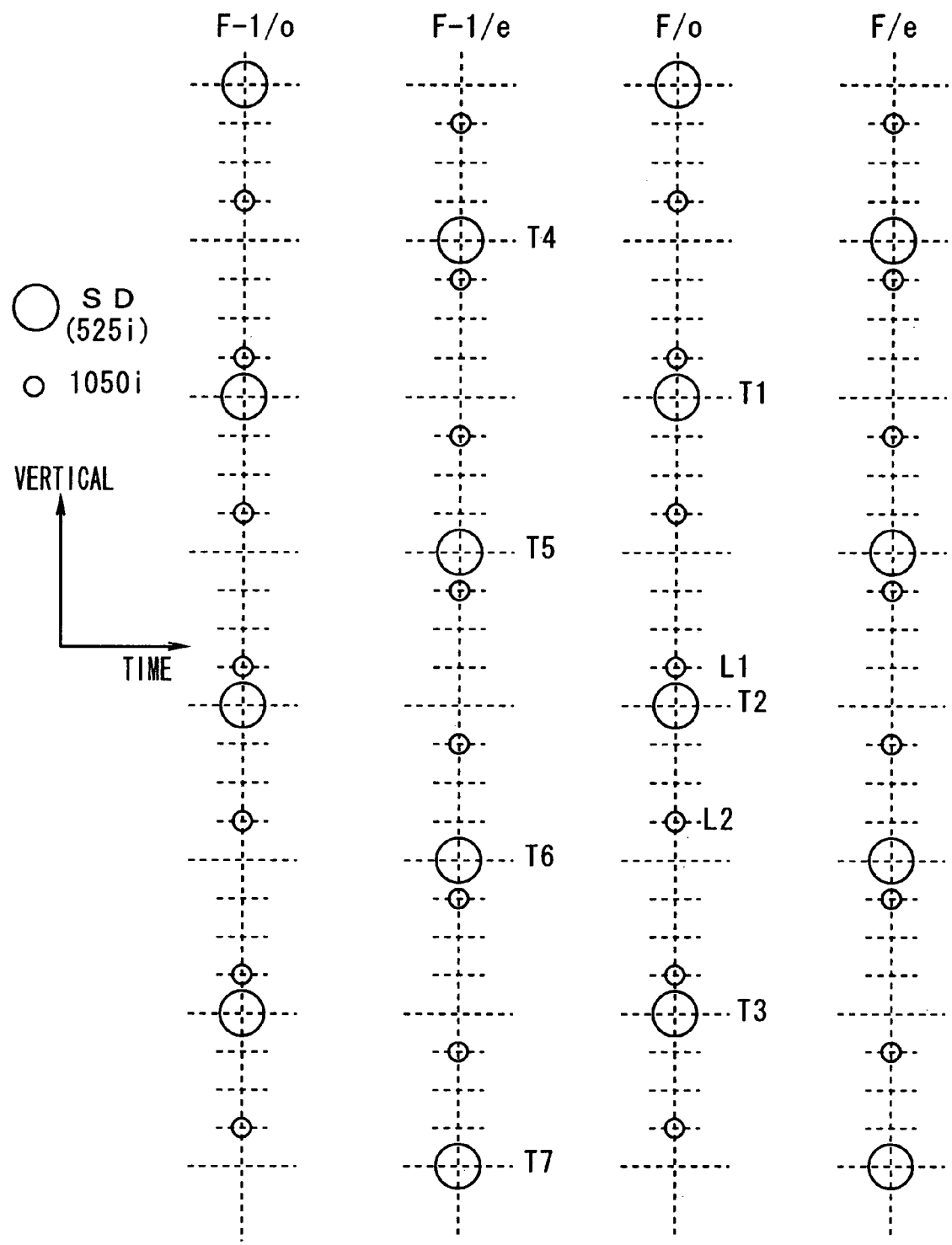
FIG. 12 is a further illustration explaining a pixel position relationship between the 525i signal and the 1050i signal and a further example of a space class tap.
Figure 13:
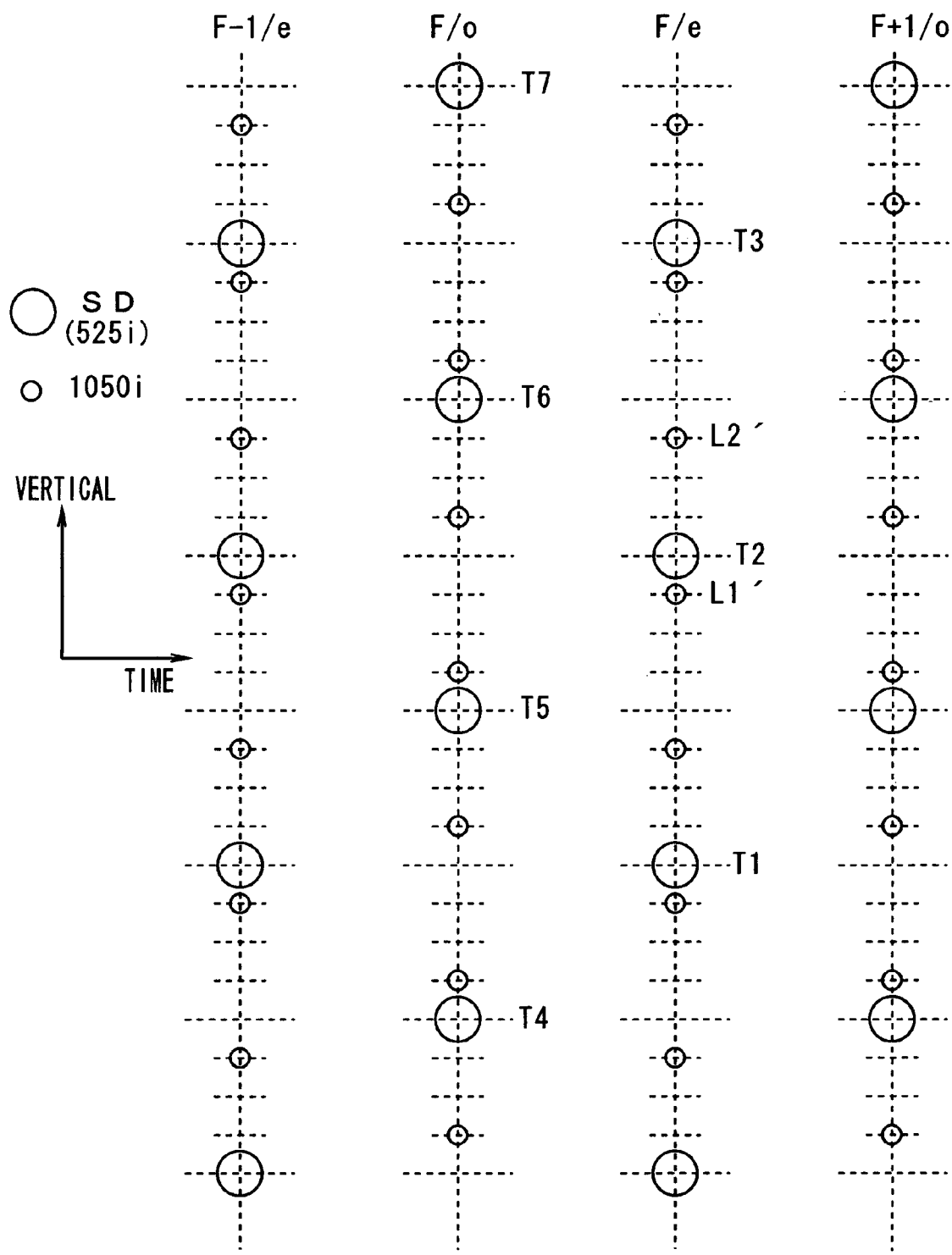
FIG. 13 is an additional illustration explaining a pixel position relationship between the 525i signal and the 1050i signal and an additional example of a space class tap.

FIGS. 12 and 13 show specific examples of a space class tap (SD pixel) selected by the second tap selection circuit 122 when the 525i signal is converted into the 1050i signal. FIGS. 12 and 13 also show the vertical pixel position relationship between odd-number (o) and even-number fields of time-wise consecutive frames F−1, F, and F+1.

As shown in FIG. 12, a space class tap used when line data set L1 or L2 of a field F/o is predicted includes SD pixels T1, T2, and T3 that are contained in the field F/o and present space-wise in the vicinity of a pixel (that is, pixel of an objective position) of a 1050i signal to be produced, and SD pixels T4, T5, T6, and T7 that are contained in the previous field F−1/e and present space-wise in the vicinity of a pixel of the 1050i signal to be produced.

As shown in FIG. 13, a space class tap used when line data set L1' or L2' of a field F/e is predicted includes SD pixels T1, T2, and T3 that are contained in the field F/e and present space-wise in the vicinity of a pixel of the 1050i signal to be produced, and SD pixels T4, T5, T6, and T7 that are contained in the previous field F/o and present space-wise in the vicinity of a pixel of the 1050i signal to be produced.

Note here that SD pixel T7 may not be selected as a space class tap when line data sets L1 and L1' are predicted, while SD pixel T4 may not be selected as a space class tap when line data sets L2 and L2' are predicted.

Further, as shown in FIGS. 10-13, in addition to the SD pixels present at the same position in a plurality of fields, one or more SD pixels in the horizontal direction may be selected as a space class tap.

Figure 14:
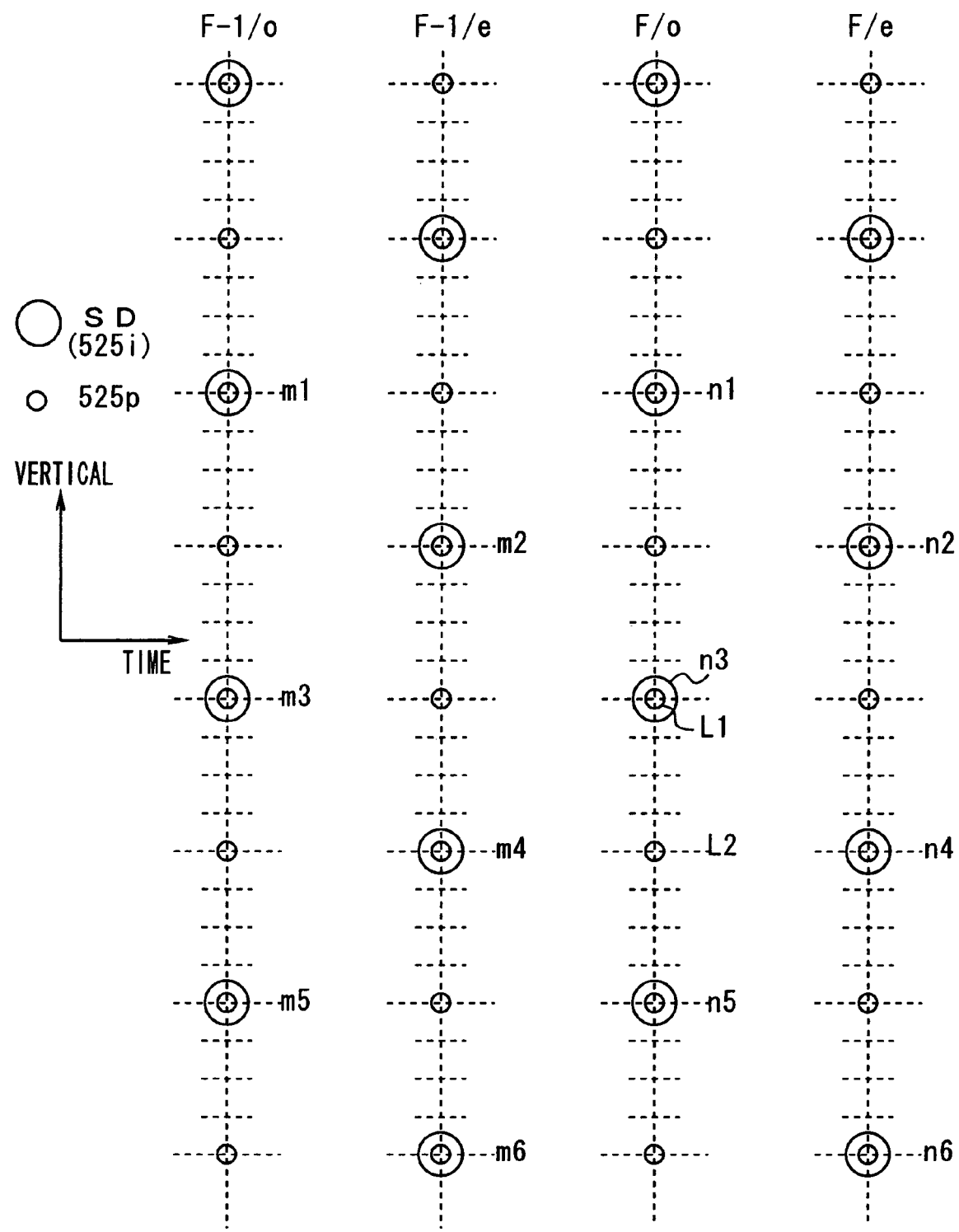
FIG. 14 is a further illustration explaining a pixel position relationship between the 525i signal and the 525p signal and an example of a motion class tap.

FIG. 14 shows a specific example of a motion class tap (SD pixel) selected by the third tap selection circuit 123 when the 525i signal is converted into the 525p signal. FIG. 14 also shows a vertical pixel position relationship between odd-number (o) and even-number (e) fields of time-wise consecutive frames F−1 and F. As shown in FIG. 14, a motion class tap used when line data set L1 or L2 of a field F/o is predicted includes SD pixels n2, n4, and n6 that are contained in the next field F/e and present space-wise in the vicinity of a pixel (that is, pixel of an objective position) of a 525p signal to be produced, SD pixels n1, n3, and n5 that are contained in the field F/o and present space-wise in the vicinity of a pixel of the 525p signal to be produced, SD pixels m2, m4, and m6 that are contained in the previous field F−1/e and present space-wise in the vicinity of a pixel of the 525p signal to be produced, and SD pixels m1, m3, and m5 that are contained in the further previous field F−1/o and present space-wise in the vicinity of a pixel of the 525p signal to be produced. The vertical position of each of the SD pixels n1 through n6 coincides with that of each of the SD pixels m1 through m6, respectively.

FIG. 15 shows a specific example of a motion class tap (SD pixel) selected by the third tap selection circuit 123 when the 525i signal is converted into the 1050i signal. FIG. 15 also shows the vertical pixel position relationship between odd-number (o) and even-number (e) fields of time-wise consecutive frames F−1 and F. As shown in FIG. 15, a motion class tap used when line data set L1 or L2 of a field F/o is predicted includes SD pixels n2, n4, and n6 that are contained in the next field F/e and present space-wise in the vicinity of a pixel of a 1050i signal to be produced, SD pixels n1, n3, and n5 that are contained in the field F/o and present space-wise in the vicinity of the pixel of the 1050i signal to be produced, SD pixels m2, m4, and m6 that are contained in the previous field F−1/e and present space-wise in the vicinity of a pixel of the 1050i signal to be produced, and SD pixels m1, m3, and m5 that are contained in the further previous field F−1/o and present space-wise in the vicinity of a pixel of the 1050i signal to be produced. The vertical position of each of the SD pixels n1 through n6 coincides with that of each of the SD pixels m1 through m6, respectively.

As shown in FIG. 1 again, the image signal processing section 110 also includes a space class detection circuit 124 for detecting distribution patterns of levels of the data sets (SD pixel data sets) of a space class tap selectively extracted by the second tap selection circuit 122, detecting space classes based on the level distribution patterns, and then transmitting their class information.

The space class detection circuit 124 performs a calculation such that, for example, the SD pixel data sets are compressed from eight bit-data into two bit-data. The space class detection circuit 124 then transmits the compressed data sets corresponding to each of the SD pixel data sets as class information of the space class. According to this embodiment, the data compression is performed according to Adaptive Dynamic Range Coding (ADRC). Alternative to ADRC, the information may be compressed according to DPCM (prediction coding), VQ (Vector Quantization), etc.

Originally, although the ADRC has been developed as an adaptive re-quantization method for high-performance coding employed in a Video Tape Recorder (VTR), it is suitable for use in the above-mentioned data compression because it can efficiently represent a local pattern of a signal level with a small of word length. Assuming that, when the ADRC is employed, a maximum value and a minimum value of data sets (SD pixel data sets) of a space class tap are MAX and MIN, respectively, a dynamic range of the data sets of the space class tap is DR (=MAX−MIN+1), and the number of re-quantization bits is P, following Equation (1) can be calculated on each of the SD pixel data sets ki as space class tap data sets to obtain re-quantization codes qi as compressed data sets.

$$qi = [(ki-\mathrm{MIN}+0.5)0.2^P/DR] \quad (1)$$

In the Equation (1), the portion enclosed with [ ] means truncation processing. If SD pixel data sets of Na are given as the space class tap data sets, term, "i" indicates 1 through Na.

The image signal processing section 110 also includes a motion class detection circuit 125 for detecting motion classes each for mainly representing a degree of motion from data sets (SD pixel data sets) of a motion class tap selectively extracted by the third tap selection circuit 123 and then transmitting their class information.

The motion class detection circuit 125 calculates inter-frame differences from the data sets (SD pixel data sets) mi and ni of the motion class tap selectively extracted by the third tap selection circuit 123 and then performs threshold processing on an average value of the absolute values of thus calculated differences to detect a motion class, which is an index of the motion. That is, the motion class detection circuit 125 calculates an average value AV of the absolute values of the differences according to following Equation (2).

$$AV = \frac{\sum_{i=1}^{Nb} |mi - ni|}{Nb} \quad (2)$$

When the third tap selection circuit 123 extracts 12 SD pixel data sets of m1 through m6 and n1 through n6 as mentioned above, for example, Nb in the Equation (2) is six.

The motion class detection circuit 125 in turn compares thus calculated average value AV to one or a plurality of threshold values, thus obtaining class information MV of a motion class. In a case where, for example, three threshold values of th1, th2, and th3 (th1<th2<th3) are provided to detect four motion classes, if AV≦th1, MV=0; if th1<AV≦th2, MV=1; if th2<AV≦th3, MV=2; and if th3<AV, MV=3.

Also, the image signal processing section 110 includes a class synthesis circuit 126 for obtaining a class code CL indicating a class including pixel data set of an HD signal to be produced (525p or 1050i signal), that is, pixel data set of an objective position, based on re-quantization codes qi as the class information of the space class received from the space class detection circuit 124 and the class information MV of the motion class received from the motion class detection circuit 125.

The class synthesis circuit 126 calculates the class code CL according to following Equation (3).

$$CL = \sum_{i=1}^{Na} qi(2^P)^i + MV \cdot 2^{pNa} \quad (3)$$

Note here that in the Equation (3), Na indicates a number of data sets (SD pixel data sets) of the space class tap and P indicates a number of re-quantization bits by means of the ADRC.

Also, the image signal processing section 110 includes registers 130-133 and a coefficient memory 134. Operations of a later-described linear-sequential conversion circuit 129 need to be switched according to a case of transmitting the 525p signal and a case of transmitting the 1050i signal. The register 130 stores operation specification information for specifying the operations of the linear-sequential conversion circuit 129. The linear-sequential conversion circuit 129 operates according to the operation specification information received from the register 130.

The register 131 stores tap position information on the prediction tap selected by the first tap selection circuit 121. The first tap selection circuit 121 selects the prediction tap on the basis of the tap position information received from the register 131. For example, a plurality of SD pixels that may possibly be selected is given numbers for specification, and on the basis of the tap position information, a number of the SD pixels to be selected is specified. This holds true also with the following tap position information.

The register 132 stores tap position information of the space class tap selected by the second tap selection circuit 122. The second tap selection circuit 122 selects the space class tap on the basis of the tap position information received from the register 132.

Herein, the register 132 stores tap position information A in a case of relatively small motion and tap position information B in a case of relatively large motion. Which one of these pieces of the tap position information A and B is to be supplied to the second tap selection circuit 122 is selected according to the class information MV of the motion class received from the motion class detection circuit 125.

That is, if there is no motion or small motion provided and therefore MV=0 or MV=1, the tap position information A is supplied to the second tap selection circuit 122, which in turn selects such a space class tap as to cover a plurality of fields as shown in FIGS. 10-13. Also, if the motion is relatively large and therefore MV=2 or MV=3, the tap position information B is supplied to the second tap selection circuit 122, which in turn selects such a space class tap as to be only SD pixel, not shown, that exists in the same field as that including a pixel to be produced.

Alternatively, the above-mentioned register 131 may store the tap position information in the case of relatively small motion and the tap position information in the case of relatively large motion, to select the tap position information to be supplied to the first tap selection circuit 121 based on the class information MV of the motion class received from the motion class detection circuit 125.

The register 133 stores tap position information of the motion class tap selected by the third tap selection circuit 123. The third tap selection circuit 123 selects the motion class tap on the basis of the tap position information received from the register 133.

Further, for each class, the coefficient memory 134 stores coefficient data sets to be used in an estimation equation used in a later-described estimation/prediction calculation circuit 127. The coefficient data sets are used as information for converting the 525i signal as an SD signal into the 525p or 1050i signal as an HD signal. The coefficient memory 134 receives the class code CL, as read-out address information, from the above-mentioned class synthesis circuit 126, and transmits coefficient data sets corresponding to the class code CL to the estimation/prediction calculation circuit 127.

Also, the image signal processing section 110 includes an information memory bank 135. The information memory bank 135 beforehand accumulates therein operation specification information to be stored in the register 130 and tap position information to be stored in the registers 131-133.

Note here that as the operation specification information to be stored in the register 130, the information memory bank 135 beforehand accumulates therein first operation specification information to allow the linear-sequential conversion circuit 129 to transmit the 525p signal and second operation specification information to allow the linear-sequential conversion circuit 129 to transmit the 1050i signal.

The user can operate the remote control transmitter 200 to select a first conversion method of transmitting the 525p signal as the HD signal or a second conversion method of transmitting the 1050i signal as the HD signal. To the information memory bank 135, information of the selected conversion method is supplied through the system controller 101, and according to this selection information, the first or second operation specification information is loaded from the information memory bank 135 to the register 130.

Also, as tap position information of a prediction tap to be stored in the register 131, the information memory bank 135 beforehand accumulates therein first tap position information that corresponds to the first conversion method (525p) and second tap position information that corresponds to the second conversion method (1050i). From this information memory bank 135, the first or second tap position information is loaded to the register 131 according to the above-mentioned conversion method selection information.

Also, as tap position information of a space class tap to be stored in the register 132, the information memory bank 135 beforehand accumulates therein first tap position information that corresponds to the first conversion method (525p) and second tap position information that corresponds to the second conversion method (1050i). The first and second tap position information consists of tap position information in a case of relatively small motion and that in a case of relatively large motion, respectively. The first or second tap position information is loaded from this information memory bank 135 to the register 132 according to the above-mentioned conversion method selection information.

Also, as tap position information of a motion class tap to be stored in the register 133, the information memory bank 135 beforehand accumulates therein first tap position information that corresponds to the first conversion method (525p) and second tap position information that corresponds to the second conversion method (1050i). From this information memory bank 135, the first or second tap position information is loaded to the register 133 according to the above-mentioned conversion method selection information.

Also, the information memory bank 135 beforehand accumulates coefficient seed data sets, for each class, corresponding to the first and second conversion methods, respectively. The coefficient seed data sets are coefficient data sets in a production equation for producing the coefficient data sets to be stored in the above-mentioned coefficient memory 134.

The later-described estimation/prediction calculation circuit 127 calculates HD pixel data sets y to be produced according to an estimation equation of following Equation (4) based on data sets xi of a prediction tap (SD pixel data sets) and coefficient data sets Wi read out of the coefficient memory 134.

$$y = \sum_{i=1}^{n} W_i \cdot x_i \tag{4}$$

If ten prediction taps are selected by the first tap selection circuit 121 as shown in FIGS. 4 and 7, the value of n in the Equation (4) is 10.

The coefficient data sets Wi (i=1 to n) in this estimation equation are produced according to the production equation that contains parameters h and v, as shown by following Equation (5).

$$W_1 = w_{10} + w_{11}v + w_{12}h + w_{13}v^2 + w_{14}vh + w_{15}h^2 + w_{16}v^3 + w_{17}v^2h + w_{18}vh^2 + w_{19}h^3$$

$$W_2 = w_{20} + w_{21}v + w_{22}h + w_{23}v^2 + w_{24}vh + w_{25}h^2 + w_{26}v^3 + w_{27}v^2h + w_{28}vh^2 + w_{29}h^3$$

$$\vdots$$

$$W_i = w_{i0} + w_{i1}v + w_{i2}h + w_{i3}v^2 + w_{i4}vh + w_{i5}h^2 + w_{i6}v^3 + w_{i7}v^2h + w_{i8}vh^2 + w_{i9}h^3$$

$$\vdots$$

$$W_n = w_{n0} + w_{n1}v + w_{n2}h + w_{n3}v^2 + w_{n4}vh + w_{n5}h^2 + w_{n6}v^3 + w_{n7}v^2h + w_{n8}vh^2 + w_{n9}h^3$$

(5)

The information memory bank 135 stores therein such the coefficient seed data sets $w_{10}$ through $w_{n9}$, which are the coefficient data sets in this production equation, for each conversion method and for each class. How to produce the coefficient seed data sets will be described later.

Also, the image signal processing section 110 includes a coefficient production circuit 136 for producing the coefficient data sets Wi (i=1 to n) to be used in the estimation equation for each class according to the Equation (5) using the coefficient seed data sets for each class and values of the parameters h and v, wherein the coefficient data sets Wi correspond to the values of the parameters h and v. To this coefficient production circuit 136 are loaded the class-specific coefficient seed data sets corresponding to the first or second conversion method employed according to the above-mentioned conversion method selection information, from the information memory bank 135. The system controller 101 also supplies this coefficient production circuit 136 with values of the parameters h and v.

The above-mentioned coefficient memory 134 stores the coefficient data sets Wi (i=1 to n) for each class produced by this coefficient production circuit 136. The coefficient production circuit 136 produces the coefficient data sets Wi for each class in, for example, each vertical blanking period. With this, even when the user has changed a value of the parameter h or v under the operation of the remote control transmitter 200, the class-specific coefficient data sets Wi stored in the coefficient memory 134 can be changed immediately in correspondence with thus changed value of the parameter h or v, thus permitting the user to adjust the resolution smoothly.

Also, the image signal processing section 110 includes a normalization coefficient production circuit 137 for calculating a normalized coefficient S according to following Equation (6), in which the normalized coefficient S corresponds to each of the class-specific coefficient data sets Wi (i=1 to n) produced by the coefficient production circuit 136, and a normalization coefficient memory 138 for storing thus produced normalized coefficient S for each class.

$$S = \sum_{i=1}^{n} W_i \quad (6)$$

The normalization coefficient memory 138 receives the class code CL from the above-mentioned class synthesis circuit 126 as read-out address information, and the normalized coefficient S corresponding to the class code CL is read out of this normalization coefficient memory 138 and supplied to the normalization calculation circuit 128, which will be described later.

Also, the image signal processing section 110 includes the estimation/prediction calculation circuit 127 for calculating pixel data set of an HD signal to be produced (that is, pixel data set of an objective position), based on the data sets (SD pixel data sets) xi of the prediction tap selectively extracted by the first tap selection circuit 121 and the coefficient data sets Wi read out of the coefficient memory 134.

It is necessary for this estimation/prediction calculation circuit 127 to produce line data sets L1 at the same line as that of the 525i signal and line data sets L2 at the intermediate position between the upper and lower lines of the 525i signal in odd-number (o) and even-number (e) fields, and also to double the number of pixels in each line with reference to FIG. 4 when transmitting the 525p signal. On the other hand, as shown in FIG. 5, it is necessary for this estimation/prediction calculation circuit 127 to produce line data sets L1 and L1' near the line of the 525i signal and line data sets L2 and L2' remote from the line of the 525i signal in odd-number (o) and even-number (e) fields and also to double the number of pixels in each line when transmitting the 1050i signal.

Therefore, the estimation/prediction calculation circuit 127 simultaneously produces data sets of four pixels that constitute the HD signal. For example, each of the data sets of four pixels is simultaneously produced using the estimation equations having different coefficient data sets, which are supplied from the coefficient memory 134. In this case, the estimation/prediction calculation circuit 127 calculates HD pixel data sets y to be produced according to the above Equation (4) based on the data sets (SD pixel data sets) xi of the prediction tap and coefficient data sets Wi read out of the coefficient memory 134.

Also, the image signal processing section 110 includes the normalization calculation circuit 128 for normalizing by dividing each of the HD pixel data sets y that constitute line data sets L1 and L2 (L1' and L2') received from the estimation/prediction calculation circuit 127 by the normalized coefficient S corresponding to the coefficient data sets Wi (i=1 to n) read out of the normalization coefficient memory 138 and used in each production. Although not described above, when the coefficient production circuit 136 produces the coefficient data sets to be used in the estimation equation according to the production equation based on the coefficient seed data sets, thus produced coefficient data sets contain a rounding error, so that a total sum of the coefficient data sets Wi (i=1 to n) do not always become 1.0. This causes the HD pixel data sets y calculated by the estimation/prediction calculation circuit 127 to fluctuate in level owing to the rounding error. As mentioned above, the fluctuations can be removed by normalization at the normalization calculation circuit 128.

Also, the image signal processing section 110 includes the linear-sequential conversion circuit 129 for performing line speed-doubling processing on a horizontal period so as to be a half period thereof and for linearly sequencing line data sets L1 and L2 (L1' and L2') received from the estimation/prediction calculation circuit 127 through the normalization calculation circuit 128.

FIG. 16 shows line speed-doubling processing for transmitting the 525p signal using an analog wave. As mentioned above, the estimation/prediction calculation circuit 127 produces the line data sets L1 and L2. The line data sets L1 include lines a1, a2, a3 . . . in this order, while the line data sets L2 include lines b1, b2, b3 . . . in this order. The linear-sequential conversion circuit 129 compresses each of these line data sets in the time-axis direction by half to then select thus compressed line data sets alternately, thus forming linear-sequential outputs a0, b0, a1, b1 . . . .

Incidentally, when transmitting the 1050i signal, the linear-sequential conversion circuit 129 generates a linear sequential output in order to satisfy the interlacing relationship between the odd-number and even-number fields. The linear-sequential conversion circuit 129, therefore, needs to switch the operation between transmitting of the 525p signal and transmitting of the 1050i signal. The concerned operation specification information is supplied from the register 130 as mentioned above.

The following will describe the operations of the image signal processing section 110.

Based on the SD signal (525i signal) stored in the buffer memory 109, the second tap selection circuit 122 selectively extracts data sets (SD pixel data sets) of a space class tap. In this case, the second tap selection circuit 122 selects a tap based on the tap position information, which is supplied from the register 132, corresponding to a user-selected conversion method and a motion class detected by the motion class detection circuit 125.

Data sets (SD pixel data sets) of the space class tap thus extracted selectively by the second tap selection circuit 122 are supplied to the space class detection circuit 124. This space class detection circuit 124, in turn, performs ADRC processing on each of the SD pixel data sets given as the data sets of the space class tap to thereby obtain re-quantization codes qi as the class information of the space class (class grouping for mainly indicating a waveform in the space)(see the Equation (1)).

Also, based on the SD signal (525i signal) stored in the buffer memory 109, the third tap selection circuit 123 selectively extracts data sets (SD pixel data sets) of a motion class tap. In this case, the third tap selection circuit 123 selects a tap based on the tap position information, which is supplied from the register 133, corresponding to the user-selected conversion method.

Data sets (SD pixel data sets) of the motion class tap thus extracted selectively by the third tap selection circuit 123 are supplied to the motion class detection circuit 125. This motion class detection circuit 125, in turn, obtains class information MV of the motion class (class grouping for mainly indicating a degree of motion) from each of the SD pixel data sets given as data sets of the motion class tap.

This motion information MV and the above-mentioned re-quantization codes qi are supplied to the class synthesis circuit 126. This class synthesis circuit 126 in turn obtains the class code CL indicating a class including pixel data set (pixel data set of an objective position) of the HD signal (525p or 1050i signal) to be produced on the basis of this motion information MV and the re-quantization codes qi (see the Equation (3)). This class code CL is then supplied as read-out address information to the coefficient memory 134 and the normalization coefficient memory 138.

During each vertical blanking period, for example, the coefficient production circuit 136 produces the coefficient data sets Wi (i=1 to n) to be used in the estimation equation for each class, wherein each of the coefficient data sets Wi corresponds to values of the parameters h and v adjusted by the user. The coefficient memory 134 then stores them therein. Also, the normalization coefficient production circuit 137 produces the normalized coefficient S corresponding to each of the class-specific coefficient data sets Wi (i=1 to n) produced by the coefficient production circuit 136 as mentioned above, and the normalization coefficient memory 138 then stores therein the normalized coefficient S thus produced.

When the coefficient memory 134 receives the class code CL as read-out address information as mentioned above, the coefficient data sets Wi corresponding to the class code CL are read out of this coefficient memory 134 and supplied to the estimation/prediction calculation circuit 127. Also, based on the SD signal (525i signal) stored in the buffer memory 109, the first tap selection circuit 121 selectively extracts the data sets (SD pixel data sets) of a prediction tap. In this case, the first tap selection circuit 121 selects a tap based on the tap position information, which is supplied from the register 131, corresponding to a user-selected conversion method. The data sets (SD pixel data sets) xi of the prediction tap extracted selectively by this first tap selection circuit 121 are supplied to the estimation/prediction calculation circuit 127.

The estimation/prediction calculation circuit 127 calculates the pixel data set of the HD signal to be produced, that is, each of the pixel data sets (HD pixel data sets) y of the objective position using data sets (SD pixel data sets) xi of the prediction tap and coefficient data sets Wi read out of the coefficient memory 134 (see the Equation (4)). In this case, data sets of four pixels that constitute the HD signal are produced simultaneously.

Thus, if the first conversion method for transmitting the 525p signal is selected, line data sets L1 at the same position as that line of the 525i signal and line data sets L2 at the intermediate position between the upper and lower lines of the 525i signal are produced in the odd-number (o) and even-number (e) fields (see FIG. 4). On the other hand, if the second conversion method for transmitting the 1050i signal is selected, line data sets L1 and L1' near the line of the 525i signal and line data sets L2 and L2' remote from the line of the 525i signal are produced in the odd-number (o) and even-number (e) fields (see FIG. 5).

Thus, the line data sets L1 and L2 (L1' and L2') produced by the estimation/prediction calculation circuit 127 are supplied to the normalization calculation circuit 128. The normalization coefficient memory 138 is supplied with the class code CL as read-out address information as mentioned above, so that the normalized coefficient S corresponding to the class code CL, that is, normalized coefficient S corresponding to each of the coefficient data sets Wi (i=1 to n) used in production of each of the HD pixel data sets y that constitute the line data sets L1 and L2 (L1' and L2') received from the estimation/prediction calculation circuit 127 is read out of this normalization coefficient memory 138 and then supplied to the estimation/prediction calculation circuit 127. At the normalization calculation circuit 128, each of the HD pixel data sets y that constitutes the line data sets L1 and L2 (L1' and L2') received from the estimation/prediction calculation circuit 127 is divided by the respective normalized coefficient S to be normalized. Level fluctuations, which are caused by a rounding error occurred when the coefficient data sets to be used in the estimation equation (see the Equation (4)) are obtained according to the production equation (see the Equation (5)) using the coefficient seed data sets, are thus removed in the pixel data set of an objective position.

The line data sets L1 and L2 (L1' and L2') thus normalized by the normalization calculation circuit 128 are supplied to the linear-sequential conversion circuit 129. This linear-sequential conversion circuit 129 in turn linear-sequences these line data sets L1 and L2 (L1' and L2') to produce the HD signal. In this case, the linear-sequential conversion circuit 129 operates according to the operation specification information, which is supplied from the register 130, corresponding to the conversion method selected by the user. Therefore, if the user selects the first conversion method (525p), the linear-sequential conversion circuit 129 transmits the 525p signal. On the other hand, if the user selects the second conversion method (1050i), the linear-sequential conversion circuit 129 transmits the 1050i signal.

As mentioned above, the coefficient production circuit 136 produces the coefficient data sets Wi (i=1 to n) to be used in the estimation equation in correspondence with the values of the parameters h and v for each class using the coefficient seed data sets loaded from the information memory bank 135, and the coefficient memory 134 stores the coefficient data sets Wi. In this configuration, the estimation/prediction calculation circuit 127 calculates the HD pixel data sets y using the coefficient data sets Wi (i=1 to n) read out of this coefficient memory 134 in correspondence with the class code CL.

Thus, in the image signal processing section 110, HD pixel data sets y are calculated using the coefficient data sets Wi (i=1 to n) to be used in the estimation equation, each coefficient data set Wi corresponding to the values of the adjusted parameters h and v of plural kinds. The user, therefore, can adjust the values of the parameters, h and v to arbitrarily adjust the picture quality of an image given by the HD signal on the axes of horizontal and vertical resolutions. The user can also adjust the value of each of the parameters, h and v to adjust the horizontal and vertical picture qualities of an image given by the HD signal smoothly without steps. In this case, each of the coefficient data sets, for each class, corresponding to the values of the adjusted parameters h and v is produced and used as necessary at the coefficient production circuit 136, thus eliminating the necessity of a memory for storing a lot of coefficient data sets.

As mentioned above, the information memory bank 135 stores therein the coefficient seed data sets for each conversion method and for each class. These coefficient seed data sets are produced by learning beforehand.

First, an illustrative method for producing the coefficient seed data sets will be described. Specifically, an example is given for obtaining coefficient seed data sets $w_{10}$ through $w_{n9}$, which are coefficient data sets in the production equation of the Equation (5).

Here, for the following explanation, the terms $t_i$ (i=0 through 9) are defined as following Equation (7).

$$t_0=1, t_1=v, t_2=h, t_3=v^2, t_4=vh, t_5=h^2, t_6=v^3, t_7=v^2h, t_8=vh^2, t_9=h^3 \quad (7)$$

By using the Equation (7), the Equation (5) is transformed into following Equation (8):

$$W_j = \sum_{i=0}^{9} w_{ji} t_i \quad (8)$$

Finally, an undetermined coefficient $w_{xy}$ is obtained by learning. That is, for each conversion method and for each class, by using plural SD pixel data sets and plural HD pixel data sets, a coefficient value that minimizes a square error is determined. That is, the least square method is employed for solution. Supposing the number of times of learning to be m, a residual error in data sets of the k-th ($1 \leq k \leq m$) learning to be $e_k$, and a total sum of square errors to be E, the value of E can be given by following Equation (9) based on the Equations (4) and (5).

$$E = \sum_{k=1}^{m} e_k^2 \quad (9)$$

$$= \sum_{k=1}^{m} [y_k - (W_1 x_{1K} + W_2 x_{2K} + \ldots + W_n x_{nK})]^2$$

$$= \sum_{k=1}^{m} \{y_k - [(t_0 w_{10} + t_1 w_{11} + \ldots + t_9 w_{19})x_{1k} + \ldots + (t_0 w_{n0} + t_1 w_{n1} + \ldots + t_9 w_{n9})x_{nk}]\}^2$$

$$= \sum_{k=1}^{m} \{y_k - [(w_{10} + w_{11}v + \ldots + w_{19}h^3)x_{1k} + \ldots + (w_{n0} + w_{n1}v + \ldots + w_{n9}h^3)x_{nk}]\}^2$$

In the equation, terms $x_{ik}$ indicate the k-th pixel data set of an i-th prediction tap position of an SD image and terms $y_k$ indicate k-th pixel data set of the corresponding k-th HD image.

According to a solution by use of the least square method, a value of $w_{xy}$ that makes partial differentiation of the Equation (9) into zero is calculated. This is indicated by following Equation (10).

$$\frac{\partial E}{\partial w_{ij}} = \sum_{k=1}^{m} 2\left(\frac{\partial e_k}{\partial w_{ij}}\right) e_k = -\sum_{k=1}^{m} 2t_j x_{ik} e_k = 0 \quad (10)$$

Assuming terms $X_{ipjq}$ and $Y_{ip}$ as given in following Equations (11) and (12), the Equation (10) can be changed into following Equation (13) by use of matrix.

$$X_{ipjq} = \sum_{k=1}^{m} x_{ik} t_p x_{jk} t_q \quad (11)$$

$$Y_{ip} = \sum_{k=1}^{m} x_{ik} t_p y_k \quad (12)$$

$$\begin{bmatrix} X_{1010} & X_{1011} & X_{1012} & \cdots & X_{1019} & X_{1020} & \cdots & X_{10n9} \\ X_{1110} & X_{1111} & X_{1112} & \cdots & X_{1119} & X_{1120} & \cdots & X_{11n9} \\ X_{1210} & X_{1211} & X_{1212} & \cdots & X_{1219} & X_{1220} & \cdots & X_{12n9} \\ \vdots & \vdots & \vdots & \ddots & \vdots & \vdots & \ddots & \vdots \\ X_{1910} & X_{1911} & X_{1912} & \cdots & X_{1919} & X_{1920} & \cdots & X_{19n9} \\ X_{2010} & X_{2011} & X_{2012} & \cdots & X_{2019} & X_{2020} & \cdots & X_{20n9} \\ \vdots & \vdots & \vdots & \ddots & \vdots & \vdots & \ddots & \vdots \\ X_{n910} & X_{n911} & X_{n912} & \cdots & X_{n919} & X_{n920} & \cdots & X_{n9n9} \end{bmatrix} = \begin{bmatrix} w_{10} \\ w_{11} \\ w_{12} \\ \vdots \\ w_{19} \\ w_{20} \\ \vdots \\ w_{n9} \end{bmatrix} \begin{bmatrix} Y_{10} \\ Y_{11} \\ Y_{12} \\ \vdots \\ Y_{19} \\ Y_{20} \\ \vdots \\ Y_{n9} \end{bmatrix} \quad (13)$$

This equation is generally referred to as a normal equation. This normal equation is solved with respect to $w_{xy}$ using a sweeping-out method (Gauss-Jordan's elimination method) and the like, thus calculating the coefficient seed data sets.

FIG. 17 shows a concept of the above-mentioned method for producing the coefficient seed data sets. Specifically, a plurality of SD signals is produced from an HD signal. For example, SD signals of total 81 kinds are produced with the parameters h and v for varying a horizontal band and a vertical band of a filter used at the time of producing the SD signals from the HD signal being varied respectively at nine steps. By performing learning between a plurality of SD signals thus produced and the HD signal, the coefficient seed data sets are produced.

FIG. 18 shows a configuration of a coefficient seed data production device 150 for producing the coefficient seed data sets based on the above-mentioned concept.

This coefficient seed data production device 150 includes an input terminal 151 for receiving the HD signal (525p or 1050i signal) as a teacher signal, and an SD signal production circuit 152 for performing a thinning-out processing on this HD signal horizontally and vertically to thereby obtain SD signal as an input signal.

This SD signal production circuit 152 receives a conversion method selection signal as a control signal. If the first conversion method (for obtaining the 525p signal from the 525i signal at the image signal processing section 110 shown in FIG. 1) is selected, the SD signal production circuit 152 performs the thinning-out processing on the 525p signal to thereby produce SD signal (see FIG. 4). On the other hand, if the second conversion method (for obtaining the 1050i signal from the 525i signal at the image signal processing section 110 shown in FIG. 1) is selected, the SD signal production circuit 152 performs the thinning-out processing on the 1050i signal to thereby produce SD signal (see FIG. 5).

Also, the SD signal production circuit 152 receives the parameters h and v as control signals. In correspondence with these parameters h and v, the horizontal and vertical bands of the filter used when producing the SD signals from the HD signal are varied. The following will describe some examples of details of the filter.

Figure 19:
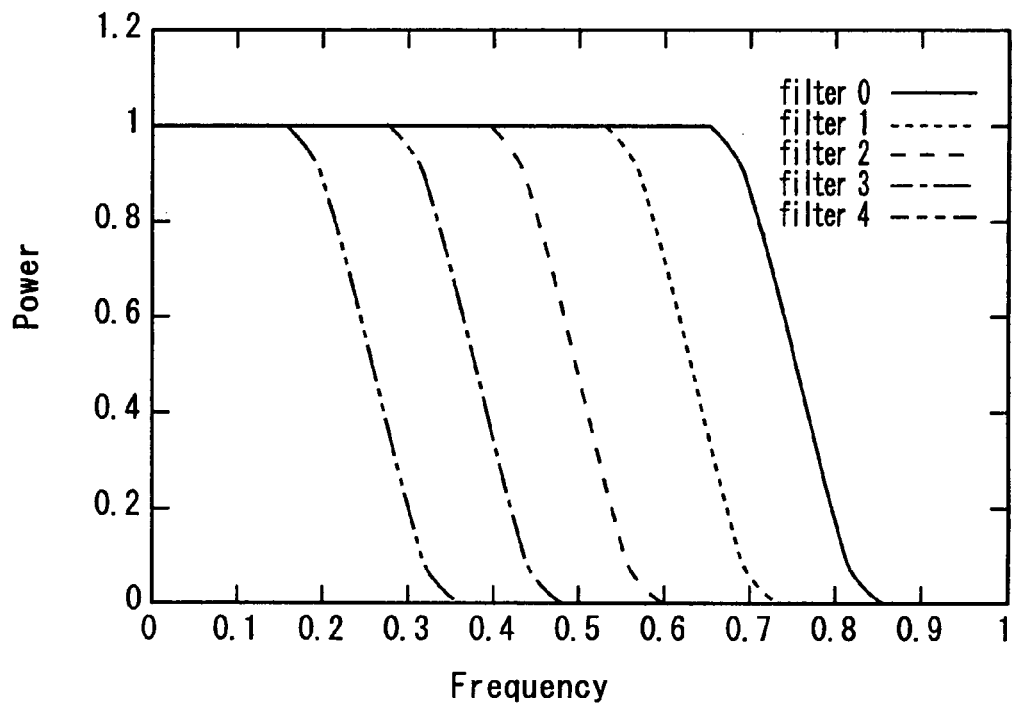
FIG. 19 is a graph showing one example of a frequency response of a band-pass filter.

For example, it is conceivable to constitute the filter by a band-pass filter for restricting the horizontal-band frequencies and a band-pass filter for restricting the vertical-band frequencies. In this case, as shown in FIG. 19, by designing a frequency response corresponding to step-wise given values of the parameter h or v to perform inverse Fourier transform, a one-dimensional filter having the frequency response corresponding to the step-wise given values of the parameter h or v can be obtained.

Also, for example, it is conceivable to constitute the filter by a one-dimensional Gaussian filter for restricting the horizontal-band frequencies and a one-dimensional Gaussian filter for restricting the vertical-band frequencies. Such the one-dimensional Gaussian filter can be represented by following Equation (14).

$$Out = \frac{1.0}{\sigma\sqrt{2.0\pi}} e^{\frac{-(4.0\times-37)^2}{2.0\sigma^2}} \quad (14)$$

In this case, by step-wise changing the value of a standard deviation σ in correspondence with the step-wise given value of the parameter h or v, a one-dimensional Gaussian filter having the frequency response that corresponds to the step-wise give value of the parameter, h or v can be obtained.

Also, for example, it is conceivable to constitute the filter by a two-dimensional filter F (h, v) having both horizontal and vertical frequency responses that are decided by the parameters h and v, respectively. In this method for producing two-dimensional filter, similar to the above-mentioned one-dimensional filter, the two-dimensional frequency response corresponding to the step-wise given values of the parameters h and v is designed, and two-dimensional inverse Fourier transform is performed. As a result, the two-dimensional filter having the two-dimensional frequency response that corresponds to the step-wise given values of the parameters h and v can be obtained.

Also, the coefficient seed data production device 150 includes first through third tap selection circuits 153-155 each for selectively extracting, and then transmitting, the plural SD pixel data sets located on a periphery of an objective position in an HD signal (1050i or 525p signal) from the signal (525i signal) received from the SD signal production circuit 152.

These first through third tap selection circuits 153-155 are constituted like the first through third tap selection circuits 121-123 of the above-mentioned image signal processing section 110. The tap selected by any one of the first through third tap selection circuits 153-155 is specified according to the tap position information received from a tap selection control circuit 156.

The tap selection control circuit 156 receives a conversion method selection signal as the control signal. The first through third tap selection circuits 153-155 are supplied with different tap position information according to a different conversion methods, that is, whether the first conversion method or the second conversion method is selected. Also, the tap selection control circuit 156 receives the class information MV of the motion class from a motion class detection circuit 158, which is described later. Thus, the tap position information supplied to the second tap selection circuit 154 is adapted to change with the magnitude of the motion.

Also, the coefficient seed data production device 150 includes a space class detection circuit 157 for detecting distribution patterns of levels of the data sets (SD pixel data sets) of the space class tap selectively extracted by the second tap selection circuit 154, for detecting space classes based on this distribution patterns of levels, and then for transmitting class information of this space class. This space class detection circuit 157 is constituted like the space class detection circuit 124 of the above-mentioned image signal processing section 110. This space class detection circuit 157 transmits, as class information indicating the space classes, re-quantization codes qi for the SD pixel data sets as the data sets of the space class tap.

Also, the coefficient seed data production device 150 includes the motion class detection circuit 158 for detecting motion classes mainly indicating a degree of motion from the data sets (SD pixel data sets) of the motion class tap selectively extracted by the third tap selection circuit 155 and then for transmitting the class information MV thereof. This motion class detection circuit 158 is constituted like the motion class detection circuit 125 of the above-mentioned image signal processing section 110. This motion class detection circuit 158 calculates inter-frame differences from the data sets (SD pixel data sets) of the motion class tap selectively extracted by the third tap selection circuit 155 to then perform threshold value processing on an average value of the absolute values of these differences, thus detecting a motion class that provides an index of motion.

Also, the coefficient seed data production device 150 includes a class synthesis circuit 159 for obtaining a class code CL for indicating a class including pixel data set of an objective position in the HD signal (525p or 1050i signal), based on the re-quantization codes qi given as class information of the space class received from the space class detection circuit 157 and the class information MV of the motion class received from the motion class detection circuit 158. This class synthesis circuit 159 is also constituted like the class synthesis circuit 126 of the above-mentioned image signal processing section 110.

Also, the coefficient seed data production device 150 includes a normal equation production section 160 for producing a normal equation (see the Equation (13)) to be used for obtaining the coefficient seed data sets $w_{10}$ through $w_{n9}$ for each class, based on each of the HD pixel data sets y given as pixel data sets of the objective position obtained from the HD signal received at the input terminal 151, data sets (SD pixel data sets) xi of the prediction tap selectively extracted by the first tap selection circuit 153 respectively in correspondence with thus obtained each of the HD pixel data sets y, and the class code CL received from the class synthesis circuit 159 respectively in correspondence with each of the HD pixel data sets y thus obtained.

In this case, learning data sets are produced in combination of one of the HD pixel data sets y and the pixel data sets of the prediction tap in number of n each corresponding thereto. The parameters h and v to be supplied to the SD signal production circuit 152 are sequentially changed so that a plurality of SD signals having the horizontal and vertical bands each varying in a step-by-step manner can be sequentially produced. Thus, a normal equation having many learning data sets registered therein is produced in the normal equation production section 160.

Herein, the coefficient seed data sets calculated by learning between the HD signal and the SD signals produced by passing this HD signal through a narrow-band filter are used to obtain the HD signal with a high resolution. Conversely, the coefficient seed data sets calculated by learning between the HD signal and the SD signals produced by passing this HD signal through a wide-band filter are used to obtain the HD signal with a low resolution. As mentioned above, a plurality of SD signals can be produced sequentially to thereby register the learning data sets, thus obtaining the coefficient seed data sets for obtaining HD signal having continuous resolution.

Incidentally, although not shown, when disposing a delay circuit for time matching at a preceding stage to the first tap selection circuit 153, a timing for supplying the SD pixel data sets xi from this first tap selection circuit 153 to the normal equation production section 160 can be adjusted.

Also, the coefficient seed data production device 150 includes a coefficient-seed data decision section 161 for receiving data sets of the normal equation produced for each class by the normal equation production section 160, and for solving this class-specific normal equation in order to obtain coefficient seed data sets $w_{10}$ through $w_{n9}$ for each class, and a coefficient seed memory 162 for storing thus obtained coefficient seed data sets $w_{10}$ through $w_{n9}$. The coefficient seed data decision section 161 solves the normal equation according to a method such as the sweeping-out method, thus obtaining coefficient data sets $w_{10}$ through $w_{n9}$.

The following will describe the operations of the coefficient seed data production device 150 shown in FIG. 18. HD signal (525p or 1050i signal) as a teacher signal is supplied to the input terminal 151 and then it undergoes thinning-out processing both horizontally and vertically in the SD signal production circuit 152, thus producing SD signal (525i signal) as an input signal.

In this case, if the first conversion method (for obtaining the 525p signal from the 525i signal by the image signal processing section 110 shown in FIG. 1) is selected, the SD signal production circuit 152 performs the thinning-out processing on the 525p signal to thereby produce the SD signal. On the other hand, if the second conversion method (for obtaining the 1050i signal from the 525i signal by the image signal processing section 110 shown in FIG. 1) is selected, the SD signal production circuit 152 performs the thinning-out processing on the 1050i signal to thereby produce the SD signal. Also, in this case, the SD signal production circuit 152 receives the parameters h and v as the control signals to sequentially produce a plurality of the SD signals having horizontal and vertical bands each varying in a step-by-step manner.

Based on these SD signals (525i signals), the second tap selection circuit 154 selectively extracts the data sets (SD pixel data sets) of the space class tap located on a periphery of an objective position in the HD signal (525p or 1050i signal). This second tap selection circuit 154 selects a tap based on the tap position information, which is supplied from the tap selection control circuit 156, corresponding to selected conversion method and a motion class detected by the motion class detection circuit 158.

The data sets (SD pixel data sets) of the space class tap selectively extracted by this second tap selection circuit 154 are supplied to the space class detection circuit 157. This space class detection circuit 157 performs ADRC processing on each of the SD pixel data sets given as the data sets of the space class tap to thereby obtain the re-quantization codes qi used as the class information of the space class (class grouping mainly for indicating of a waveform in a space) (see the Equation (1)).

Also, based on the SD signals produced by the SD signal production circuit 152, the third tap selection circuit 155 selectively extracts the data sets (SD pixel data sets) of a motion class tap located on a periphery of the objective position in the HD signal. In this case, the third tap selection circuit 155 selects a tap based on the tap position information, which is supplied from the tap selection control circuit 156, corresponding to a selected conversion method.

The data sets (SD pixel data sets) of a motion class tap selectively extracted by this third tap selection circuit 155 are supplied to the motion class detection circuit 158. This motion class detection circuit 158 obtains class information MV of a motion class (class grouping for mainly indicating a degree of motion) based on each of the SD pixel data sets given as the data sets of the motion class tap.

This motion information MV and the above-mentioned re-quantization codes qi are supplied to the class synthesis circuit 159. This class synthesis circuit 159 obtains a class code CL indicating a class that includes the pixel data set of the objective position in the HD signal (525p or 1050i signal), based on this motion information MV and the re-quantization codes qi (see the Equation (3)).

Also, based on the SD signals produced by the SD signal production circuit 152, the first tap selection circuit 153 selectively extracts the data sets (SD pixel data sets) of the prediction tap located on a periphery of the objective position in the HD signal. In this case, the first tap selection circuit 153 selects a tap based on the tap position information, which is supplied from the tap selection control circuit 156, corresponding to a selected conversion method.

Then, the normal equation production circuit 160 produces a normal equation for producing coefficient seed data sets $w_{10}$ through $w_{n9}$ (see the Equation (13)) for each class based on each of the HD pixel data sets y given as pixel data set of the objective position obtained from the HD signal supplied at the input terminal 151, the data sets (SD pixel data sets) xi of the prediction tap selectively extracted by the first tap selection circuit 153 in respective correspondence to each of the HD pixel data sets y thus given, and a class code CL received from the class synthesis circuit 159 in respective correspondence to each of the HD pixel data sets y thus given.

Then, this normal equation is solved by the coefficient seed data decision section 161, which obtains coefficient seed data sets $w_{10}$ through $w_{n9}$ for each class. Thus obtained coefficient seed data sets $w_{10}$ through $w_{n9}$ are stored in the coefficient seed memory 162 in which the addresses are sub-divided for each class.

Thus, the coefficient seed data production device 150 shown in FIG. 18 can produce class-specific coefficient seed data sets $w_{10}$ through $w_{n9}$ to be stored in the information memory bank 135 of the image signal processing section 110 shown in FIG. 1. In this case, the SD signal production circuit 152 produces the SD signal (525i signal) using the 525p or 1050i signal according to selected conversion method, thus producing the coefficient seed data sets each corresponding to any one of the first conversion method (for obtaining the 525p signal from the 525i signal at the image signal processing section 110) and the second conversion method (for obtaining the 1050i signal from the 525i signal at the image signal processing section 110).

The following will describe another illustrative method for producing coefficient seed data sets. This example will also show how to obtain coefficient seed data sets $w_{10}$ through $w_{n9}$, which are coefficient data sets in the production equation of the Equation (5).

Figure 20:
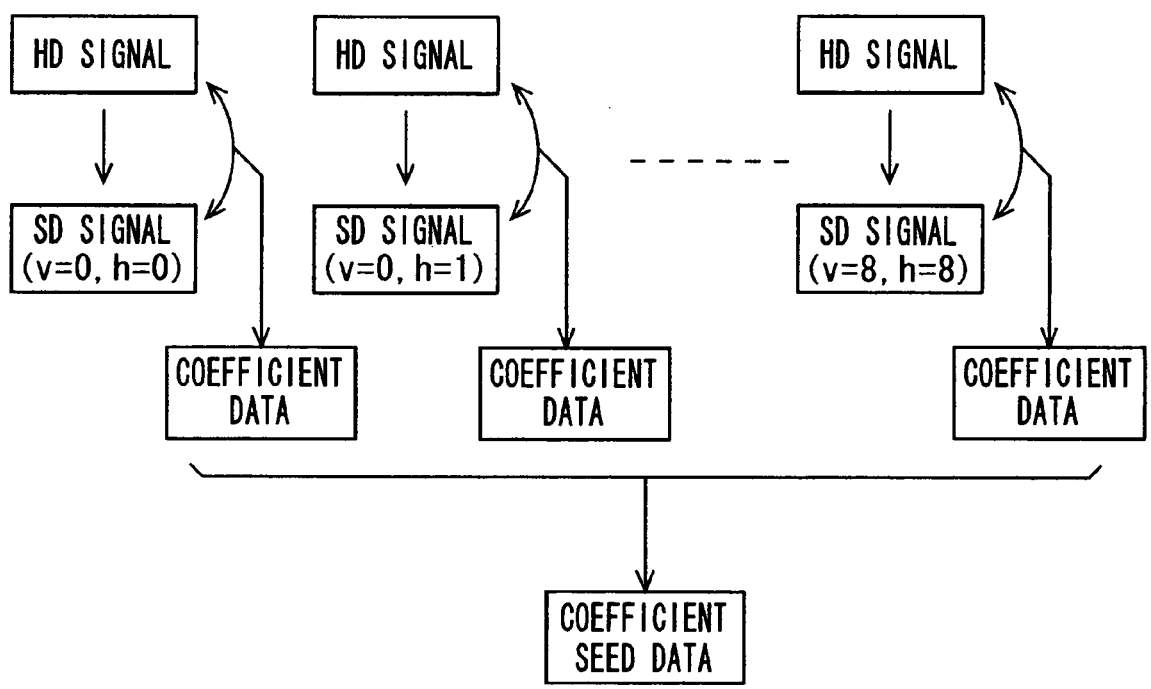
FIG. 20 is an illustration showing concept of another example of the method for producing coefficient seed data sets.

FIG. 20 shows a concept of this example. Based on this concept, a plurality of SD signals is produced from an HD signal. For example, SD signals of total 81 kinds are produced with the parameters h and v, respectively, for varying the horizontal and vertical bands of a filter used in production of the SD signals from the HD signal varying in nine steps. Then learning is performed between each of the SD signals thus produced and the HD signal so that the coefficient data sets Wi to be used in the estimation equation of the Equation (4) can be produced. Then, the coefficient seed data sets are produced using the coefficient data sets Wi thus produced corresponding to each of the SD signals.

First, how to obtain the coefficient data sets to be used in the estimation equation will be described. Herein, a description will be made as to a case where the coefficient data sets Wi (i=1 to n) to be used in the estimation equation of the Equation (4) are obtained using the least square method. Typically, a consideration will be made on an observation equation of following Equation (15) as a generalized example, defining X as input data sets, W as coefficient data sets, and Y as a prediction value.

$$XW = Y \quad (15)$$

$$X = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}, W = \begin{bmatrix} W_1 \\ W_2 \\ \cdots \\ W_n \end{bmatrix}, Y = \begin{bmatrix} y_1 \\ y_2 \\ \cdots \\ y_m \end{bmatrix}$$

In the Equation (15), term m indicates the number of learning data sets and term n indicates the number of prediction taps.

Data sets collected by the observation equation of the Equation (15) are subjected to the least square method. From this observation equation of the Equation (15), the following residual equation of Equation (16) is considered.

$$XW = Y + E, E = \begin{bmatrix} e_1 \\ e_2 \\ \cdots \\ e_m \end{bmatrix} \quad (16)$$

Based on the residual equation of the Equation (16), it is considered that the conditions are satisfied to minimize $e_2$ in following Equation (17). That is, it is necessary only to take the conditions of following Equation (18) into account.

$$e^2 = \sum_{i=1}^{m} e_i^2 \quad (17)$$

$$e_1 \frac{\partial e_1}{\partial w_i} + e_2 \frac{\partial e_2}{\partial w_i} + \cdots + e_m \frac{\partial e_m}{\partial w_i} = 0 \, (i = 1, 2, \cdots, n) \quad (18)$$

That is, conditions in the number of n based on the value i in the Equation (18) are considered, and $W_1, W_2, \ldots, W_n$ having values satisfying these conditions may be calculated. As such, from the residual equation of the Equation (16), following Equation (19) can be obtained. Further from the Equations (19) and (15), following Equation (20) can be obtained.

$$\frac{\partial e_i}{\partial w_i} = x_{i1}, \frac{\partial e_i}{\partial w_2} = x_{i2}, \cdots, \frac{\partial e_i}{\partial w_n} = x_{in} (i = 1, 2, \cdots, m) \quad (19)$$

$$\sum_{i=1}^{m} e_i x_{i1} = 0, \sum_{i=1}^{m} e_i x_{i2} = 0, \cdots, \sum_{i=1}^{m} e_i x_{in} = 0 \quad (20)$$

From the Equations (16) and (20), a normal equation of following Equation (21) can be obtained.

$$\begin{cases} \left(\sum_{j=1}^{m} x_{j1} x_{j1}\right) w_1 + \left(\sum_{j=1}^{m} x_{j1} x_{j2}\right) w_2 + \cdots + \left(\sum_{j=1}^{m} x_{j1} x_{jn}\right) w_n = \left(\sum_{j=1}^{m} x_{j1} y_j\right) \\ \left(\sum_{j=1}^{m} x_{j2} x_{j1}\right) w_1 + \left(\sum_{j=1}^{m} x_{j2} x_{j2}\right) w_2 + \cdots + \left(\sum_{j=1}^{m} x_{j2} x_{jn}\right) w_n = \left(\sum_{j=1}^{m} x_{j2} y_j\right) \\ \cdots \\ \left(\sum_{j=1}^{m} x_{jn} x_{j1}\right) w_1 + \left(\sum_{j=1}^{m} x_{jn} x_{j2}\right) w_2 + \cdots + \left(\sum_{j=1}^{m} x_{jn} x_{jn}\right) w_n = \left(\sum_{j=1}^{m} x_{jn} y_j\right) \end{cases} \quad (21)$$

Since the normal equation of the Equation (21) is capable of making equations in the same number as unknown number n, the most probable value of each Wi can be obtained. In this case, the simultaneous equations are solved using the sweeping-out method (a method of elimination by Gauss-Jordan) etc.

The following will describe how to obtain the coefficient seed data sets using the coefficient data sets produced in correspondence with each of the SD signals.

Suppose coefficient data sets in a certain class, which are obtained as a result of learning performed by use of the SD signals corresponding to the parameters h and v, to be $k_{vhi}$. Herein, the term i indicates a prediction tap number. From this value of $k_{vhi}$, coefficient seed data sets of this class are obtained.

Each of the coefficient data sets Wi (i=1 to n) is given by the above-mentioned Equation (5) using the coefficient seed data sets $w_{10}$ through $w_{n9}$. Herein, under the consideration that the least square method has bee used on the coefficient data sets Wi, the residual is given by following Equation (22).

$$e_{vhi} = k_{vhi} - (w_{i0} + w_{i1}v + w_{i2}h + w_{i3}v^2 + w_{i4}vh + w_{i5}h^2 + \quad (22)$$
$$w_{i6}v^3 + w_{i7}v^2h + w_{i8}vh^2 + w_{i9}h^3)$$
$$= k_{vhi} - \sum_{j=0}^{9} w_{ij}t_j$$

Herein, the term $t_j$ is given in the above-mentioned Equation (7). By performing the least square method on the Equation (22), following Equation (23) can be obtained.

$$\frac{\partial}{\partial w_{ij}} = \sum_v \sum_h (e_{vhi})^2 = \sum_v \sum_h \left(\frac{\partial e_{vhi}}{\partial w_{ij}}\right) e_{vhi} \quad (23)$$
$$= -\sum_v \sum_h 2t_j e_{vhi}$$
$$= 0$$

Herein, by defining $X_{jk}$ and $Y_j$ to be such as given in following Equations (24) and (25), respectively, the Equation (23) is changed to following Equation (26).

$$X_{jk} = \sum_v \sum_h t_j t_k \quad (24)$$

$$Y_j = \sum_v \sum_h t_j k_{vhi} \quad (25)$$

$$\begin{bmatrix} X_{00} & X_{01} & \cdots & X_{09} \\ X_{10} & X_{11} & \cdots & X_{19} \\ \vdots & \vdots & \ddots & \vdots \\ X_{90} & X_{91} & \cdots & X_{99} \end{bmatrix} \begin{bmatrix} w_{i0} \\ w_{i1} \\ \vdots \\ w_{i9} \end{bmatrix} = \begin{bmatrix} Y_0 \\ Y_1 \\ \vdots \\ Y_9 \end{bmatrix} \quad (26)$$

This Equation (26) is also a normal equation and so can be solved by a general solution such as the sweeping-out method, thus calculating the coefficient seed data sets $w_{10}$ through $w_{n9}$.

Figure 21:
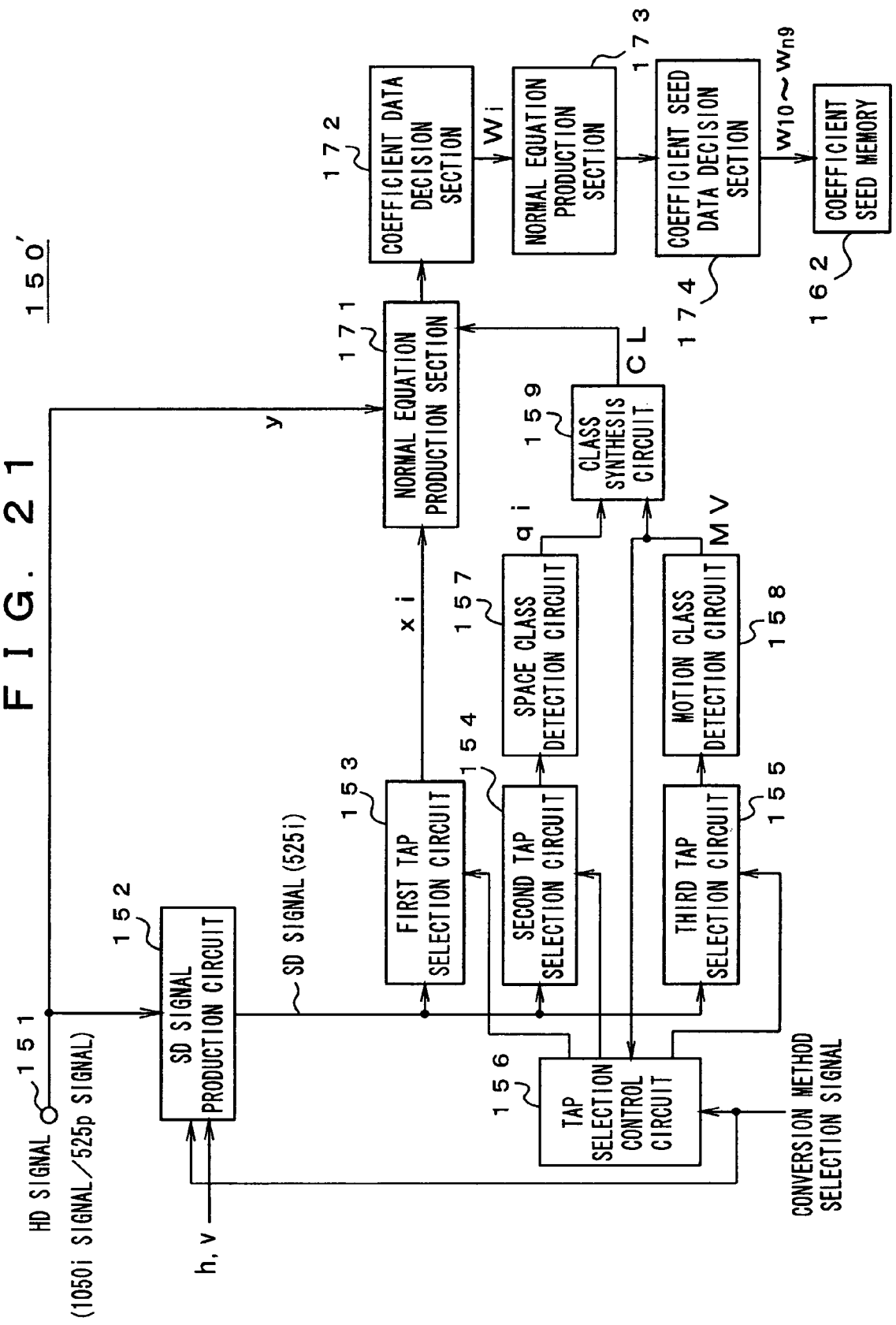
FIG. 21 is a block diagram showing a configuration example of another coefficient seed data production device.

FIG. 21 shows a configuration of another coefficient seed data production device 150' for producing coefficient seed data sets based on a concept shown in FIG. 20. In FIG. 21, components that correspond to those in FIG. 20 are indicated by the same reference symbols and their detailed description is omitted.

The coefficient seed data production device 150' includes normal equation production section 171 for producing a normal equation (see the Equation (21)) to be used for obtaining coefficient data sets Wi (i=1 to n) for each class, based on each of the HD pixel data sets y given as pixel data set of the objective position obtained from the HD signal received at the input terminal 151, data sets (SD pixel data sets) xi of the prediction tap selectively extracted by the first tap selection circuit 153 respectively in correspondence with each of the HD pixel data sets y thus obtained, and the class codes CL received from the class synthesis circuit 159 respectively in correspondence with each of the HD pixel data sets y thus obtained.

In this case, learning data sets are produced in combination of one of the HD pixel data sets y and the pixel data sets of the prediction tap in the number of n corresponding thereto. The parameters h and v to be supplied to the SD signal production circuit 152 are sequentially changed so that a plurality of SD signals which have horizontal and vertical bands changed step-wise can be sequentially produced, thus producing learning data sets between the HD signal and each of the SD signals. This permits the normal equation production section 171 to produce a normal equation for obtaining the coefficient data sets Wi (i=1 to n) for each class in respective correspondence with each of the SD signals.

Also, the coefficient seed data production device 150' includes a coefficient data decision section 172 for receiving data sets of the normal equation produced by the normal equation production section 171 to then solve this normal equation in order to obtain the coefficient data sets Wi for each class in respective correspondence to each SD signal, and a normal equation production section 173 for producing a normal equation (see the Equation (26)) for obtaining the coefficient seed data sets $w_{10}$ through $w_{n9}$ for each class using the class-specific coefficient data sets Wi that correspond to each of the SD signals.

Also, the coefficient seed data production device 150' includes a coefficient seed data decision section 174 for receiving data sets of the normal equation produced for each class by the normal equation production section 173 to then solve the normal equation for each class in order to obtain the coefficient seed data sets $w_{10}$ through $w_{n9}$ for each class, and the coefficient seed memory 162 for storing coefficient seed data sets $w_{10}$ through $w_{n9}$ thus obtained.

The other components of the coefficient seed data production device 150' shown in FIG. 21 are constituted like those of the coefficient seed data production device 150 shown in FIG. 18.

The following will describe the operations of the coefficient seed data production device 150'. At the input terminal 151, an HD signal (525p or 1050i signal) as a teacher signal is supplied. Then, the HD signal is subjected to the thinning-out processing horizontally and vertically in the SD signal production circuit 152, thus producing the SD signal (525i signal) as the input signal.

In this case, if the first conversion method (for obtaining the 525p signal from the 525i signal by the image signal processing section 110 shown in FIG. 1) is selected, the SD signal production circuit 152 performs a thinning-out processing on the 525p signal to produce the SD signal. On the other hand, if the second conversion method (for obtaining the 1050i signal from the 525i signal by the image signal processing section 110 shown in FIG. 1) is selected, the SD signal production circuit 152 performs a thinning-out processing on the 1050i signal to produce the SD signal. Also, in this case, the SD signal production circuit 152 receives the parameters h and v as the control signal so that a plurality of SD signals is sequentially produced with their horizontal and vertical bands varying in a step-by step manner.

Based on the SD signals (525i signals), the second tap selection circuit 154 selectively extracts the data sets (SD pixel data sets) of a space class tap located on a periphery of an objective position in the HD signal (525p or 1050i signal). This second tap selection circuit 154 selects a tap based on the tap position information, which is received from the tap selection control circuit 156, corresponding to a selected conversion method and a motion class detected by the motion class detection circuit 158.

The data sets (SD pixel data sets) of the space class tap selectively extracted by this second tap selection circuit 154 are supplied to the space class detection circuit 157. This space class detection circuit 157 performs ADRC processing on each of the SD pixel data sets given as the data sets of the space class tap to thereby obtain re-quantization codes qi used as class information of a space class (class grouping mainly for indicating of a waveform in a space) (see the Equation (1)).

Also, based on the SD signals produced by the SD signal production circuit 152, the third tap selection circuit 155 selectively extracts the data sets (SD pixel data sets) of a motion class tap located on a periphery of the objective position in the HD signal. In this case, the third tap selection circuit 155 selects a tap based on the tap position information, which is supplied from the tap selection control circuit 156, corresponding to the selected conversion method.

The data sets (SD pixel data sets) of the motion class tap selectively extracted by this third tap selection circuit 155 are supplied to the motion class detection circuit 158. This motion class detection circuit 158 obtains class information MV of a motion class (class grouping for mainly indicating a degree of motion) based on each of the SD pixel data sets given as data sets of the motion class tap.

The motion information MV and the above-mentioned re-quantization codes qi are supplied to the class synthesis circuit 159. This class synthesis circuit 159 obtains a class code CL that indicates a class including pixel data set of an objective position in the HD signal (525p or 1050i signal), based on this motion information MV and the re-quantization codes qi (see the Equation (3)).

Also, based on the SD signals produced by the SD signal production circuit 152, the first tap selection circuit 153 selectively extracts the data sets (SD pixel data sets) of a prediction tap located on a periphery of the objective position in the HD signal. In this case, the first tap selection circuit 153 selects a tap based on the tap position information, which is supplied from the tap selection control circuit 156, corresponding to the selected conversion method.

Then, the normal equation production section 171 produces a normal equation (see the Equation (21)) for obtaining coefficient data sets Wi (i=1 to n) for each class in respective correspondence to each of the SD signals produced by the SD signal production circuit 152 based on each of the HD pixel data sets y given as pixel data set of the objective position obtained from the HD signal received at the input terminal 151, the data sets (SD pixel data sets) xi of a prediction tap selectively extracted by the first tap selection circuit 153 in respective correspondence to each of the HD pixel data sets y thus given, and the class code CL received from the class synthesis circuit 159 in respective correspondence to each of the HD pixel data sets y thus given.

Then, this normal equation is solved by the coefficient data decision section 172 so that coefficient data sets Wi for each class in respective correspondence to each of the SD signals can be obtained. Based on the class-specific coefficient data sets Wi corresponding to each of the SD signals, the normal equation production section 173 produces a normal equation (see the Equation (26)) for obtaining coefficient seed data sets $w_{10}$ through $w_{n9}$ for each class.

Then, this normal equation is solved by the coefficient seed data decision section 174 so that the coefficient seed data sets $w_{10}$ through $w_{n9}$ for each class can be obtained. The coefficient seed data sets $w_{10}$ through $w_{n9}$ are stored in the coefficient seed memory 162 in which the addresses are sub-divided for each class.

Thus, the coefficient seed data production device 150' shown in FIG. 21 can also produce coefficient seed data sets $w_{10}$ through $w_{n9}$ for each class which are to be stored in the information memory bank 135 of the image signal processing section 110 shown in FIG. 1. In this case, the SD signal production circuit 152 can produce the SD signal (525i signal) using the 525p or 1050i signal based on a selected conversion method, and it can also specifically produce coefficient seed data sets that correspond to any one of the first conversion method (for obtaining the 525p signal from the 525i signal at the image signal processing section 110) and the second conversion method (for obtaining the 1050i signal from the 525i signal at the image signal processing section 110).

Although the image signal processing section 110 of FIG. 1 uses a production equation of the Equation (5) in order to produce the coefficient data sets Wi (i=1 to n), the invention is not limited thereto; for example, following Equation (27) or (28) or even a polynomial with a different degree or an equation expressed by other functions may be used.

$$W_1 = w_{10} + w_{11}v + w_{12}h + w_{13}v^2 + w_{14}h^2 + w_{15}v^3 + w_{16}h^3 \quad (27)$$
$$W_2 = w_{20} + w_{21}v + w_{22}h + w_{23}v^2 + w_{24}h^2 + w_{25}v^3 + w_{26}h^3$$
$$\vdots$$
$$W_i = w_{i0} + w_{i1}v + w_{i2}h + w_{i3}v^2 + w_{i4}h^2 + w_{i5}v^3 + w_{i6}h^3$$
$$\vdots$$
$$W_n = w_{n0} + w_{n1}v + w_{n2}h + w_{n3}v^2 + w_{n4}h^2 + w_{n5}v^3 + w_{n6}h^3$$

$$W_1 = w_{10} + w_{11}v + w_{12}h + w_{13}v^2 + w_{14}vh + w_{15}h^2 \quad (28)$$
$$W_2 = w_{20} + w_{21}v + w_{22}h + w_{23}v^2 + w_{24}vh + w_{25}h^2$$
$$\vdots$$
$$W_i = w_{i0} + w_{i1}v + w_{i2}h + w_{i3}v^2 + w_{i4}vh + w_{i5}h^2$$
$$\vdots$$
$$W_n = w_{n0} + w_{n1}v + w_{n2}h + w_{n3}v^2 + w_{n4}vh + w_{n5}h^2$$

Also, although the image signal processing section 110 of FIG. 1 can set the parameters h and v which specify horizontal and vertical resolutions respectively to then adjust the values of these parameters of plural kinds for adjustment of the horizontal and vertical resolutions of an image, the invention is not limited thereto; for example, a parameter z which specifies a degree of noise cancellation (degree of noise reduction) may be provided so that its value can be adjusted to adjust the noise cancellation degree in the image.

In this case, for example, following Equation (29) or (30) may be used as a production equation to produce coefficient data sets Wi (i=1 to n) or even a polynomial with a different degree or an equation which can be expressed by other functions may be used.

$$W_1 = w_{10} + w_{11}z + w_{12}z^2 + w_{13}z^3 \quad (29)$$
$$W_2 = w_{20} + w_{21}z + w_{22}z^2 + w_{23}z^3$$
$$\vdots$$
$$W_i = w_{i0} + w_{i1}z + w_{i2}z^2 + w_{i3}z^3$$
$$\vdots$$
$$W_n = w_{n0} + w_{n1}z + w_{n2}z^2 + w_{n3}z^3$$

$$W_1 = w_{10} + w_{11}z + w_{12}z^2 \quad (30)$$
$$W_2 = w_{20} + w_{21}z + w_{22}z^2$$
$$\vdots$$
$$W_i = w_{i0} + w_{i1}z + w_{i2}z^2$$
$$\vdots$$
$$W_n = w_{n0} + w_{n1}z + w_{n2}z^2$$

The coefficient seed data sets, which are coefficient data sets in the production equation containing the parameter z as mentioned above, can be produced by the coefficient seed data production device 150 shown in FIG. 18 or the coefficient seed data production device 150' shown in FIG. 21 like in a case of producing the coefficient seed data sets, which are coefficient data sets in the production equation containing the above-mentioned parameters h and v.

In this case, the SD signal production circuit 152 receives the parameter z as a control signal, so that a noise adding state into the SD signal is changed step-wise corresponding to a value of this parameter z when the SD signals are produced from the HD signal. By thus varying step-wise the noise adding state into the SD signals to register learning data sets, the coefficient seed data sets can be produced for obtaining continuous noise cancellation degrees.

The following will give some examples of the details of a noise adding method that corresponds to a value of the parameter z.

Figure 22A:
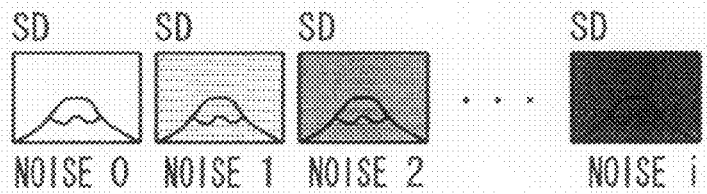
FIGS. 22A-22C are illustrations each for explaining a noise adding method.

For example, as shown in FIG. 22A, by adding into each of the SD signals a noise signal having its step-wise changed amplitude level, the SD signals are produced with their noise level varying step-wise.

Figure 22B:
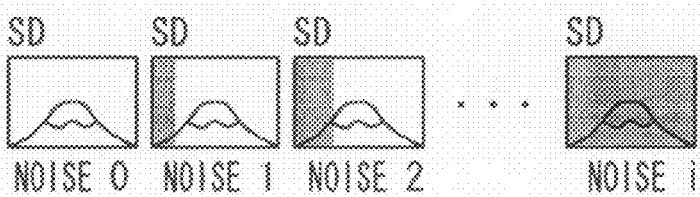

Alternatively, for example, as shown in FIG. 22B, when a noise signal having a constant amplitude level is added to each of the SD signals, a screen region to be added varies step-wise.

Figure 22C:
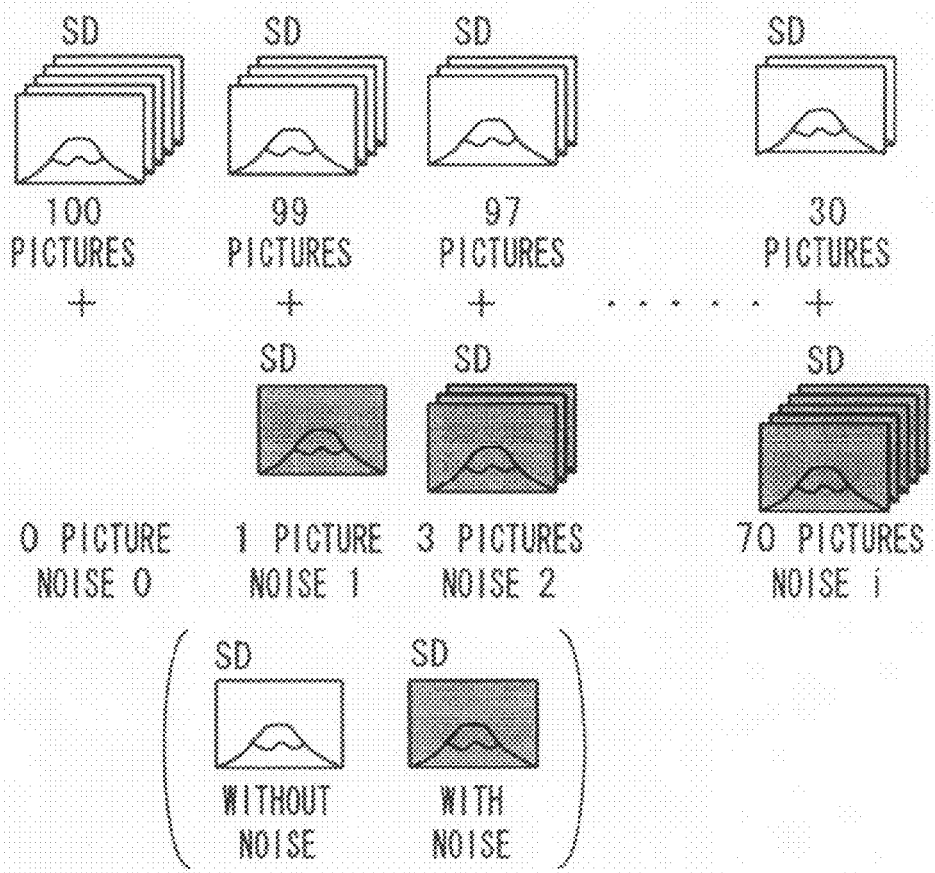

Further, for example, as shown in FIG. 22C, as the SD signal (for one screen) are prepared one that contains no noise and another that contains noise. Then, when a normal equation is produced, a plurality of learning is performed on each of the SD signals.

For example, for "noise 0", learning is performed 100 times on each of the SD signals containing no noise, while for "noise i", learning is performed 30 times on each of the SD signals containing no noise and 70 times on each of the SD signals containing noise. Therefore, "noise i" provides a learning system of calculating the coefficient seed data sets with a higher noise cancellation. By thus varying step-wise the number of times of learning performed on the SD signals containing no noise and that containing noise, coefficient seed data sets for obtaining continuous noise cancellation degrees can be obtained.

Although not described above, this method can be also implemented in a form of addition of normal equations.

First, learning is performed so as to calculate coefficient data sets to be used in the estimation equations for "noise 0" through "noise i". In this case, the above-mentioned Equation (21) is used as the normal equation employed in this calculation. Defining $P_{ij}$ and $Q_j$ to be such as given in following Equations (31) and (32), respectively, the Equation (21) can be changed into following Equation (33).

$$P_{ij} = \sum_{p} x_{pi} x_{pj} \tag{31}$$

$$Q_j = \sum_{p} x_{pj} y_p \tag{32}$$

$$\begin{bmatrix} P_{11} & P_{12} & \cdots & P_{1n} \\ P_{21} & P_{22} & \cdots & P_{2n} \\ \vdots & \vdots & \ddots & \vdots \\ P_{n1} & P_{n2} & \cdots & P_{nn} \end{bmatrix} \begin{bmatrix} w_1 \\ w_2 \\ \vdots \\ w_n \end{bmatrix} = \begin{bmatrix} Q_1 \\ Q_2 \\ \vdots \\ Q_n \end{bmatrix} \tag{33}$$

In these equations, x$ij$ indicates the i-th learned value of the SD pixel data sets of the j-th prediction tap position, $y_i$ indicates the i-th learned value of HD pixel data sets, and Wi indicates a coefficient.

Through such learning, the left-hand side member and the right-hand side member of the Equation (33) are defined to be [P1$_{ij}$] and [Q1$_i$] respectively in a case where the SD signal containing no noise is learned, while likewise the left-hand member and the right-hand side member of the Equation (33) are defined to be [P2$_{ij}$] and [Q2$_i$] respectively in a case where the SD signal containing noise is learned. In such a case, [P$_{aij}$] and [Q$_{ai}$] are defined like in following Equations (34) and (35). Herein, the term "a" satisfies a relationship of $0 \leq a \leq 1$.

$$[P_{aij}] = (1-a)[P1_{ij}] + a[P2_{ij}] \tag{34}$$

$$[Q_{ai}] = (1-a)[Q1_i] + a[Q2_i] \tag{35}$$

In this case, a normal equation for a=0 is given by following Equation (36) and equivalent to that for "noise 0" of FIG. 22C, while that for a=0.7 is equivalent to a normal equation for "noise i" of FIG. 22C.

$$[P_{aij}][W_i] = [Q_{ai}] \tag{36}$$

By step-wise varying the value of this "a" to produce a normal equation for each noise level, target coefficient seed data sets can be obtained. In this case, as explained with the coefficient seed data production device 150' of FIG. 21, the normal equation for each noise level is used to calculate coefficient data sets Wi, which is in turn used to obtain coefficient seed data sets.

Also, by combining the normal equations for all of the noise levels, it is possible to produce the normal equation such as the above-mentioned Equation (13) for obtaining coefficient seed data sets. This method is specifically described as follow. Here, such an example is considered as to produce a normal equation for obtaining the coefficient seed data sets using the above-mentioned Equation (30).

SD signals which have noise levels corresponding to some kinds of parameters z are produced beforehand and then learning is performed on the SD signals, so that [P] and [Q] given in the above-mentioned Equations (34) and (35) are prepared, respectively. These are expressed as [P$_{mj}$] and [Q$_{mi}$], respectively. Also, the above-mentioned Equation (7) is changed into following Equation (37):

$$t_0 = 1, \; t_1 = z, \; t_2 = z^2 \tag{37}$$

In this case, the above-mentioned Equations (24) and (25) are changed to following Equations (38) and (39), respectively. By solving following Equation (40) with respect to these equations, the coefficient seed data sets $w_{ij}$ can be obtained. In this case, a variable indicating a total sum of prediction taps is changed to m.

$$X_{ipjq} = \sum_{z} t_p t_q P_{zij} \tag{38}$$

$$Y_{ip} = \sum_{z} t_p Q_{zi} \tag{39}$$

$$\begin{bmatrix} X_{1010} & X_{1011} & X_{1012} & X_{1020} & \cdots & X_{10m2} \\ X_{1110} & X_{1111} & X_{1112} & X_{1120} & \cdots & X_{11m2} \\ X_{1210} & X_{1211} & X_{1212} & X_{1220} & \cdots & X_{12m2} \\ X_{2010} & X_{2011} & X_{2012} & X_{2020} & \cdots & X_{20m2} \\ \vdots & \vdots & \vdots & \vdots & \ddots & \vdots \\ X_{m210} & X_{m211} & X_{m212} & X_{m220} & \cdots & X_{m2m2} \end{bmatrix} \begin{bmatrix} w_{10} \\ w_{11} \\ w_{12} \\ w_{20} \\ \vdots \\ w_{m2} \end{bmatrix} = \begin{bmatrix} Y_{10} \\ Y_{11} \\ Y_{12} \\ Y_{20} \\ \vdots \\ Y_{m2} \end{bmatrix} \tag{40}$$

Also, although the image signal processing section 110 of FIG. 1 sets the parameters h and v for specifying the horizontal and vertical resolutions respectively and adjusts the values of these parameters of plural kinds to thereby adjust the horizontal and vertical resolutions of an image, the invention is not limited thereto; for example, both the horizontal and vertical resolutions may be adapted to be adjusted by one parameter in configuration. For example, one parameter r may be set to specify the horizontal and vertical resolutions. In this case, for example, the parameter r is supposed to have a relationship between r=1 and h=1, v=1; between r=2 and h=2, v=2; between r=1 and h=1, v=2; between r=2 and h=2, v=3, . . . . In this case, as a production equation for producing the coefficient data sets Wi (i=1 to n), an r's polynomial etc. is used.

Also, although the image signal processing section 110 of FIG. 1 sets the parameters h and v for specifying the horizontal and vertical resolutions respectively and adjusts their values to thereby adjust the horizontal and vertical resolutions of an image, the invention is not limited thereto; for example, the parameter r for adjusting these horizontal and vertical resolutions and the above-mentioned parameter z for specifying the above-mentioned noise cancellation degree (noise reduction degree) may be set to adjust the values of these parameters r and z, thus adjusting the horizontal and vertical resolutions of an image and the noise cancellation degree in a similar configuration.

In this case, as a production equation for producing coefficient data sets Wi (i=1 to n), for example, following Equation (41) may be used and even a polynomial with a different degree or an equation expressed by other functions may be used for implementation.

$$\begin{aligned}
W_1 &= w_{10} + w_{11}r + w_{12}z + w_{13}r^2 + w_{14}rz + w_{15}z^2 + \\
&\quad w_{16}r^3 + w_{17}r^2z + w_{18}rz^2 + w_{19}z^3 \\
W_2 &= w_{20} + w_{21}r + w_{22}z + w_{23}r^2 + w_{24}rz + w_{25}z^2 + \\
&\quad w_{26}r^3 + w_{27}r^2z + w_{28}rz^2 + w_{29}z^3 \\
&\vdots \\
W_i &= w_{i0} + w_{i1}r + w_{i2}z + w_{i3}r^2 + w_{i4}rz + w_{i5}z^2 + \\
&\quad w_{i6}r^3 + w_{i7}r^2z + w_{i8}rz^2 + w_{i9}z^3 \\
&\vdots \\
W_n &= w_{n0} + w_{n1}r + w_{n2}z + w_{n3}r^2 + w_{n4}rz + w_{n5}z^2 + \\
&\quad w_{n6}r^3 + w_{n7}r^2z + w_{n8}rz^2 + w_{n9}z^3
\end{aligned} \quad (41)$$

Figure 24:
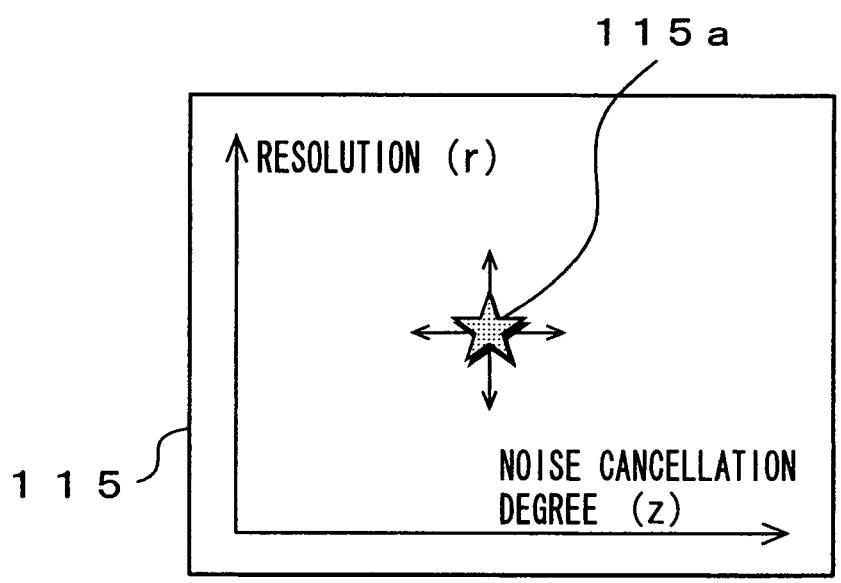
FIG. 24 is an illustration showing one example of the adjustment screen for the parameters r and z.

Thus, a user interface for adjusting the parameters r and z can be also constituted as shown in FIG. 2. The user can operate the joystick 200a to thereby move the position of the icon 115a on the adjustment screen 115, thus arbitrarily adjusting the values of the parameters r and z which specify the resolution and the noise cancellation degree (noise reduction degree), respectively. FIG. 24 shows an expanded part of the adjustment screen 115. When the icon 115a is moved from side to side, the value of the parameter r for determining the resolution can be adjusted, while when it is moved up and down, the value of the parameter z for determining the noise cancellation degree can be adjusted.

The user can easily adjust the parameters r and z with referencing the adjustment screen 115 displayed on the display section 111 (see FIG. 2). Note here that the values of the parameters r and z adjusted by the user may be digitally indicated on the adjustment screen 115.

Thus, the coefficient seed data sets, which are coefficient data sets in the production equation containing the parameters r and z, can be produced by the coefficient seed data production device 150 shown in FIG. 18 or the coefficient seed data production device 150' shown in FIG. 21 like in a case of producing the coefficient seed data sets, which are coefficient data sets in the production equation containing the above-mentioned parameters h and v.

In this case, the SD signal production circuit 152 receives parameters r and z as the control signals, so that when the SD signals are produced from the HD signal, the horizontal and vertical bands of each of the SD signals and the state of adding noise into the SD signals vary step-wise corresponding to the values of these parameters r and z.

Figure 23:
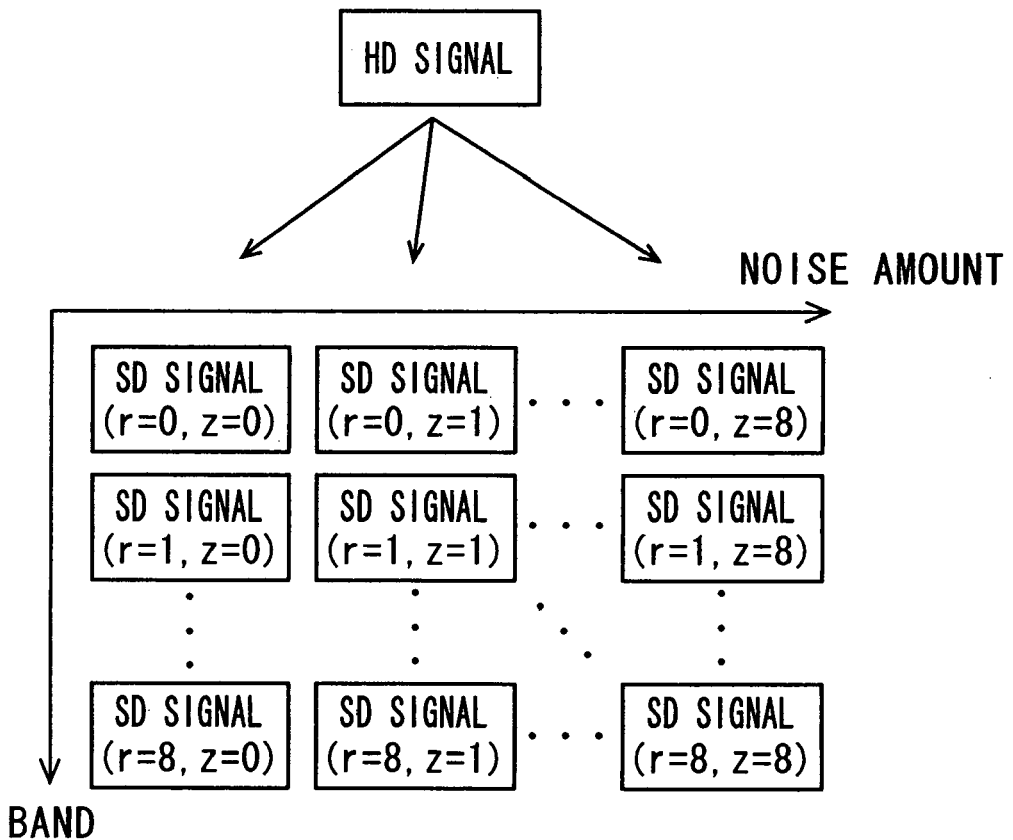
FIG. 23 is an illustration showing an example of producing an SD signal (parameters: r and z)

FIG. 23 shows an example of producing the SD signals each corresponding to the values of the parameters r and z. In this example, the parameters r and z vary in nine steps, respectively, to produce SD signals of total 81 kinds. The parameters r and z may vary in 10 steps or more. In this case, the accuracy is improved for calculating the coefficient seed data sets but the amount of calculations to be performed is increased.

Also, although the image signal processing section 110 of FIG. 1 sets the parameters h and v which specify the horizontal and vertical resolutions respectively and adjusts their values to adjust the horizontal and vertical resolutions of an image, the invention is not limited thereto; for example, the above-mentioned parameter z for specifying the noise cancellation degree (noise reduction degree) may similarly be set, besides these parameters h and v so that the values of these parameters h, v, and z can be adjusted, thereby adjusting the horizontal and vertical resolutions and the noise cancellation degree in configuration.

In this case, as a production equation for producing the coefficient data sets Wi (i=1 to n), for example, following Equation (42) may be used and even a polynomial with a different degree or an equation expressed by other functions may be used for implementation.

$$\begin{aligned}
W_1 &= w_{1\_0} + \\
&\quad w_{1\_1}v + w_{1\_2}h + w_{1\_3}z + \\
&\quad w_{1\_4}v^2 + w_{1\_5}h^2 + w_{1\_6}z^2 + w_{1\_7}vh + w_{1\_8}hz + w_{1\_9}zv + \\
&\quad w_{1\_10}v^3 + w_{1\_11}h^3 + w_{1\_12}z^3 + w_{1\_13}v^2h + w_{1\_14}vh^2 + w_{1\_15}vhz + \\
&\quad w_{1\_16}vz^2 + w_{1\_17}h^2z + w_{1\_18}hz^2 + w_{1\_19}z^3 \\
W_2 &= w_{2\_0} + \\
&\quad w_{2\_1}v + w_{2\_2}h + w_{2\_3}z + \\
&\quad w_{2\_4}v^2 + w_{2\_5}h^2 + w_{2\_6}z^2 + w_{2\_7}vh + w_{2\_8}hz + w_{2\_9}zv + \\
&\quad w_{2\_10}v^3 + w_{2\_11}h^3 + w_{2\_12}z^3 + w_{2\_13}v^2h + w_{2\_14}vh^2 + w_{2\_15}vhz + \\
&\quad w_{2\_16}vz^2 + w_{2\_17}h^2z + w_{2\_18}hz^2 + w_{2\_19}z^3 \\
&\vdots \\
W_i &= w_{i\_0} + \\
&\quad w_{i\_1}v + w_{i\_2}h + w_{i\_3}z + \\
&\quad w_{i\_4}v^2 + w_{i\_5}h^2 + w_{i\_6}z^2 + w_{i\_7}vh + w_{i\_8}hz + w_{i\_9}zv + \\
&\quad w_{i\_10}v^3 + w_{i\_11}h^3 + w_{i\_12}z^3 + w_{i\_13}v^2h + w_{i\_14}vh^2 + w_{i\_15}vhz + \\
&\quad w_{i\_16}vz^2 + w_{i\_17}h^2z + w_{i\_18}hz^2 + w_{i\_19}z^3 \\
&\vdots \\
W_n &= w_{n\_0} + \\
&\quad w_{n\_1}v + w_{n\_2}h + w_{n\_3}z + \\
&\quad w_{n\_4}v^2 + w_{n\_5}h^2 + w_{n\_6}z^2 + w_{n\_7}vh + w_{n\_8}hz + w_{n\_9}zv + \\
&\quad w_{n\_10}v^3 + w_{n\_11}h^3 + w_{n\_12}z^3 + w_{n\_13}v^2h + w_{n\_14}vh^2 + w_{n\_15}vhz + \\
&\quad w_{n\_16}vz^2 + w_{n\_17}h^2z + w_{n\_18}hz^2 + w_{n\_19}z^3
\end{aligned} \quad (42)$$

Thus, a user interface for adjusting the parameters h, v, and z can also be constituted as shown in FIG. 2. The user can operate the joystick 200a to move the position of the icon 115a on the adjustment screen 115, thus arbitrarily adjusting the values of the parameters h and v which specify the resolutions and of the parameter z that specifies the noise cancellation degree (noise reduction degree).

Figure 26:
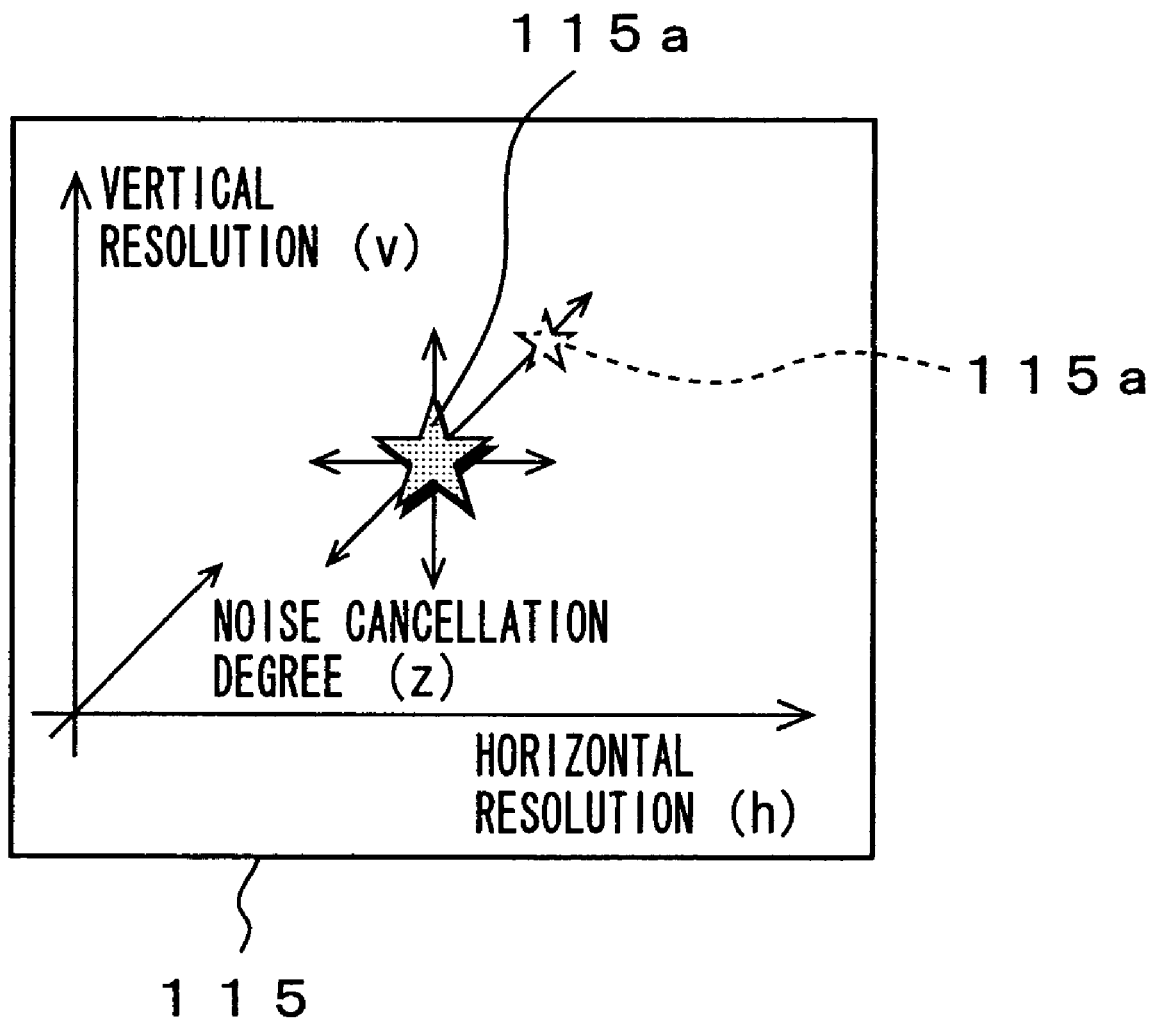
FIG. 26 is an illustration showing one example of the adjustment screen for the parameters h, v, and z.

FIG. 26 shows an expanded part of the adjustment screen 115. When the icon 115a is moved from side to side, the value of the parameter h for deciding the horizontal resolution can be adjusted; when it is moved up and down, the value of the parameter v for deciding the vertical resolution can be adjusted; and when the icon 115a is moved in the depth direction, the parameter z for adjusting the noise cancellation degree can be adjusted. To move the icon 115a in the depth direction, for example, the joystick 200a can be obliquely operated.

In this case, the depth direction can be expressed by changing the size, the color thickness or hue, etc. of the icon 115a. The icon 115a indicated by a broken line is changed in size to indicate that the icon 115a itself indicated by a solid line in the figure has moved in the depth direction.

The user can easily adjust the parameters h, v, and z with referencing the adjustment screen 115 displayed on the display section 111 (see FIG. 2). The values of the parameters h, v, and z adjusted by the user may be digitally indicated on the adjustment screen 115.

Thus, the coefficient seed data sets, which are coefficient data sets in the production equation containing the parameters h, v, and z, can be produced by the coefficient seed data production device 150 shown in FIG. 18 or the coefficient seed data production device 150' shown in FIG. 21 like in a case of producing coefficient seed data sets, which are coefficient data sets in the production equation containing the above-mentioned parameters h and v.

In this case, the SD signal production circuit 152 receives the parameters h, v, and z as the control signals, so that when the SD signals are produced from the HD signal, the horizontal and vertical bands of each of the SD signals and the state of adding noise into the SD signals vary step-wise corresponding to the values of these parameters h, v, and z.

Figure 25:
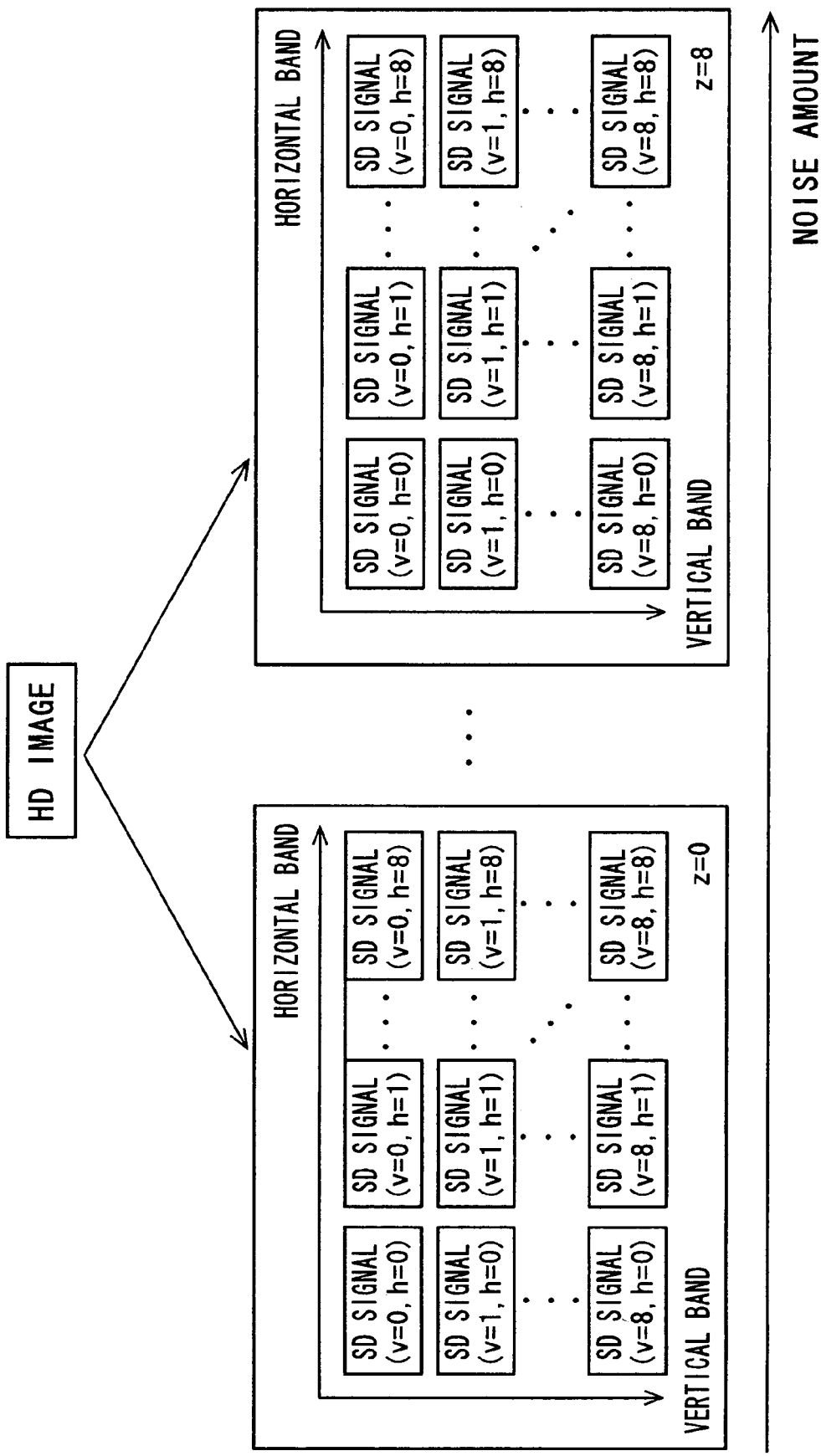
FIG. 25 is an illustration showing an example of producing the SD signal (parameters: h, v, and z)

FIG. 25 shows an example of producing the SD signals each corresponding to the values of the parameters h, v, and z. In this example, the parameters h, v, and z vary in nine steps, respectively, to produce SD signals of total 729 kinds. The parameters h, v, and z may vary in 10 steps or more. In this case, the accuracy is improved for calculating the coefficient seed data sets but the amount of calculations to be performed is increased.

Figure 27:
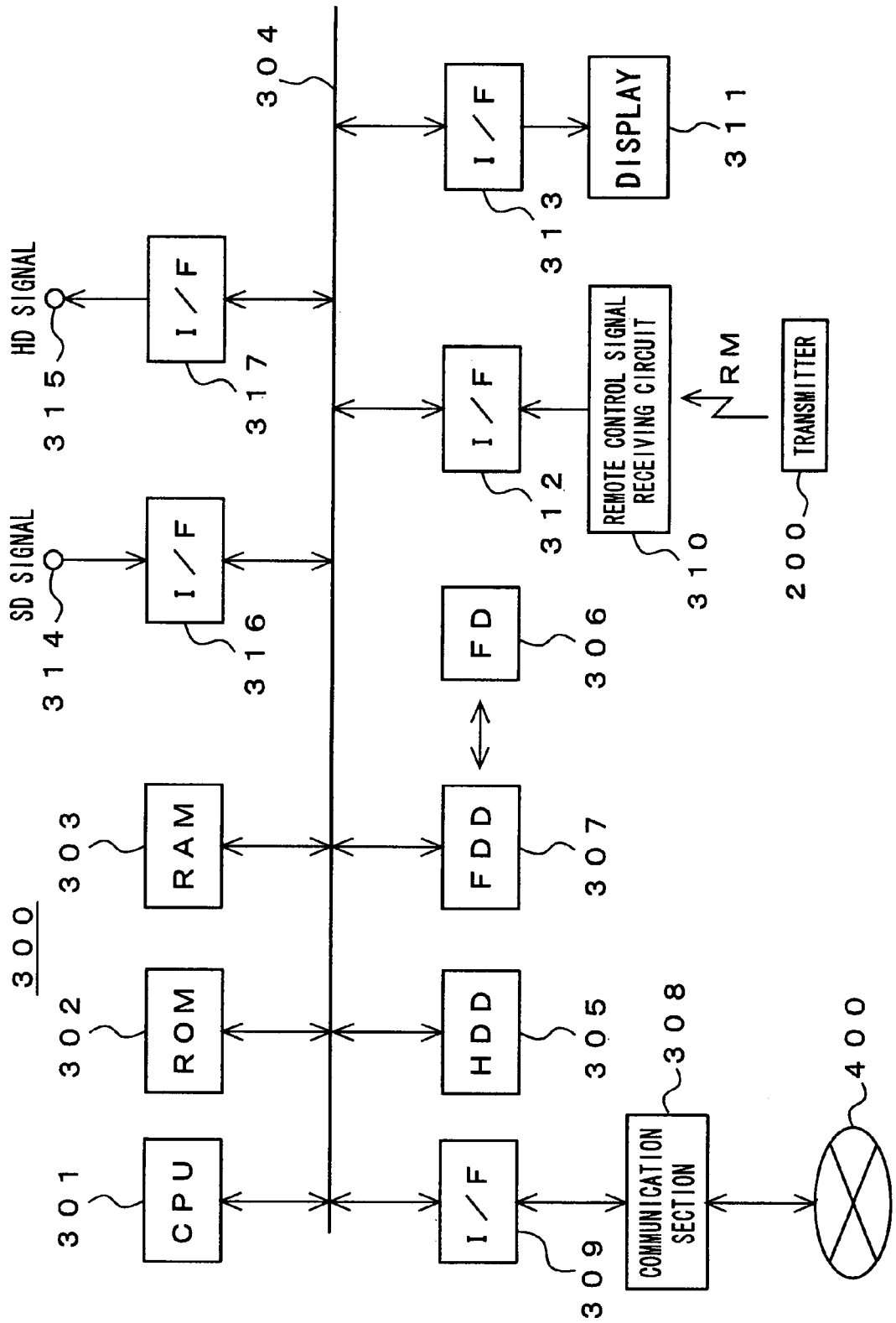
FIG. 27 is a block diagram showing a configuration example of an image signal processor for software-wise implementation.

Alternatively, the processing performed at the image signal processing section 110 of FIG. 1 may be carried out software-wise by, for example, an image signal processor 300 shown in FIG. 27.

First, the image signal processor 300 shown in FIG. 27 will be described. This image signal processor 300 comprises a CPU 301 for controlling the operations of the apparatus as a whole, a ROM (Read Only Memory) 302 for storing operation programs of this CPU 301, coefficient seed data sets, etc., and a RAM (Random Access Memory) 303 constituting a work area for the CPU 301. These CPU 301, ROM 302, and RAM 303 are all connected to a bus 304.

Also, the image signal processor 300 comprises a hard disk drive (HDD) 305 and a flexible disk (hereinafter called a floppy disk) drive (FDD) 307 for driving a floppy disk 306, which are used as an external memory. These drives 305 and 307 are both connected to the bus 304.

Also, the image signal processor 300 comprises a communication section 308 for connecting to a communication network 400 such as the Internet through either wired transmission or wireless transmission. This communication section 308 is connected to the bus 304 via an interface 309.

Also, the image signal processor 300 comprises a user interface section. This user interface section has a remote control signal receiving circuit 310 for receiving a remote control signal RM from a remote control transmitter 200, and a display 311 consisting of an Liquid Crystal Display (LCD) and the like. The remote control signal receiving circuit 310 is connected via an interface 312 to the bus 304 and, similarly, the display 311 is connected via an interface 313 to the bus 304.

Also, the image signal processor 300 comprises an input terminal 314 for receiving the SD signal, and an output terminal 315 for transmitting the HD signal. The input terminal 314 is connected via an interface 316 to the bus 304 and, similarly, the output terminal 315 is connected via an interface 317 to the bus 304.

Instead of storing the processing programs, the coefficient seed data sets, etc. in the ROM 302 beforehand as mentioned above, for example, they may be downloaded via the communication section 308 from the communication network 400 such as the Internet, and accumulated on the hard disk or in the RAM 303 for use. Also, these processing programs, the coefficient seed data sets, etc. may be provided on the floppy disk 306.

Also, instead of inputting the SD signal to be processed through the input terminal 314, the SD signal may be recorded on the hard disk beforehand or downloaded via the communication section 308 from the communication network 400 such as the Internet. Also, instead of transmitting processed HD signal through the output terminal 315 or concurrent with this, an image of the processed HD signal may be supplied to the display 311 to be displayed thereon, the processed HD signal may be stored on the hard disk or it may be sent via the communication section 308 to the communication network 400 such as the Internet.

Figure 28:
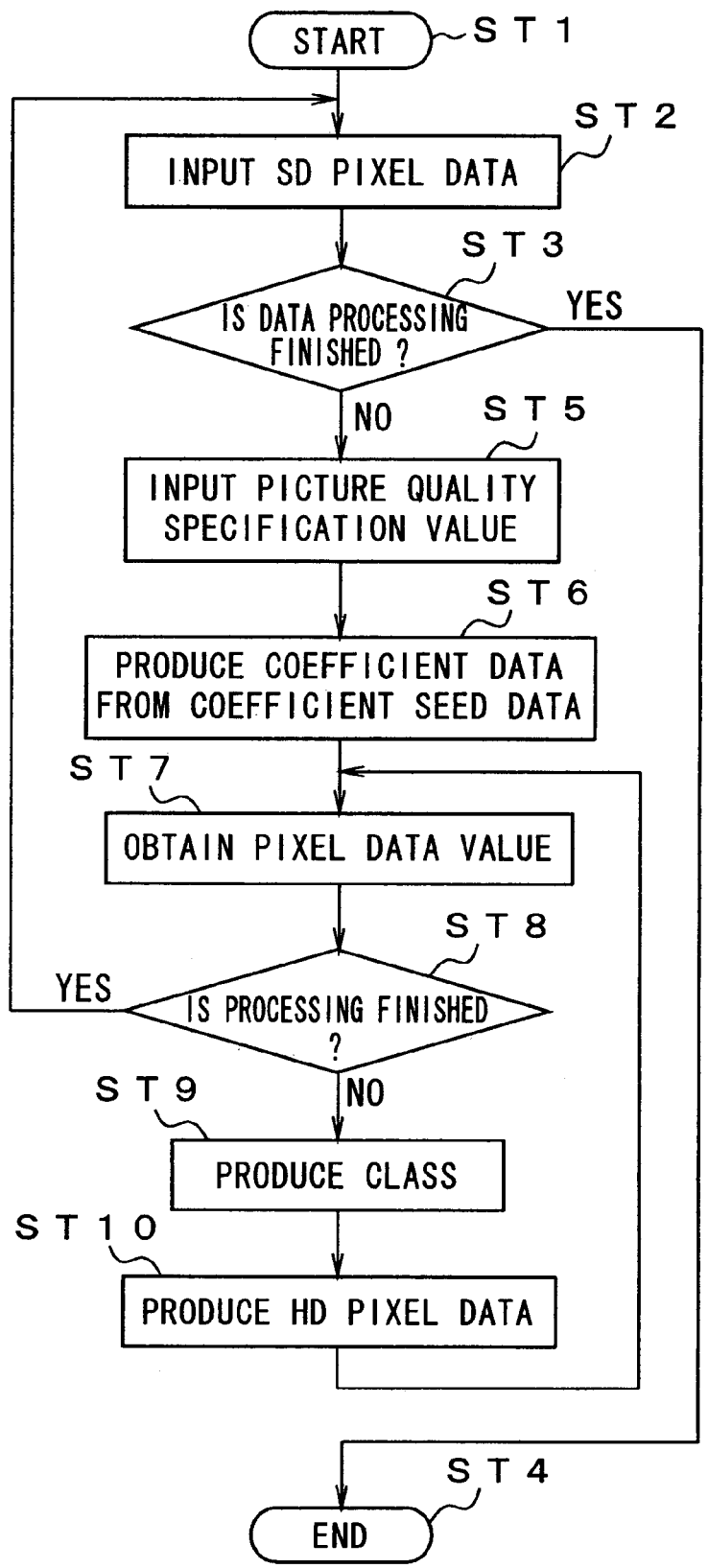
FIG. 28 is a flowchart showing a procedure for processing an image signal.

The following will describe a processing procedure for obtaining HD signal from SD signal at the image signal processor 300 shown in FIG. 27 with reference to a flowchart of FIG. 28.

First, the processing starts at step ST1 and, at step ST2, SD pixel data sets are input in units of a frame or a field. If the SD pixel data sets are input through the input terminal 314, then the RAM 303 temporarily stores the SD pixel data sets. Also, if the SD pixel sets are recorded on a hard disk, then the SD pixel data sets are read out of the hard disk drive 307 and the RAM 303 temporarily stores them. At step ST3 then, it is judged whether or not the processing of the input SD pixel data sets in all the frames or fields is finished. If it is finished, then the process finishes at step ST4. Contrarily, if it is not finished, then the procedure goes to step ST5.

At step ST5, a picture quality specification value (for example, a value of the parameter h or v) input by the user under the control of the remote control transmitter 200 is read out of the RAM 303, for example. At step ST6 then, the coefficient data sets Wi to be used in the estimation equation (see the Equation (4)) for each class are produced according to a production equation (see the Equation (5)) using thus read picture quality specification value and the coefficient seed data sets for each class.

Next, at step ST7, based on the SD pixel data sets input at step ST2, pixel data sets of class taps and prediction taps corresponding to each HD pixel data set to be produced are obtained. At step ST8 then, it is judged whether or not the processing of obtaining the HD pixel data sets in all the regions of the input SD pixel data sets is finished. If it is finished, then the procedure returns to step ST2, thus shifting to the processing of inputting SD pixel data set of the next frame or field. On the other hand, if it is not finished, then the procedure goes to step ST9.

At step ST9, a class code CL is produced from the SD pixel data sets of the class taps obtained at step ST7. At step ST10 then, the HD pixel data sets are produced according to the estimation equation using the coefficient data sets corresponding to that class code CL and the SD pixel data sets of the prediction taps, and then the procedure returns to step ST7 wherein the above-mentioned processing is repeated.

Thus, the processing along the flowchart shown in FIG. 28 is performed to process the SD pixel data sets that constitute the input SD signal, so that HD pixel data sets that constitute the HD signal sets can be obtained. As mentioned above, the HD signal thus processed and obtained is transmitted through the output terminal 315 or supplied to the display 311 that displays an image thereon or even supplied to the hard disk drive 305 that records them on a hard disk.

Also, the processing at the coefficient seed data production device 150 of FIG. 18 can be carried out software-wise by a processing apparatus, not shown.

Figure 29:
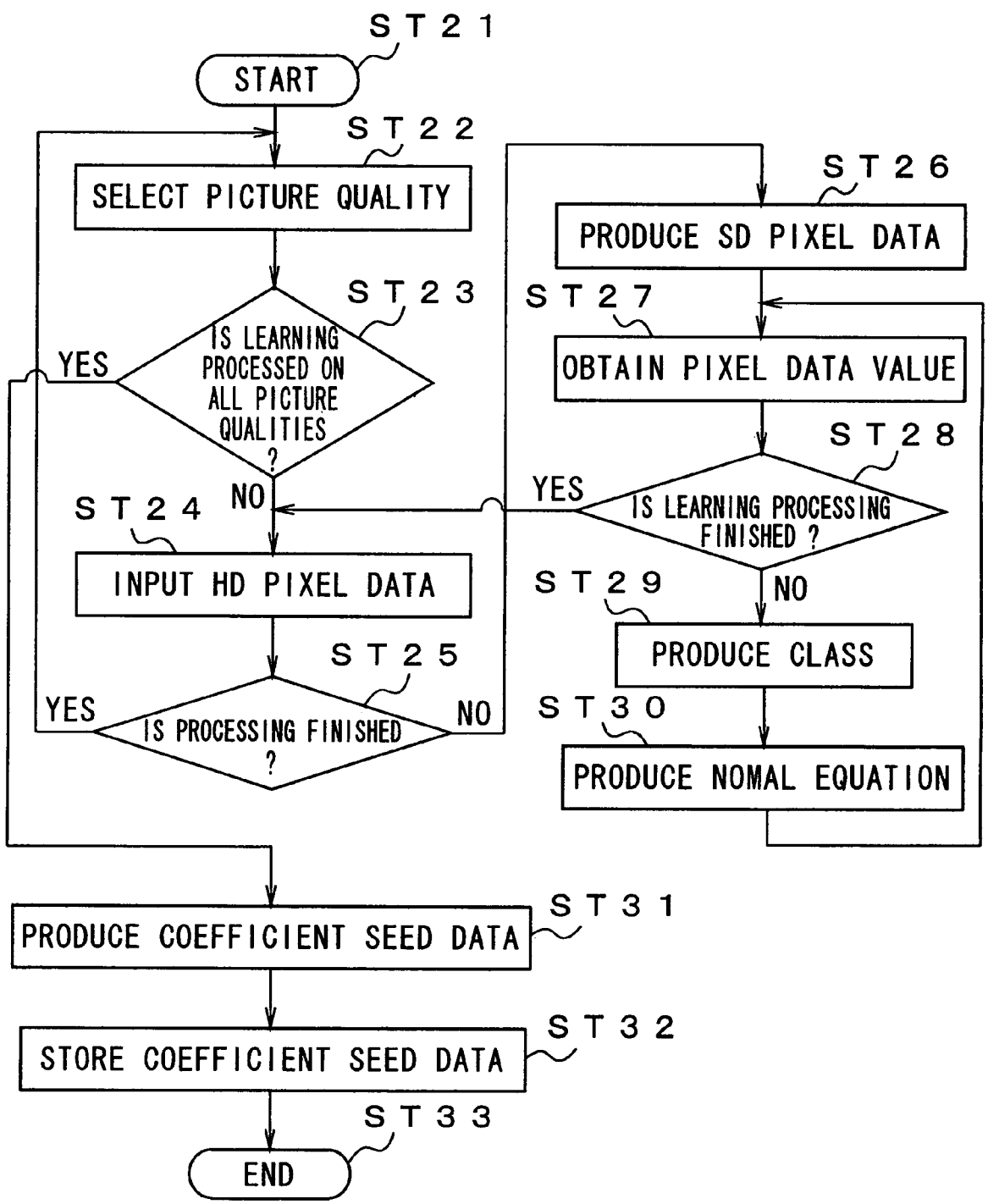
FIG. 29 is a flowchart showing coefficient seed data production processing (part 1)

The following will describe a processing procedure for producing coefficient seed data sets with reference to a flowchart of FIG. 29.

First, the procedure starts at step ST21 and, at step ST22, a picture quality pattern (which is identified by, for example, the parameters h and v) to be used in learning is selected. At step ST23 then, it is judged whether or not the learning on all the picture quality patterns is finished. If learning on all of them is not finished, the procedure goes to step ST24.

At step ST24, already known HD pixel data sets are input in units of a frame or field. At step ST25 then, it is judged whether or not the processing on all the HD pixel data sets is finished. If it is finished, then the procedure returns to step ST22 wherein the next picture quality pattern is selected and then the above-mentioned processing is repeated. If it is not finished yet, the procedure goes to step ST26.

At step ST26, SD pixel data sets are produced from the HD pixel data sets input at step ST24 on the basis of the picture quality pattern selected at ST22. At step ST27, pixel data sets of class taps and prediction taps are obtained in correspondence with each HD pixel data set input at the step ST24 on the basis of the SD pixel data sets produced at step ST26. At step ST28 then, it is judged whether or not the learning processing on all the regions of the produced SD pixel data sets is finished. If it is finished, then the procedure returns to step ST24 wherein the above-mentioned processing is repeated after the next HD pixel data sets are input, while it is not finished yet, then the procedure goes to step ST29.

At step ST29, a class code CL is produced from the SD pixel data sets of the class taps obtained at step ST27. At step ST30 then, a normal equation (see the Equation (13)) is produced. Then, the procedure returns to step ST27.

Also, if it decides at step ST23 that the learning on all the picture quality patterns is finished, the procedure goes to step ST31. At step ST31, the normal equation is solved according to the sweeping method etc. to calculate the coefficient seed data sets for each class and, at step ST32, the coefficient seed data sets are stored in a memory and then, at step ST33, the processing ends.

Thus, the processing is performed along the flowchart shown in FIG. 29 so that the coefficient seed data sets for each class can be obtained using the same method as that by the coefficient seed data production device 150 shown in FIG. 18.

Also, the processing by the coefficient seed data production device 150' of FIG. 21 can also be carried out software-wise by a processing apparatus, not shown.

Figure 30:
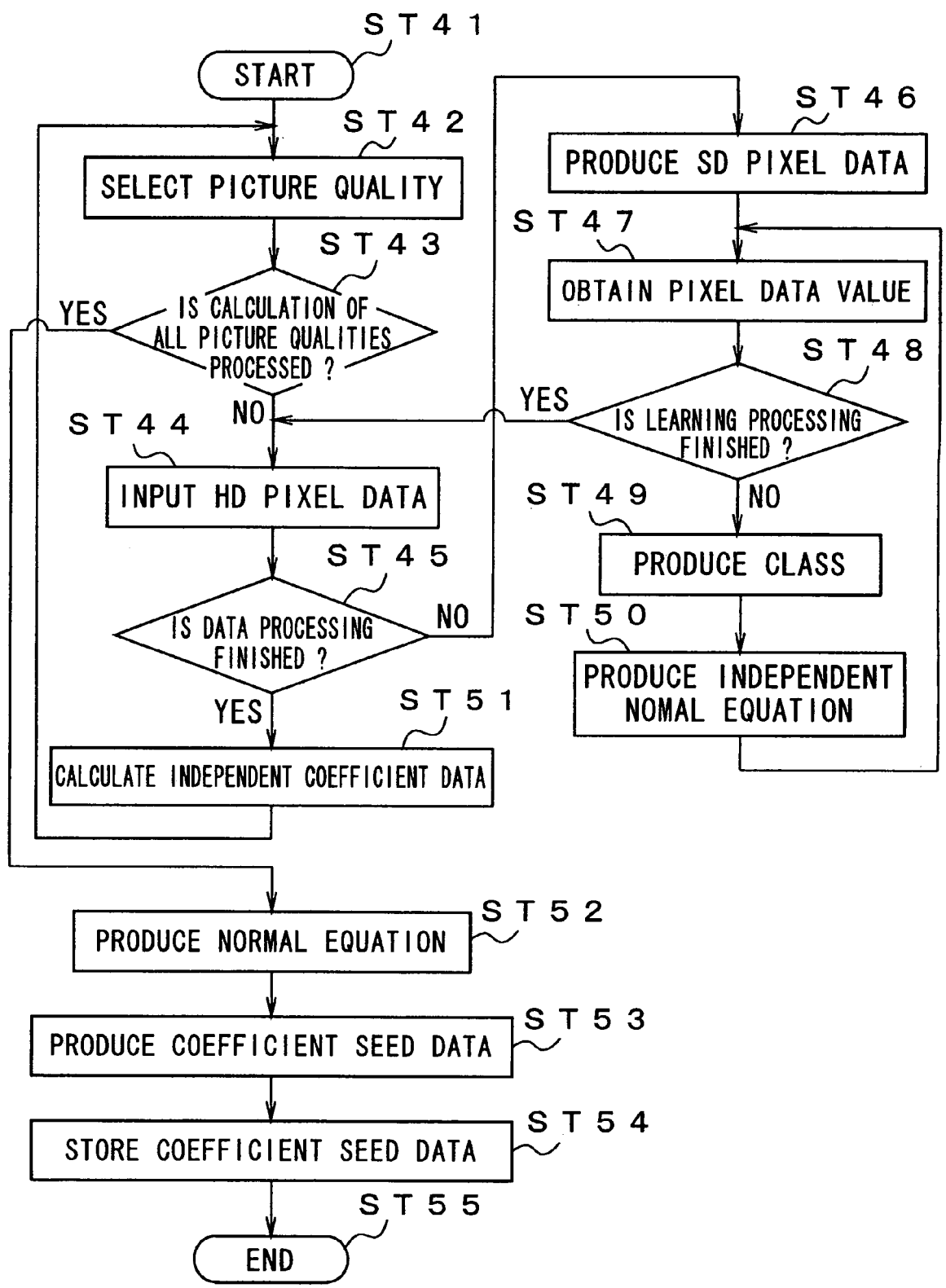
FIG. 30 is a flowchart showing the coefficient seed data production processing (part 2)

The following will describe a processing procedure for producing coefficient seed data sets with reference to a flowchart of FIG. 30.

First, the procedure starts at step ST41 and, at step ST42, a picture quality pattern (which is identified by, for example, the parameters h and v) to be used in learning is selected. At step ST43 then, it is judged whether the processing for calculating all the picture quality patterns is finished. If it is not finished, the procedure goes to step ST44.

At step ST44, already known HD pixel data sets are input in units of a frame or field. At step ST45 then, it is judged whether the processing on all the HD pixel data sets is finished. If it is not finished, the procedure goes to step ST46 wherein the SD pixel data sets are produced from the HD pixel data sets input at step ST44 on the basis of the picture quality pattern selected at step ST42.

At step ST47, pixel data sets of the class taps and the prediction taps corresponding to each HD pixel data set input at step ST44 are obtained from the SD pixel data sets produced at step ST46. At step ST48 then, it is judged whether the learning processing on all the regions of the produced SD pixel data sets is finished. If it is finished, the procedure returns to step ST44 wherein the above-mentioned processing is repeated after the next HD pixel data sets are input, while it is not finished yet, the procedure goes to step ST49.

At step ST49, a class code CL is produced from the SD pixel data sets of the class tap obtained at step ST47. At step ST50 then, a normal equation (see the Equation (21)) for obtaining coefficient data sets is produced. Then, the procedure returns to step ST47.

Also, if it decides at step ST45 that the processing on all the pixel data sets is finished, then the procedure goes to step ST51 wherein the normal equation produced at step ST50 is solved using the sweeping method etc. in order to calculate the coefficient data sets for each class. Then, the procedure returns to step ST42 wherein the next picture quality pattern is selected, and then the above described processing is repeated to obtain the coefficient data sets for each class that correspond to this next picture quality pattern.

Also, if it decides at step ST43 that the coefficient data sets for all the picture quality patterns are calculated, the procedure goes to step ST52. At step ST52, a normal equation (see the Equation (26)) for obtaining the coefficient seed data sets is produced from the coefficient data sets on all the picture quality patterns.

Then, at step ST53, the normal equation produced at step ST52 is solved using the sweeping method etc., to calculate the coefficient seed data sets for each class and, at step ST54, the coefficient seed data sets are stored in the memory and then, at step ST55, the processing ends.

Thus, the processing is performed along the flowchart shown in FIG. 30, so that the coefficient seed data sets for each class can be obtained using the same method as that by the coefficient seed data production device 150' shown in FIG. 21.

Figure 31:
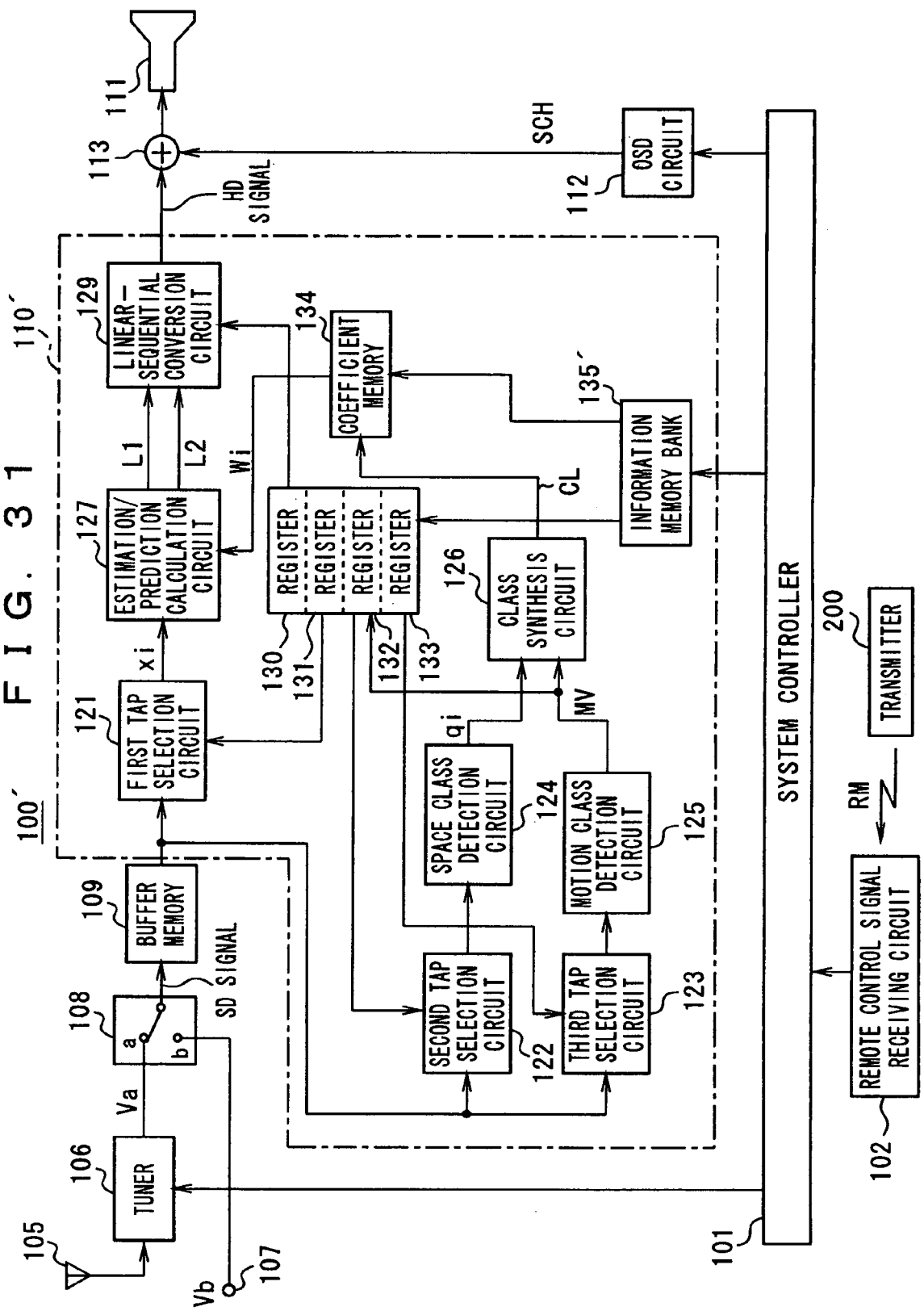
FIG. 31 is a block diagram showing a configuration of the TV receiver according to another embodiment of the invention.

The following will describe another embodiment of the invention. FIG. 31 shows a configuration of a TV receiver 100' according to another embodiment. This TV receiver 100' receives a 525i signal as an SD signal from a broadcast signal to then convert this 525i signal into a 525p or 1050i signal as an HD signal, thus displaying an image based on this 525p or 1050i signal. In FIGS. 31 and 1, the corresponding components are indicated by the same reference symbols.

The TV receiver 100' is the same as the TV receiver 100 shown in FIG. 1 except that the image signal processing section 110 is replaced by an image signal processing section 110'. The TV receiver 100' performs almost the same operation as the TV receiver 100 does.

The detailed image signal processing section 110' will be described as follows. In this image signal processing section 110', the components corresponding to the ones of the image signal processing section 110 shown in FIG. 1 are indicated by the same reference symbols and their detailed explanation is omitted.

The image signal processing section 110' includes an information memory bank 135'. The information memory bank 135' accumulates therein beforehand operation specification information to be stored in the register 130 and tap position information to be stored in the registers 131-133 like the information memory bank 135 in the image signal processing section 110 shown in FIG. 1. Further, this information memory bank 135' accumulates therein beforehand coefficient data sets for each combination of the class and the values of the parameters, h and v, wherein the coefficient data sets correspond to the first conversion method (525p) and the second conversion method (1050i), respectively. A method for producing this coefficient data set will be described later.

The following will describe the operations of the image signal processing section 110'.

Based on the SD signal (525i signal) stored in the buffer memory 109, the second tap selection circuit 122 selectively extracts data sets (SD pixel data sets) of a space class tap. In this case, the second tap selection circuit 122 selects a tap based on tap position information, which is supplied from the register 132, corresponding to a user-selected conversion method and a motion class detected by the motion class detection circuit 125.

Data sets (SD pixel data sets) of the space class tap extracted selectively by the second tap selection circuit 122 are supplied to the space class detection circuit 124. This space class detection circuit 124, in turn, performs ADRC processing on each of the SD pixel data sets given as the data sets of the space class tap to obtain the re-quantization codes qi as class information of the space class (class grouping mainly for indicating of a waveform in the space) (see the Equation (1)).

Also, based on the SD signal (525i signal) stored in the buffer memory 109, the third tap selection circuit 123 selectively extracts data sets (SD pixel data sets) of a motion class tap. In this case, the third tap selection circuit 123 selects a tap based on tap position information, which is supplied from the register 133, corresponding to a user-selected conversion method.

The data sets (SD pixel data sets) of the motion class tap extracted selectively by the third tap selection circuit 123 are supplied to the motion class detection circuit 125. This motion class detection circuit 125, in turn, obtains class information MV of a motion class (class grouping mainly for indicating a degree of motion) from each of the SD pixel data sets given as data sets of the motion class tap.

This motion information MV and the above-mentioned re-quantization codes qi are supplied to the class synthesis circuit 126. This class synthesis circuit 126 in turn obtains a class code CL that indicates a class including pixel data set (pixel data set of an objective position) of the HD signal (525p or 1050i signal) to be produced based on this motion information MV and the re-quantization codes qi (see the Equation (3)). This class code CL is then supplied as read-out address information to the coefficient memory 134.

During each vertical blanking period, for example, for each class, the coefficient memory 134 receives the coefficient data sets, which are loaded from information memory bank 135', corresponding to the values of the parameters, h and v adjusted by the user and the conversion method. When the class code CL is supplied as read-out address information as described above, the coefficient data sets Wi corresponding to the class code CL are read out of this coefficient memory 134 and the coefficient data sets Wi are supplied to the estimation/prediction calculation circuit 127.

If the information memory bank 135' stores no coefficient data sets corresponding to the values of the adjusted parameters, h and v, the coefficient data sets corresponding to values that precede and follow these values of the adjusted parameters h and v may be read out of the information memory bank 135' and then used in interpolation processing, thus obtaining the coefficient data sets corresponding to the values of the adjusted parameters h and v.

Also, based on the SD signal (525i signal) stored in the buffer memory 109, the first tap selection circuit 121 selectively extracts the data sets (SD pixel data sets) of a prediction tap. In this case, the first tap selection circuit 121 selects a tap based on tap position information, which is supplied from the register 131, corresponding to a user-selected conversion method. The data sets (SD pixel data sets) xi of the prediction tap extracted selectively by this first tap selection circuit 121 are supplied to the estimation/prediction calculation circuit 127.

The estimation/prediction calculation circuit 127 calculates the pixel data sets of the HD signal to be produced, that is, each of the pixel data sets (HD pixel data sets) y of the objective position based on the data sets (SD pixel data sets) xi of the prediction tap and the coefficient data sets Wi read out of the coefficient memory 134 (see the Equation (4)). In this case, the data sets of four pixels constituting the HD signal are produced simultaneously.

Thus, if the first conversion method for transmitting the 525p signal is selected, line data sets L1 at the same position as that of line of the 525i signal and line data sets L2 at the intermediate position between the upper and lower lines of the 525i signal are produced in the odd-number (o) and even-number (e) fields (see FIG. 4). On the other hand, if the second conversion method for transmitting the 1050i signal is selected, line data sets L1 and L1' near the line of the 525i signal and line data sets L2 and L2' remote from the line of the 525i signal are produced in the odd-number (o) and even-number (e) fields (see FIG. 5).

Thus, the line data sets L1 and L2 (L1' and L2') produced by the estimation/prediction calculation circuit 127 are supplied to the linear-sequential conversion circuit 129. This linear-sequential conversion circuit 129 in turn performs the linear-sequence on these line data sets L1 and L2 (L1' and L2') to produce HD signal. In this case, the linear-sequential conversion circuit 129 operates according to operation instruction information, which is supplied from the register 130, corresponding to a conversion method selected by the user. Therefore, if the user selects the first conversion method (525p), the linear-sequential conversion circuit 129 transmits the 525p signal. On the other hand, if the user selects the second conversion method (1050i), the linear-sequential conversion circuit 129 transmits the 1050i signal.

Thus, in the image signal processing section 110', coefficient data sets Wi (i=1 to n) to be used in an estimation equation, wherein each coefficient data sets Wi corresponds to the values of the adjusted parameters, h and v, can be used to calculate the HD pixel data sets y. Therefore the user can adjust the values of the parameters, h and v to arbitrarily adjust the picture quality of an image given by the HD signal on the horizontal resolution and vertical resolution axes.

As described above, accumulated in the information memory bank 135' beforehand are such coefficient data sets, which correspond to the first and second conversion methods, respectively, for each combination of the class and the values of the parameters, h and v. The coefficient data sets are produced by learning beforehand.

The above has described another example of producing the coefficient seed data sets, wherein SD signal is first obtained by changing the values of the parameters, h and v step-wise, coefficient data sets for each class are produced by learning for each SD signal, and using the coefficient data sets for each class every SD signal, the coefficient seed data sets are obtained for each class. Such coefficient data sets, which are stored in the information memory bank 135' beforehand, for each combination of the class and the values of the parameters, h and v can be produced by the same method as the one carried out in a former part of this method for producing the coefficient seed data sets.

Figure 32:
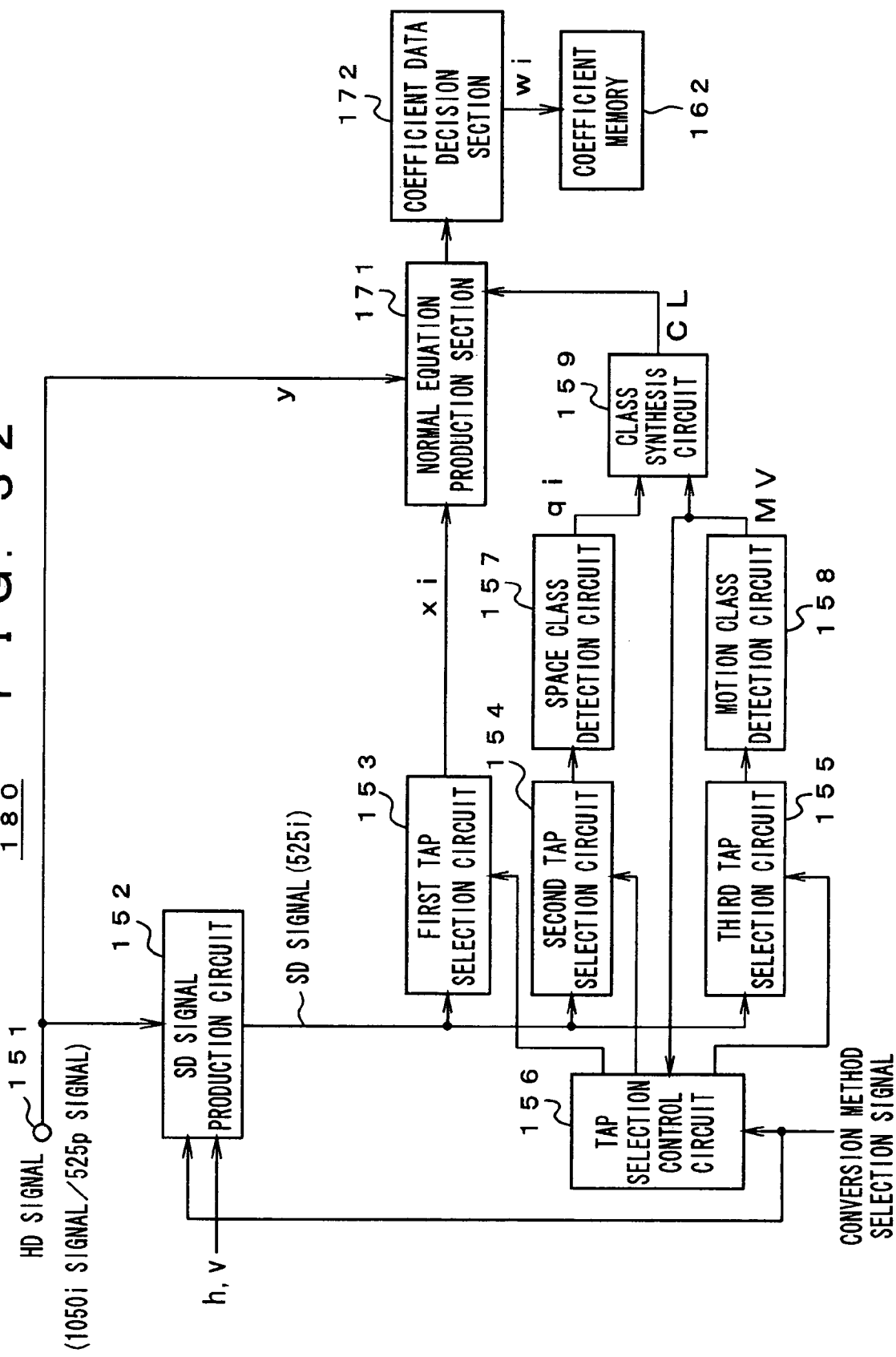
FIG. 32 is a block diagram showing a configuration example of the coefficient seed data production device.

FIG. 32 shows a coefficient data production device 180. In this coefficient data production device 180, the components corresponding to the coefficient seed data production device 150' shown in FIG. 21 are indicated by the same reference symbols and their detailed description is omitted.

This coefficient data production device 180 has a coefficient memory 162. This coefficient memory 162 stores therein the coefficient data sets Wi for each class corresponding to each SD signal decided by the coefficient data decision section 172. The other components of this coefficient data production device 180 have almost the same configuration as those of the coefficient seed data production device 150' shown in FIG. 21.

The following will describe the operations of the coefficient data production device 180. At the input terminal 151 an HD signal (525p or 1050i signal) is supplied as a teacher signal. The HD signal is then subjected to the thinning-out processing horizontally and vertically at the SD signal production circuit 152, thus producing SD signal (525i signal) as an input signal.

In this case, if the first conversion method (for obtaining the 525p signal from the 525i signal by the image signal processing section 110' shown in FIG. 31) is selected, the SD signal production circuit 152 performs thinning-out processing on the 525p signal to produce the SD signal. On the other hand, if the second conversion method (for obtaining the 1050i signal from the 525i signal by the image signal processing section 110' shown in FIG. 31) is selected, the SD signal production circuit 152 performs thinning-out processing on the 1050i signal to produce the SD signal. In this case, the parameters, h and v are also supplied as a control signal to the SD signal production circuit 152, which in turn sequentially produces a plurality of SD signals with step-by-step changing horizontal and vertical bands.

Based on the SD signal (525i signal), the second tap selection circuit 154 selectively extracts the data sets (SD pixel data sets) of the space class tap located on a periphery of an objective position in the HD signal (525p or 1050i signal). This second tap selection circuit 154 selects a tap based on tap position information, which is supplied from the tap selection control circuit 156, corresponding to the selected conversion method and the motion class detected by the motion class detection circuit 158.

The data sets (SD pixel data sets) of the space class tap selectively extracted by this second tap selection circuit 154 are supplied to the space class detection circuit 157. This space class detection circuit 157 performs ADRC processing on each of the SD pixel data sets given as the data sets of the space class tap to obtain the re-quantization codes qi used as class information of a space class (class grouping mainly for indicating a waveform in a space) (see the Equation (1)).

Also, based on the SD signal produced by the SD signal production circuit 152, the third tap selection circuit 155 selectively extracts the data sets (SD pixel data sets) of the motion class tap located on a periphery of the objective position in the HD signal. In this case, the third tap selection circuit 155 selects a tap based on tap position information, which is supplied from the tap selection control circuit 156, corresponding to the selected conversion method.

The data sets (SD pixel data sets) of the motion class tap selectively extracted by this third tap selection circuit 155 are supplied to the motion class detection circuit 158. This motion class detection circuit 158 obtains class information MV of a motion class (class grouping for mainly indicating a degree of motion) based on each of the SD pixel data sets given as data sets of a motion class tap.

This motion information MV and the above-mentioned re-quantization codes qi are supplied to the class synthesis circuit 159. This class synthesis circuit 159 in turn obtains a class code CL that indicates a class including pixel data set of the objective position in the HD signal (525p or 1050i signal), based on this motion information MV and the re-quantization codes qi (see the Equation (3)).

Also, based on the SD signal produced by the SD signal production circuit 152, the first tap selection circuit 153 selectively extracts the data sets (SD pixel data sets) of a prediction tap located on a periphery of the objective position in the HD signal. In this case, the first tap selection circuit 153 selects a tap based on tap position information, which is supplied from the tap selection control circuit 156, corresponding to the selected conversion method.

Then, the normal equation production section 171 produces the normal equation (see the Equation (21)) for obtaining the coefficient data sets Wi (i=1 to n) for each class corresponding to each SD signal produced by the SD signal production circuit 152 on the basis of each of the HD pixel data sets y given as pixel data set of the objective position obtained from the HD signal received at the input terminal 151, the data sets (SD pixel data sets) xi of the prediction tap selectively extracted by the first tap selection circuit 153 in respective correspondence to each of the HD pixel data sets y thus given, and the class code CL received from the class synthesis circuit 159 in respective correspondence to each of the HD pixel data sets y thus given.

Then, the coefficient data decision section 172 solves this normal equation to thereby obtain the coefficient data sets Wi for each class corresponding to each SD signal. That is, at the coefficient data decision section 172 can be obtained the coefficient data sets Wi for each combination of the class and the values of the parameters, h and v. These coefficient data sets Wi are stored in the coefficient memory 162 in which the addresses are sub-divided for each combination of the class and the values of the parameters, h and v.

Thus, the coefficient data production device 180 shown in FIG. 32 can produce such coefficient data sets Wi for each combination of the class and the values of the parameters, h and v so that coefficient data sets Wi are stored in the information memory bank 135' of the image signal processing section 110' as shown in FIG. 31. In this case, the SD signal production circuit 152 may use the 525p or 1050i signal corresponding to a selected conversion method to produce the SD signal (525i signal), thereby producing the coefficient data sets corresponding to any one of the first and second conversion methods.

Although the image signal processing section 110' of FIG. 31 has been described as something that can set the parameters, h and v which specify horizontal and vertical resolutions, respectively, to then adjust the values of these parameters for adjustment of the horizontal and vertical resolutions of an image, the invention is not limited thereto; for example, a parameter r to specify a horizontal/vertical resolution and a parameter z to specify a degree of noise cancellation (degree of noise reduction) may be provided in the same configuration as that described in the TV receiver 100 as shown in FIG. 1 so that the values of these parameters r and z can be adjusted to adjust the horizontal/vertical resolution and the noise cancellation degree of an image. In this case, the information memory bank 135' of the image signal processing section 110' accumulates therein beforehand the coefficient data sets for each combination of the class and the values of the parameters, r and z in respective correspondence to each of the conversion methods.

The coefficient data production circuit 180 shown in FIG. 32 can produce this coefficient data like it produces the coefficient data sets corresponding to the values of the above parameters, h and v, as described above. In this case, the SD signal production circuit 152 is supplied with the parameters, r and z as control signal, so that the horizontal and vertical bands of the SD signal and a state of adding noise to the SD signal are changed step-by-step corresponding to values of these parameters, r and z, when the SD signal is produced from the HD signal.

Also, although the image signal processing section 110' of FIG. 31 sets the parameters h and v which specify the horizontal and vertical resolutions, respectively, and adjusts their values to thereby adjust the horizontal and vertical resolutions of an image, the invention is not limited thereto; for example, the parameters, h and v to specify the horizontal and vertical resolutions, respectively, and the parameter z to specify the noise cancellation degree (noise reduction degree) may be set to adjust the values of these parameters, h, v, and z, thus adjusting the horizontal and vertical resolutions and the noise cancellation degree of an image in the same configuration as that described in the TV receiver 100 shown in FIG. 1, as described above. In this case, the information memory bank 135' of the image signal processing section 110' accumulates therein beforehand the coefficient data sets corresponding to each of the conversion methods for each combination of the class and the values of the parameters, h, v, and z.

The coefficient data production device 180 shown in FIG. 32 can also produce the coefficient data sets like it produces the coefficient data sets corresponding to the values of the parameters, h and v, as described above. In this case, the SD signal production circuit 152 is supplied with the parameters, h, v, and z as control signal, so that when the SD signal is produced from the HD signal, the horizontal and vertical bands of the SD signal and the state of adding noise to the SD signal are changed step-by-step corresponding to the values of these parameters h, v, and z.

Note here that, similar to the processing in the image signal processing section 110 shown in FIG. 1, the processing performed at the image signal processing section 110' shown in FIG. 31 may be carried out by a software using, for example, an image signal processor 300 shown in FIG. 27. In this case, the coefficient data sets are stored beforehand in the ROM 302 etc. before being used.

Figure 33:
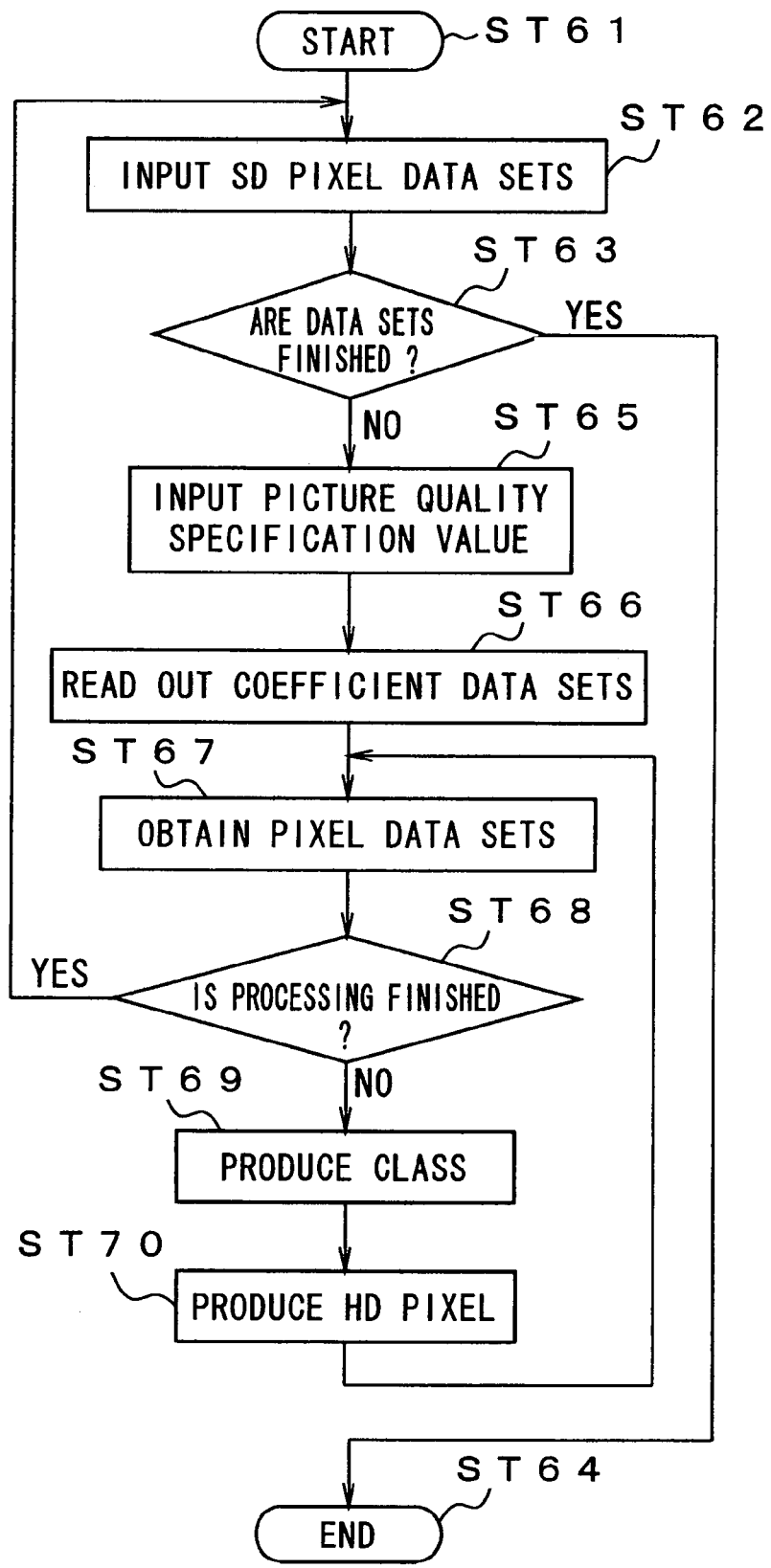
FIG. 33 is a flowchart showing a procedure for processing an image signal.

The following will describe a processing procedure for obtaining an HD signal from an SD signal performed at the image signal processor shown in FIG. 27 with reference to the flowchart of FIG. 33.

First, the process starts the processing at step ST61 and, at step ST62, SD pixel data sets are input in units of a frame or field. When the SD pixel data sets are input through the input terminal 314, the SD pixel data sets are stored in the RAM 303 temporarily. Also, when the SD pixel data sets are recorded on a hard disk beforehand, the SD pixel data sets are read out of the hard disk drive 307 and stored in the RAM 303 temporarily. At step ST63 then, it is decided whether or not the processing of all the frames or fields of thus input pixel data sets is finished. If it is finished, then the process for processing ends at step ST64. Otherwise, the process goes on to step ST65.

At this step ST65, picture quality specification value (for example, a value of the parameter h or v) input by the user under the control of the remote control transmitter 200 is read out of the RAM 303, for example. At step ST66 then, based on picture quality specification value thus read, the coefficient data sets Wi corresponding to that picture quality specification value for each class are read out of the ROM 302 etc. and they are stored in the RAM 303 temporarily.

Next, at step ST67, based on the SD pixel data sets input at step ST62, pixel data sets of a class tap and a prediction tap are obtained in respective correspondence with each of the HD pixel data sets to be produced. At step ST68 then, it is decided whether or not the processing for obtaining the HD pixel data sets is finished in all the regions of the input SD pixel data sets. If it is finished, then the process returns to step ST62 wherein the process shifts to the processing of inputting SD pixel data sets of the next frame or field. On the other hand, if it is not finished, then the process goes on to step ST69.

At this step ST69, a class code CL is produced from the SD pixel data sets of the class tap obtained at step ST67. At step ST70 then, the HD pixel data sets are produced according to the estimation equation using coefficient data sets that correspond to that class code CL and the SD pixel data sets of the prediction tap. Thereafter, the process goes back to step ST67 wherein the above-mentioned processing is repeated.

Thus, the process can perform the processing along the flowchart shown in FIG. 33 to thereby process the SD pixel data sets constituting the input SD signal, thus obtaining HD pixel data sets constituting the HD signal. As mentioned above, the HD signal thus processed and obtained is transmitted trough the output terminal 315 or supplied to the display 311 to be displayed there or even supplied to the hard disk drive 305 to be recorded on a hard disk.

Also, although the processing apparatus is not shown, the processing at the coefficient data production device 180 of FIG. 32 can be also carried out by software.

Figure 34:
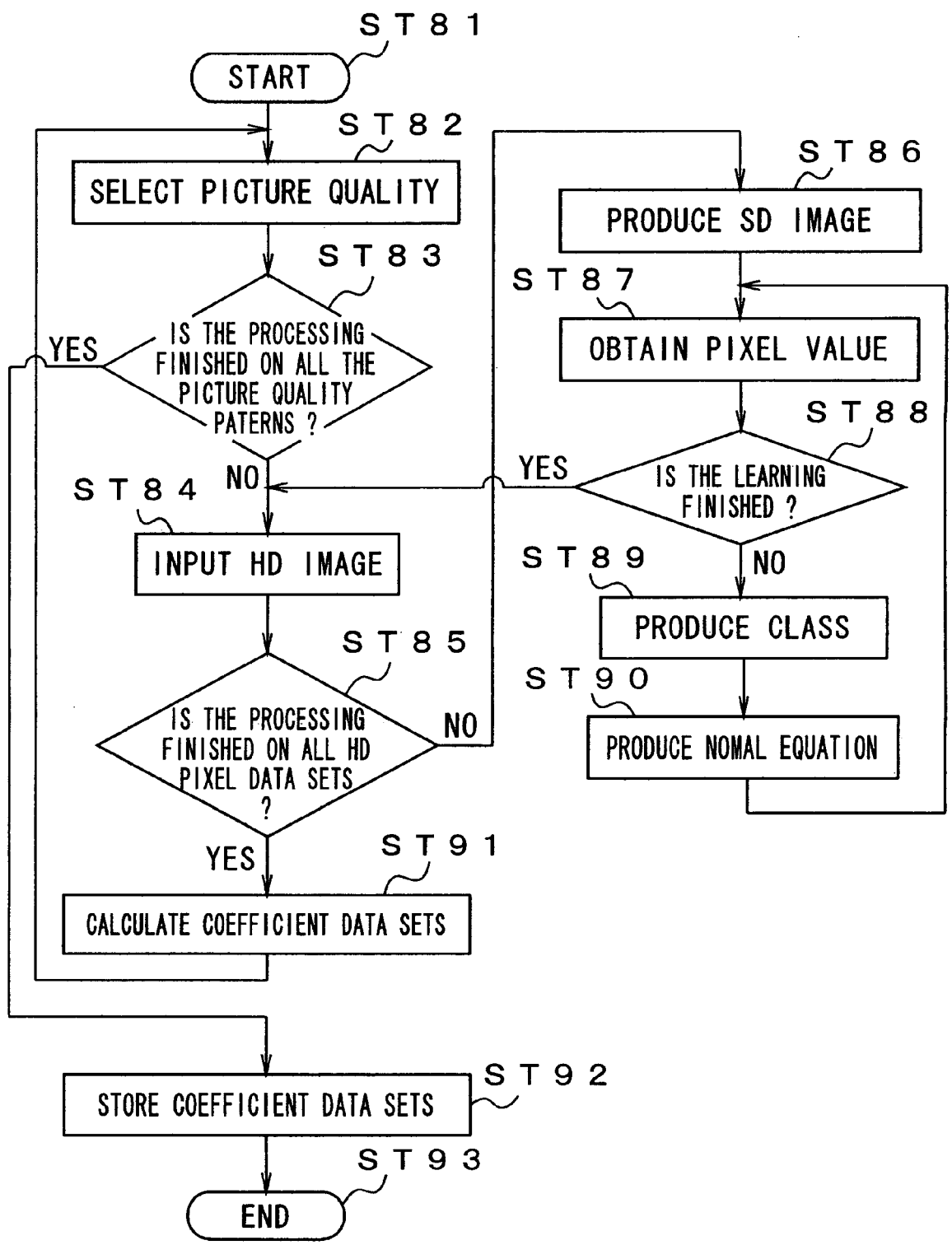
FIG. 34 is a flowchart showing a processing for producing the coefficient data sets.

The following will describe a processing procedure for producing the coefficient data sets with reference to a flowchart of FIG. 34.

First, the process starts at step ST81 and, at step ST82, picture quality patterns (which are identified by, for example, the parameters h and v) to be used in learning are selected. At step ST83 then, it is decided whether or not the coefficient data sets are calculated on all the picture quality patterns. If it is not yet calculated, then the process goes on to step ST84.

At this step ST84, already known HD pixel data sets are input in a frame or field unit. At step ST85 then, it is decided whether or not the processing is finished on all the HD pixel data sets. If it is not finished, then the process goes to step ST86 wherein SD pixel data sets are produced from the HD pixel data sets input at step ST84 based on the picture quality pattern selected at ST82.

Then, at step ST87, pixel data sets of a class tap and a prediction tap are obtained in correspondence with each of the HD pixel data sets input at the step ST84, based on the SD pixel data sets produced at step ST86. At step ST88 then, it is decided whether or not the learning processing is finished on all the regions of the produced SD pixel data sets. If it is finished, then the process returns to step ST84 wherein the next HD pixel data sets are input and then the above-mentioned processing is repeated. If not, on the other hand, then the process goes on to step T89.

At this step ST89, a class code CL is produced from the SD pixel data sets of the class tap obtained at step ST87. At step ST90 then, a normal equation (see Equation (21)) for obtaining the coefficient data sets is produced. Then, the process returns to step ST87.

If it decides at step ST85 that the processing is finished on all the HD pixel data sets, then the process goes to step ST91 wherein the normal equation produced at step ST90 is solved using the sweeping-out method etc., thus calculating the coefficient data sets for each class. Then, the process returns to step ST82 wherein the next picture quality pattern is selected and the above-mentioned processing is repeated, thereby obtaining the coefficient data sets corresponding to this next picture quality pattern for each class.

Also, if it decides at the above-mentioned step ST83 that the coefficient data sets are calculated for all the picture quality patterns, then the memory stores the coefficient data sets for all the picture quality patterns for each class at step ST92 and then, at step ST93, the processing ends.

Thus, it is possible to obtain the coefficient data sets for all the picture quality patterns for each class according to the processing along the flowchart shown in FIG. 34 using the same method as that used in the coefficient data production device 180 shown in FIG. 32.

Although the above-mentioned embodiments have employed a first-degree linear equation as an estimation equation used to produce the HD signal, the invention is not limited thereto; it may be one of a higher degree, for example, as the estimation equation.

Also, although the above-mentioned embodiments have exemplified conversion of the SD signal (525i signal) into the HD signal (525p or 1050i signal), the invention is not limited thereto; for example, the invention is, of course, applicable likewise also to a case where the first image signal may be converted into the second image signal using an estimation equation.

Also, although the above-mentioned embodiments have exemplified a system of changing the input values of the parameters to thereby consecutively switch the functions such as resolution improvement or noise suppression (noise cancellation), the invention is not limited thereto; for example, besides these functions of resolution improvement and noise suppression, such functions as decoding and signal format conversion may be selected by switching in the same configuration.

Figures 35, 36:
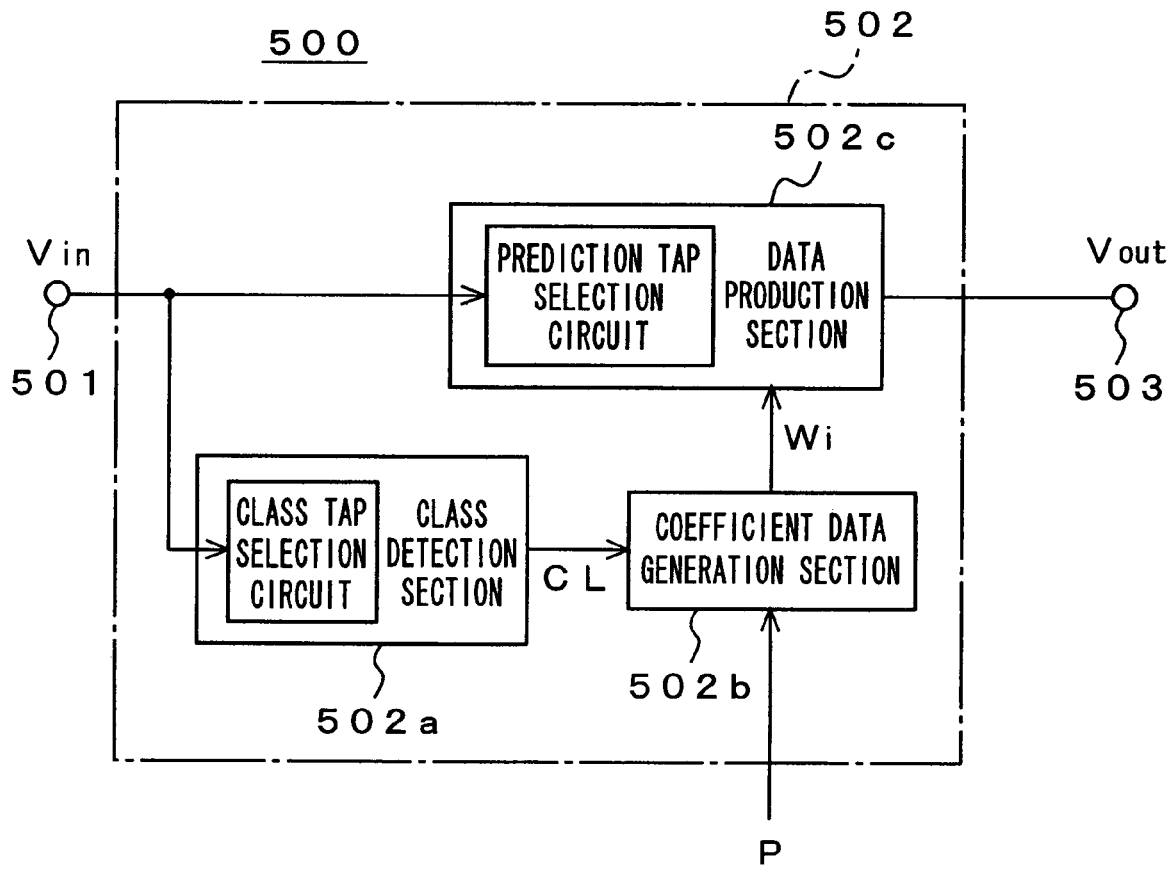
FIG. 35 is a block diagram showing a configuration example of an image signal processor according to another embodiment of the invention.
FIG. 36 is an illustration showing a correspondence relationship between each of the values of the parameter P and each of the functions.

FIG. 35 shows an image signal processor 500 that can switch the functions such as resolution improvement, noise suppression, MPEG signal decoding, JPEG (Joint Photographic Experts Group) signal decoding, and conversion of a composite signal into a component signal.

This image signal processor 500 comprises an input terminal 501 for receiving an input video signal Vin, an image signal processing section 502 for processing the input video signal Vin received at the input terminal 501 to thereby obtain an output video signal Vout, and an output terminal 503 for transmitting the output video signal Vout obtained by the image signal processing section 502.

The image signal processing section 502 also receives an incoming parameter P. The parameter P is used to select the functions of the image signal processing section 502. For example, as shown in FIG. 36, if P=P1, a resolution improvement function is selected; if P=P2, a noise suppression function is selected; if P=P3, an MPEG signal (rate a) decoding function is selected; if P=P4, an MPEG signal (rate b) decoding function is selected; if P=P5, a function for converting a composite signal into a component signal is selected; and if P=P6, a JPEG signal decoding function is selected. In the image signal processing section 502, thus selected functions are processed.

Also, just like the image signal processing section 110 of FIG. 1, the image signal processing section 502 includes a class detection section 502a for detecting a class CL from the data sets of a class tap extracted from the input image signal Vin, coefficient data generation section 502b for generating such coefficient data sets Wi to be used in an estimation equation based on the class CL detected by the class detection section 502a and the parameter P, the coefficient data sets Wi corresponding to the class CL and the parameter P, and a data production section 502c for producing data sets that constitutes the output image signal Vout based on the data sets generated by the coefficient data generation section 502b and the data sets of the prediction tap extracted from the input video signal Vin. The coefficient data generation section 502b has a memory in which are stored the coefficient data sets Wi, for each class, that correspond to, for example, respective values of the parameters P, that is P1 through P6. The coefficient data generation section 502b transmits the coefficient data sets Wi read out of the memory, the coefficient data sets Wi corresponding to the class CL detected by the class detection section 502a and a value of the input parameter P.

In this case, the coefficient data sets Wi, for each class, corresponding respectively to the values of the parameters P, that is P1 through P6, can be produced using the coefficient data production device similar to the above-mentioned coefficient data production device 180 shown in FIG. 32. Here, a part of the SD signal production circuit 152 in the coefficient data production device 180 shown in FIG. 32 is supposed to be a student signal production circuit.

For example, to produce coefficient data set corresponding to the parameter P1, a high-resolution video signal is input as the teacher signal at the input terminal 151 and also the parameter P1 is input at the student signal production circuit in which a low-resolution video signal is produced as the student signal from the teacher signal using a band limiting filter. With this, based on the above-mentioned teacher signal and student signal, the normal equation production section 171 produces a normal equation (see Equation (21)) for obtaining the coefficient data sets for each class in correspondence with the parameter P1. The normal equation is then solved to thereby obtain the coefficient data sets Wi for each class in correspondence with the parameter P1 for selecting the resolution improvement function.

Also, for example, to produce coefficient data set corresponding to the parameter P2, a video signal is input as the teacher signal at the input terminal 151 and also the parameter P2 is input at the student signal production circuit in which a noise is added to the video signal given as the teacher signal to produce the video signal as the student signal. With this, based on the above-mentioned teacher signal and student signal, the normal equation production section 171 produces a normal equation (see Equation (21)) for obtaining coefficient data sets for each class in correspondence with the parameter P2. The normal equation is then solved to thereby obtain the coefficient data sets Wi for each class in correspondence with the parameter P2 for selecting the noise suppression function.

Also, for example, to produce coefficient data set corresponding to the parameter P3, a decoded MPEG signal (rate a) is input as the teacher signal through the input terminal 151 and also the parameter P3 is input to the student signal production circuit in which an non-decoded MPEG signal (rate a) is produced from the teacher signal. With this, based on the above-mentioned teacher signal and student signal, the normal equation production section 171 produces a normal equation (see Equation (21)) for obtaining coefficient data set for each class in correspondence with the parameter P3. The normal equation is then solved to thereby obtain the coefficient data sets Wi for each class in correspondence with the parameter P3 for selecting the MPEG signal (rate a) decoding function.

Also, for example, to produce coefficient data set corresponding to the parameter P4, a decoded MPEG signal (rate b) is input as the teacher signal through the input terminal 151 and also the parameter P4 is input to the student signal production circuit in which a non-decoded MPEG signal (rate b) is produced from the teacher signal. With this, based on the above-mentioned teacher signal and student signal, the normal equation production section 171 produces a normal equation (see Equation (21)) for obtaining coefficient data set for each class in correspondence with the parameter P4. The normal equation is then solved to thereby obtain the coefficient data sets Wi for each class in correspondence with the parameter P4 for selecting the MPEG signal (rate a) decoding function.

Also, for example, to produce coefficient data set corresponding to the parameter P5, a component signal is input as the teacher signal through the input terminal 151 and also the parameter P5 is input to the student signal production circuit in which a composite signal as the student signal is produced from the teacher signal. With this, based on the above-mentioned teacher signal and student signal, the normal equation production section 171 produces a normal equation (see Equation (21)) for obtaining coefficient data set for each class in correspondence with the parameter P5. The normal equation is then solved to thereby obtain the coefficient data sets Wi for each class in correspondence with the parameter P5 for selecting the function of converting the composite signal into the component signal.

Also, for example, to produce coefficient data set corresponding to the parameter P6, a decoded JPEG signal is input as the teacher signal through the input terminal 151 and also the parameter P6 is input to the student signal production circuit in which a non-decoded JPEG signal as the student signal is produced from the teacher signal. With this, based on the above-mentioned teacher signal and student signal, the normal equation production section 171 produces a normal equation (see Equation (21)) for obtaining coefficient data sets for each class in correspondence with the parameter P6. The normal equation is then solved to thereby obtain the coefficient data sets Wi for each class in correspondence with the parameter P6 for selecting the function of decoding the JPEG signal.

Incidentally, such configuration may be employed that a following production equation (43) is set for producing coefficient data sets Wi to be used in an estimation equation; for each class, a memory beforehand stores coefficient seed data sets w0 through wn, which are the coefficient data sets in this production equation; and according to the production equation, the coefficient data sets Wi corresponding to a class CL detected by the class detection section 502a and a value of the input parameter P are then calculated and obtained.

$$W_i = W_0 + W_1 P + W_2 P^2 + \ldots + W_n P^n \qquad (43)$$

In this case, the coefficient seed data sets $w_0$ through $w_n$ for each class can be produced using a coefficient seed data production device similar-to the above-mentioned coefficient seed data production device 150 shown in FIG. 18 or the above-mentioned coefficient seed data production device 150' shown in FIG. 21. Here, a part of the SD signal production circuit 152 in each of the coefficient seed data production devices 150 and 150' is supposed to be the student signal production circuit.

In this case, the parameters P1, P2, P3, P4, P5, and P6 are sequentially input to the student signal production circuit.

Specifically, when inputting the parameter P1, a high-resolution video signal is input as the teacher signal through the input terminal 151 to produce a low-resolution video signal as the student signal from the teacher signal using a band limiting filter in the student signal production circuit. Also, when inputting the parameter P2, a video signal is input as the teacher signal through the input terminal 151 to produce a video signal as the student signal in the student signal production circuit with adding noise to the video signal given as the teacher signal. Also, when inputting the parameter P3, a decoded MPEG signal (rate a) is input as the teacher signal through the input terminal 151 to produce a non-decoded MPEG signal (rate a) from the teacher signal in the student signal production circuit.

Also, when inputting the parameter P4, a decoded MPEG signal (rate b) is input as the teacher signal through the input terminal 151 to produce a non-decoded MPEG signal (rate b) as the student signal from the teacher signal in the student signal creation circuit. Also, when inputting the parameter P5, a component signal is input as the teacher signal through the input terminal 151 to produce a composite signal as the student signal from the teacher signal in the student signal production circuit. Further, when inputting the parameter P6, a decoded JPEG signal is input as the teacher signal through the input terminal 151 to produce a non-decoded JPEG signal as the student signal from the teacher signal in the student signal creation circuit.

With this, in a coefficient seed data production device corresponding to the coefficient seed data production device 150 of FIG. 18, the normal equation production section 160 produces, for each class, a normal equation (see Equation (13)) for obtaining coefficient seed data sets $w_0$ through $w_n$, and the normal equation is solved to thereby obtain the coefficient seed data sets $w_0$ through $w_n$ for each class.

On the other hand, in the coefficient seed data production device corresponding to the coefficient seed data production device 150' of FIG. 21, the normal equation production section 171 produces, for each class, a normal equation (see Equation (21)) for obtaining coefficient data sets in correspondence with each of the parameters P1 though P6, and the normal equation is solved to thereby obtain the coefficient data sets Wi for each class in correspondence with each of the parameters P1 through P6. Then, the normal equation production section 173 produces, for each class, a normal equation (see Equation (26)) for obtaining coefficient seed data sets $w_0$ through $w_n$ from the coefficient data sets Wi, for each class, corresponding to each of the parameters P1 through P6, and the normal equation is solved to thereby obtain the coefficient seed data sets $w_0$ through $w_n$ for each class.

The following will describe the operations of the image signal processor 500 shown in FIG. 35.

The input image signal Vin supplied through the input terminal 501 is fed to the image signal processing section 502. The input image signal Vin thus fed to the image signal processing section 502 is then given to the class detection section 502a. The class detection section 502a detects a class CL based on the data sets of a class tap extracted from the input image signal Vin. Thus, the class CL detected by the class detection section 502 is supplied to the coefficient data generation section 502b.

This coefficient data generation section 502 is also supplied with the parameter P input to the image signal processing section 502. Then, the coefficient data generation section 502b generates the coefficient data sets Wi to be used in an estimation equation, wherein the coefficient data sets Wi correspond to both the class CL and a value of the parameter P. The coefficient data sets Wi to be used in this estimation equation are supplied to the data production section 502c.

Also, the input image signal Vin is also supplied to the data production section 502c. This data production section 502c extracts the data sets of a prediction tap from the input image signal Vin and also produces data sets constituting the output image signal Vout according to the estimation equation using the coefficient data sets Wi. Then, the image signal processing section 502 transmits the data sets produced by this data production section 502c as the output image signal Vout through the output terminal 503.

As described above, the coefficient data generation section 502b of the image signal processing section 502 generates coefficient data sets Wi corresponding to-an value of the input parameter P so that the data production section 502c can produce the data sets constituting the output image signal Vout using the coefficient data sets Wi. The image signal processing section 502, therefore, can process a function selected by the parameter P. In other words, by changing the value of the parameter P, the functions of the image signal processor 500 can be switched.

Thus, the image signal processor 500 shown in FIG. 35 can implement each of the functions such as resolution improvement, noise suppression, MPEG signal decoding, JPEG (Joint Picture Experts Group) signal decoding, and conversion of composite signals into component signals as a single apparatus or device.

Also, although the above-mentioned embodiments have exemplified improvements of a space-directional resolution, the time-directional resolution may be improved instead. Also, switching-over of the functions may be made among such functions as one-directional Y/C separation, two-dimensional Y/C separation, three-dimensional Y/C separation, etc.

The image signal processor 500 shown in FIG. 35 may be designed so as to allow the user to input a value of the parameter P or so as to automatically set it according to specification of the input video signal Vin. Also, each tap may be selected in correspondence with a value of the parameter P in the class tap selection circuit of the class detection section 502a or the prediction tap selection circuit of the data production section 502c.

Also, although the image signal processor 500 shown in FIG. 35 has been described as something wherein the parameter P takes on discrete values, it may possibly take on consecutive values. In this case, coefficient data sets Wi corresponding to the parameter P can be obtained by linear interpolation by use of discrete values of the coefficient data sets or, if coefficient seed data sets are used, by substituting a value of the parameter P. Thus, by allowing the parameter P to take on consecutive values, if MPEG signals of the rates a and b are to be decoded as shown in FIG. 36, for example, it is possible to decode such an MPEG signal as having an arbitrary rate between the rates a and b.

Also, although the image signal processor 500 shown in FIG. 35 has employed one example of switching-over the functions, the invention is not limited thereto. Of course, the same configuration can be employed to switch to any other functions.

Also, although the above-mentioned embodiments have been described with reference to a case where the information signal is an image signal, the invention is not limited thereto. For example, even when the information signal is an audio signal, the invention is similarly applicable.

According to the invention, it is possible to implement processing of a plurality of functions by a single device or apparatus by producing informational data sets constituting a second information signal from informational data sets constituting a first information signal in correspondence with a value of a parameter that decides desired one of the plurality of functions.

According to the invention, the second information signal is produced in correspondence with values of parameters of plural kinds when converting a first information signal into the second information signal so that a quality of an output obtained by a second information signal can be arbitrarily adjusted on plural axes.

PROBABILITY OF UTILIZED INDUSTRIALIZATION

As mentioned above, an information signal processor, a method for processing an information signal, an image signal processor and an image display apparatus using the same, a coefficient seed data production device used in the same, a method for producing coefficient seed data set, a coefficient data processor and a method for producing the coefficient data set, and an information-providing medium in accordance with the invention are well suitable for use in conversion of, for example, resolution improvement, noise suppression, decoding, signal format conversion, conversion of, for example, an NTSC-system video signal into a Hi-vision video signal.

The invention claimed is:

1. An information signal processor for converting a first information signal containing plural informational data sets into a second information signal containing plural informational data sets, comprising:

first data selection means for selecting first plural informational data sets located on a periphery of an objective position in said second information signal based on said first information signal;

class detection means for detecting a class including informational data set of the objective position based on said first plural informational data sets selected by said first data selection means;

parameter adjustment means for adjusting values of parameters of plural kinds, each parameter deciding a quality of an output obtained by said second information signal, said parameter adjustment means including: display means for displaying adjustment positions of said parameters of plural kinds; and user operation means for allowing user to adjust the values of said parameters of plural kinds with referencing contents displayed at said display means; and informational data production means for producing informational data set of the objective position in correspondence with the class detected by said class detection means and the values of the parameters of plural kinds adjusted by said parameter adjustment means.

2. An image display apparatus comprising:

image signal input means for inputting a first image signal containing plural pixel data sets;

image signal processing means for converting said first image signal input from said image signal input means into a second image signal containing plural pixel data sets and then transmitting said second image signal;

image display means for displaying an image obtained by said second image signal transmitted from said image signal processing means, on an image display element; and parameter adjustment means for adjusting the values of the parameters of plural kinds, each parameter deciding a picture quality of said image displayed on said image display element, said parameter adjustment means including: display control means for displaying the adjustment positions of said parameters of plural kinds on said image display element; and user operation means for allowing user to adjust the values of said parameters of plural kinds with referencing said adjustment position of said parameters of plural kinds displayed on said display element; and wherein said image signal processing means includes:

data selection means for selecting plural pixel data sets located on a periphery of an objective position in said second image signal based on said first image signal;

class detection means for detecting a class including the pixel data set of said objective position based on said plural pixel data sets selected by said data selection means; and pixel data production means for producing the pixel data set of said objective position in correspondence to the class detected by said class detection means and the values of said parameters of plural kinds, each parameter being adjusted by said parameter adjustment means.

3. A coefficient seed data production device for producing coefficient seed data set, said coefficient seed data set being coefficient data set in a production equation for producing coefficient data set used in an estimation equation for converting a first information signal containing plural informational data sets into a second information signal containing plural informational data sets, comprising:

signal processing means for processing teacher signal corresponding to said second information signal to obtain an input signal corresponding to said first information signal;

parameter adjustment means for adjusting values of parameters of plural kinds, each parameter deciding a quality of an output obtained from said input signal and corresponding to any one of parameters of plural kinds contained in said production equation;

first data selection means for selecting first plural informational data sets located on a periphery of an objective position in said teacher signal based on said input signal;

class detection means for detecting a class including informational data set of said objective position based on said first plural informational data sets selected by said first data selection means;

second data selection means for selecting second plural informational data sets located on a periphery of the objective position in said teacher signal based on said input signal;

normal equation production means for producing a normal equation for obtaining said coefficient seed data set for each class using the class detected by said class detection means, said second plural informational data sets selected by said second data selection means, and the informational data set of the objective position in the teacher signal; and coefficient seed data calculation means for solving said normal equation to obtain said coefficient seed data set for each class.

4. A method executed by an information signal processing device for producing coefficient seed data set, said coefficient seed data set being coefficient data set in a production equation for producing coefficient data set used in an estimation equation for converting a first information signal containing plural informational data sets into a second information signal containing plural informational data sets, comprising:

a first step of processing teacher signal corresponding to said second information signal to obtain an input signal corresponding to said first information signal;

a second step of adjusting values of parameters of plural kinds, each parameter deciding a quality of an output obtained from said input signal and corresponding to any one of parameters of plural kinds contained in said production equation;

a third step of selecting first plural informational data sets located on a periphery of an objective position in said teacher signal based on said input signal;

a fourth step of detecting a class including informational data set of said objective position based on said first plural informational data sets selected at said third step;

a fifth step of selecting second plural informational data sets located on a periphery of the objective position in said teacher signal based on said input signal;

a sixth step of producing a normal equation for obtaining said coefficient seed data set for each class using the class detected at said fourth step, said second plural informational data sets selected at said fifth step, and the informational data set of the objective position in said teacher signal; and a seventh step of solving said normal equation to obtain the coefficient seed data set for each class.

5. A non-transitory computer-readable medium for storing a computer program for producing coefficient seed data set, which is coefficient data set in a production equation for producing coefficient data set used in an estimation equation for converting a first information signal containing plural informational data sets into a second information signal containing plural informational data sets, by executing:

a first step of processing teacher signal corresponding to said second information signal to obtain an input signal corresponding to said first information signal;

a second step of adjusting values of parameters of plural kinds, each parameter deciding a quality of an output obtained from said input signal and corresponding to any one of parameters of plural kinds contained in said production equation;

a third step of selecting first plural informational data sets located on a periphery of an objective position in said teacher signal based on said input signal;

a fourth step of detecting a class including informational data set of said objective position based on said first plural informational data sets selected at said third step;

a fifth step of selecting second plural informational data sets located on a periphery of the objective position in said teacher signal based on said input signal;

a sixth step of producing a normal equation for obtaining said coefficient seed data set for each class using the class detected at said fourth step, said second plural informational data sets selected at said fifth step, and the informational data set of the objective position in said teacher signal; and a seventh step of solving said normal equation to obtain the coefficient seed data set for each class.

6. A coefficient seed data production device for producing coefficient seed data set, said coefficient seed data set being coefficient data set in a production equation for producing coefficient data set used in an estimation equation for converting a first information signal containing plural informational data sets into a second information signal containing plural informational data sets, comprising:

signal processing means for processing teacher signal corresponding to said second information signal to obtain an input signal corresponding to said first information signal;

parameter adjustment means for adjusting values of parameters of plural kinds, each parameter deciding a quality of an output obtained from said input signal and corresponding to any one of parameters of plural kinds contained in said production equation;

first data selection means for selecting first plural informational data sets located on a periphery of an objective position in said teacher signal based on said input signal;

class detection means for detecting a class including informational data set of said objective position based on said first plural informational data sets selected by said first data selection means;

second data selection means for selecting second plural informational data sets located on a periphery of the objective position in said teacher signal based on said input signal;

first normal equation production means for producing a first normal equation for obtaining said coefficient data set used in the estimation equation for each combination of the class detected by said class detection means and the values of parameter adjusted by said parameter adjustment means using the class detected by said class detection means, said second plural informational data sets selected by said second data selection means, and the informational data set of the objective position in said teacher signal, coefficient data calculation means for solving said first normal equation to obtain said coefficient data set used in the estimation equation for each combination;

second normal equation production means for producing a second normal equation for obtaining the coefficient seed data set for each class using the coefficient data set for each combination obtained by said coefficient data calculation means; and coefficient seed data calculation means for solving the second normal equation to obtain the coefficient seed data set for each class.

7. A method executed by an information signal processing device for producing coefficient seed data set, said coefficient seed data set being coefficient data set in a production equation for producing coefficient data set used in an estimation equation for converting a first information signal containing plural informational data sets into a second information signal containing plural informational data sets, comprising:

a first step of processing teacher signal corresponding to said second information signal to obtain an input signal corresponding to the first information signal;

a second step of adjusting values of parameters of plural kinds, each parameter deciding a quality of an output obtained from said input signal and corresponding to any one of parameters of plural kinds contained in said production equation;

a third step of selecting first plural informational data sets located on a periphery of an objective position in said teacher signal based on said input signal;

a fourth step of detecting a class including informational data set of said objective position based on said first plural informational data sets selected at the third step;

a fifth step of selecting second plural informational data sets located on a periphery of the objective position in said teacher signal based on said input signal;

a sixth step of producing a first normal equation for obtaining said coefficient data set used in the estimation equation for each combination of the class detected at said fourth step and the values of the parameters of plural kinds using the class detected at said fourth step, said second plural informational data sets selected at said fifth step, and the informational data set of the objective position in said teacher signal;

a seventh step of solving said first normal equation to obtain said coefficient data set used in the estimation equation for each combination;

an eighth step of producing a second normal equation for obtaining said coefficient seed data set for each class using the coefficient data set for each combination obtained at said seventh step; and a ninth step of solving said second normal equation to obtain said coefficient seed data set for each class.

8. A non-transitory computer-readable medium for storing a computer program for producing coefficient seed data set, said coefficient seed data set being coefficient data set in a production equation for producing coefficient data set used in an estimation equation for converting a first information signal containing plural informational data sets into a second information signal containing plural informational data sets, by executing:

a first step of processing teacher signal corresponding to said second information signal to obtain an input signal corresponding to the first information signal;

a second step of adjusting values of parameters of plural kinds, each parameter deciding a quality of an output obtained from said input signal and corresponding to any one of parameters of plural kinds contained in said production equation;

a third step of selecting first plural informational data sets located on a periphery of an objective position in said teacher signal based on said input signal;

a fourth step of detecting a class including informational data set of said objective position based on said first plural informational data sets selected at the third step;

a fifth step of selecting second plural informational data sets located on a periphery of the objective position in said teacher signal based on said input signal;

a sixth step of producing a first normal equation for obtaining said coefficient data set used in the estimation equation for each combination of the class detected at said fourth step and the values of the parameters of plural kinds using the class detected at said fourth step, said second plural informational data sets selected at said fifth step, and the informational data set of the objective position in said teacher signal;

a seventh step of solving said first normal equation to obtain said coefficient data set used in the estimation equation for each combination;

an eighth step of producing a second normal equation for obtaining said coefficient seed data set for each class using the coefficient data set for each combination obtained at said seventh step; and a ninth step of solving said second normal equation to obtain said coefficient seed data set for each class.

9. A coefficient data production device for producing coefficient data set used in an estimation equation for converting a first information signal containing plural informational data sets into a second information signal containing plural informational data sets, comprising:

signal processing means for processing a teacher signal corresponding to said second information signal to obtain an input signal corresponding to said first information signal;

parameter adjustment means for adjusting values of parameters of plural kinds, each parameter deciding a quality of an output obtained from said input signal;

first data selection means for selecting first plural informational data sets located on a periphery of an objective position in said teacher signal based on said input signal;

class detection means for detecting a class including the informational data set of said objective position based on said first plural informational data sets selected by said first data selection means;

second data selection means for selecting second plural informational data sets located on a periphery of the objective position in said teacher signal based on said input signal;

normal equation production means for producing a normal equation for obtaining the coefficient data set used in said estimation equation for each combination of said class detected by said class detection means and the values of said parameters of plural kinds using the class detected by said class detection means, said second plural informational data sets selected by said second data selection means, and the informational data set of the objective position in said teacher signal; and coefficient data calculation means for solving said normal equation to obtain said coefficient data set for each combination.

10. A method executed by an information signal processing device for producing coefficient data set used in an estimation equation for converting a first information signal containing plural informational data sets into a second information signal containing plural informational data sets, comprising:

a first step of processing a teacher signal corresponding to said second information signal to obtain an input signal corresponding to said first information signal;

a second step of adjusting values of parameters of plural kinds, each parameter deciding a quality of an output obtained from said input signal;

a third step of selecting first plural informational data sets located on a periphery of an objective position in said teacher signal based on said input signal;

a fourth step of detecting a class including the informational data set of said objective position based on said first plural informational data sets selected at said third step;

a fifth step of selecting second plural informational data sets located on a periphery of the objective position in said teacher signal based on said input signal;

a sixth step of producing a normal equation for obtaining the coefficient data set used in said estimation equation for each combination of said class detected at said fourth step and the values of said parameters of plural kinds using said class detected at said fourth step, said second plural informational data sets selected at said fifth step, and the informational data set of the objective position in said teacher signal; and a seventh step of solving said normal equation produced at said sixth step to obtain said coefficient data set for each combination.

11. A non-transitory computer-readable medium storing a computer program for producing coefficient data set used in an estimation equation for converting a first information signal containing plural informational data sets into a second information signal containing plural informational data sets, by executing:

a first step of processing a teacher signal corresponding to said second information signal to obtain an input signal corresponding to said first information signal;

a second step of adjusting values of parameters of plural kinds, each parameter deciding a quality of an output obtained from said input signal;

a third step of selecting first plural informational data sets located on a periphery of an objective position in said teacher signal based on said input signal;

a fourth step of detecting a class including the informational data set of said objective position based on said first plural informational data sets selected at said third step;

a fifth step of selecting second plural informational data sets located on a periphery of the objective position in said teacher signal based on said input signal;

a sixth step of producing a normal equation for obtaining the coefficient data set used in said estimation equation for each combination of said class detected at said fourth step and the values of said parameters of plural kinds using said class detected at said fourth step, said second plural informational data sets selected at said fifth step, and the informational data set of the objective position in said teacher signal; and a seventh step of solving said normal equation produced at said sixth step to obtain said coefficient data set for each combination.

12. An information signal processor for converting a first information signal containing plural informational data sets into a second information signal containing plural informational data sets, comprising:

a first data selection unit that selects first plural informational data sets located on a periphery of an objective position in said second information signal based on said first information signal;

a class detection unit that detects a class including informational data set of the objective position based on said first plural informational data sets selected by said first data selection unit;

a parameter adjustment unit that adjusts values of parameters of plural kinds, each parameter deciding a quality of an output obtained by said second information signal, said parameter adjustment unit including:

a display unit that displays adjustment positions of said parameters of plural kinds; and a user operation unit that allows a user to adjust the values of said parameters of plural kinds with referencing contents displayed at said display unit; and an informational data production unit that produces one or more informational data sets of the objective position in correspondence with the class detected by said class detection unit and the values of the parameters of plural kinds adjusted by said parameter adjustment unit.

13. An image display apparatus comprising:

an image signal input unit that inputs a first image signal containing plural pixel data sets;

an image signal processing unit that converts said first image signal input from said image signal input unit into a second image signal containing plural pixel data sets and then transmitting said second image signal;

an image display unit that displays an image obtained by said second image signal transmitted from said image signal processing unit, on an image display element; and a parameter adjustment unit that adjusts the values of the parameters of plural kinds, each parameter deciding a picture quality of said image displayed on said image display element, said parameter adjustment unit including:

a display control unit that displays the adjustment positions of said parameters of plural kinds on said image display element; and a user operation unit that allows a user to adjust the values of said parameters of plural kinds with referencing said adjustment position of said parameters of plural kinds displayed on said display element; and wherein said image signal processing unit includes:
- a data selection unit that selects plural pixel data sets located on a periphery of an objective position in said second image signal based on said first image signal;
- a class detection unit that detects a class including the pixel data set of said objective position based on said plural pixel data sets selected by said data selection unit; and
- a pixel data production unit that produces the pixel data set of said objective position in correspondence to the class detected by said class detection unit and the values of said parameters of plural kinds, each parameter being adjusted by said parameter adjustment unit.

14. A coefficient seed data production device for producing coefficient seed data set, said coefficient seed data set being coefficient data set in a production equation for producing coefficient data set used in an estimation equation for converting a first information signal containing plural informational data sets into a second information signal containing plural informational data sets, comprising:
- a signal processing unit that processes a teacher signal corresponding to said second information signal to obtain an input signal corresponding to said first information signal;
- a parameter adjustment unit that adjusts values of parameters of plural kinds, each parameter deciding a quality of an output obtained from said input signal and corresponding to any one of parameters of plural kinds contained in said production equation;
- a first data selection unit that selects first plural informational data sets located on a periphery of an objective position in said teacher signal based on said input signal;
- a class detection unit that detects a class including informational data set of said objective position based on said first plural informational data sets selected by said first data selection unit;
- a second data selection unit that selects second plural informational data sets located on a periphery of the objective position in said teacher signal based on said input signal;
- a normal equation production unit that produces a normal equation for obtaining said coefficient seed data set for each class using the class detected by said class detection unit, said second plural informational data sets selected by said second data selection unit, and the informational data set of the objective position in the teacher signal; and
- a coefficient seed data calculation unit that solves said normal equation to obtain said coefficient seed data set for each class.

15. A coefficient seed data production device for producing coefficient seed data set, said coefficient seed data set being coefficient data set in a production equation for producing coefficient data set used in an estimation equation for converting a first information signal containing plural informational data sets into a second information signal containing plural informational data sets, comprising:
- a signal processing unit for processing teacher signal corresponding to said second information signal to obtain an input signal corresponding to said first information signal;
- a parameter adjustment unit that adjusts values of parameters of plural kinds, each parameter deciding a quality of an output obtained from said input signal and corresponding to any one of parameters of plural kinds contained in said production equation;
- a first data selection unit that selects first plural informational data sets located on a periphery of an objective position in said teacher signal based on said input signal;
- a class detection unit that detects a class including informational data set of said objective position based on said first plural informational data sets selected by said first data selection unit;
- a second data selection unit that selects second plural informational data sets located on a periphery of the objective position in said teacher signal based on said input signal;
- a first normal equation production unit that produces a first normal equation for obtaining said coefficient data set used in the estimation equation for each combination of the class detected by said class detection unit and the values of parameter adjusted by said parameter adjustment unit using the class detected by said class detection unit, said second plural informational data sets selected by said second data selection unit, and the informational data set of the objective position in said teacher signal,
- a coefficient data calculation unit for solving said first normal equation to obtain said coefficient data set used in the estimation equation for each combination;
- a second normal equation production unit that produces a second normal equation for obtaining the coefficient seed data set for each class using the coefficient data set for each combination obtained by said coefficient data calculation unit; and
- a coefficient seed data calculation unit that solves the second normal equation to obtain the coefficient seed data set for each class.

16. A coefficient data production device for producing coefficient data set used in an estimation equation for converting a first information signal containing plural informational data sets into a second information signal containing plural informational data sets, comprising:
- a signal processing unit that processes a teacher signal corresponding to said second information signal to obtain an input signal corresponding to said first information signal;
- a parameter adjustment unit for adjusting values of parameters of plural kinds, each parameter deciding a quality of an output obtained from said input signal;
- a first data selection unit that selects first plural informational data sets located on a periphery of an objective position in said teacher signal based on said input signal;
- a class detection unit that detects a class including the informational data set of said objective position based on said first plural informational data sets selected by said first data selection unit;
- a second data selection unit that selects second plural informational data sets located on a periphery of the objective position in said teacher signal based on said input signal;
- a normal equation production unit that produces a normal equation for obtaining the coefficient data set used in said estimation equation for each combination of said class detected by said class detection unit and the values of said parameters of plural kinds using the class detected by said class detection unit, said second plural informational data sets selected by said second data selection unit, and the informational data set of the objective position in said teacher signal; and
- a coefficient data calculation unit for solving said normal equation to obtain said coefficient data set for each combination.

* * * * *